US012462435B2

(12) United States Patent
Narayana et al.

(10) Patent No.: US 12,462,435 B2
(45) Date of Patent: Nov. 4, 2025

(54) AUTOMATED MAPPING INFORMATION GENERATION FROM ANALYSIS OF BUILDING PHOTOS

(71) Applicant: MFTB Holdco, Inc., Seattle, WA (US)

(72) Inventors: Manjunath Narayana, Chino Hills, CA (US); Ivaylo Boyadzhiev, Seattle, WA (US)

(73) Assignee: MFTB Holdco, Inc., Seattle, WA (US)

( * ) Notice: Subject to any disclaimer, the term of this patent is extended or adjusted under 35 U.S.C. 154(b) by 0 days.

(21) Appl. No.: 18/745,730

(22) Filed: Jun. 17, 2024

(65) Prior Publication Data
US 2024/0338854 A1    Oct. 10, 2024

Related U.S. Application Data

(63) Continuation of application No. 17/459,820, filed on Aug. 27, 2021, now Pat. No. 12,056,900.

(51) Int. Cl.
*G06T 7/00* (2017.01)
*G06F 3/04815* (2022.01)
(Continued)

(52) U.S. Cl.
CPC ............ *G06T 7/97* (2017.01); *G06F 3/04815* (2013.01); *G06F 9/451* (2018.02); *G06T 5/50* (2013.01);
(Continued)

(58) Field of Classification Search
CPC .... G06T 7/97; G06T 5/50; G06T 7/62; G06T 7/70; G06T 2207/20072; G06F 3/04815;
(Continued)

(56) References Cited

U.S. PATENT DOCUMENTS 5,140,352 A    8/1992    Moore et al.
6,031,540 A    2/2000    Golin et al.
(Continued)

FOREIGN PATENT DOCUMENTS

EP    2413097 A2    2/2012
EP    2505961 A2    10/2012
(Continued)

OTHER PUBLICATIONS

CubiCasa | From video to floor plan in under 5 minutes, retrieved on Mar. 26, 2019, from https://www.cubi.casa/, 6 pages.
(Continued)

*Primary Examiner* — Matthew C Bella
*Assistant Examiner* — Pardis Sohraby
(74) *Attorney, Agent, or Firm* — VLP Law Group LLP; James A. D. White

(57) ABSTRACT

Techniques are described for using computing devices to perform automated operations to generate mapping information via analysis of visual data of photos of a defined area, and for using the generated mapping information in further automated manners, including to display the generated mapping information via various types of visualizations corresponding graphical user interfaces. In some situations, the defined area includes an interior of a multi-room building, and the generated information includes at least a partial floor plan and/or other modeled representation of the building—in addition, the generating may be further performed without having measured depth information about distances from the photos' acquisition locations to walls or other objects in the surrounding building. The generated floor plan and/or other mapping-related information may be further used in various manners, including for controlling navigation of devices (e.g., autonomous vehicles), etc.

21 Claims, 20 Drawing Sheets

(51) Int. Cl.
*G06F 9/451* (2018.01)
*G06T 5/50* (2006.01)
*G06T 7/62* (2017.01)
*G06T 7/70* (2017.01)
*G06V 10/22* (2022.01)

(52) U.S. Cl.
CPC .................. *G06T 7/62* (2017.01); *G06T 7/70* (2017.01); *G06V 10/22* (2022.01); *G06T 2207/20072* (2013.01)

(58) Field of Classification Search
CPC .... G06F 9/451; G06F 16/583; G06F 16/5866; G06F 16/54; G06V 10/22
USPC ........................................................ 382/180
See application file for complete search history.

(56) References Cited

U.S. PATENT DOCUMENTS

| | | | |
|---|---|---|---|
| 6,141,034 A | 10/2000 | McCutchen | |
| 6,317,166 B1 | 11/2001 | McCutchen | |
| 6,320,584 B1 | 11/2001 | Golin et al. | |
| 6,323,858 B1 | 11/2001 | Gilbert et al. | |
| 6,337,683 B1 | 1/2002 | Gilbert et al. | |
| 6,654,019 B2 | 11/2003 | Gilbert et al. | |
| 6,683,608 B2 | 1/2004 | Golin et al. | |
| 6,690,374 B2 | 2/2004 | Park et al. | |
| 6,731,305 B1 | 5/2004 | Park et al. | |
| 6,738,073 B2 | 5/2004 | Park et al. | |
| 7,050,085 B1 | 5/2006 | Park et al. | |
| 7,129,971 B2 | 10/2006 | McCutchen | |
| 7,196,722 B2 | 3/2007 | White et al. | |
| 7,525,567 B2 | 4/2009 | McCutchen | |
| 7,620,909 B2 | 11/2009 | Park et al. | |
| 7,627,235 B2 | 12/2009 | McCutchen et al. | |
| 7,782,319 B2 | 8/2010 | Ghosh et al. | |
| 7,791,638 B2 | 9/2010 | McCutchen | |
| 7,909,241 B2 | 3/2011 | Stone et al. | |
| 7,973,838 B2 | 7/2011 | McCutchen | |
| 8,072,455 B2 | 12/2011 | Temesvari et al. | |
| 8,094,182 B2 | 1/2012 | Park et al. | |
| RE43,786 E | 11/2012 | Cooper | |
| 8,463,020 B1 | 6/2013 | Schuckmann et al. | |
| 8,517,256 B2 | 8/2013 | Stone et al. | |
| 8,520,060 B2 | 8/2013 | Zomet et al. | |
| 8,523,066 B2 | 9/2013 | Stone et al. | |
| 8,523,067 B2 | 9/2013 | Stone et al. | |
| 8,528,816 B2 | 9/2013 | Stone et al. | |
| 8,540,153 B2 | 9/2013 | Stone et al. | |
| 8,594,428 B2 | 11/2013 | Aharoni et al. | |
| 8,654,180 B2 | 2/2014 | Zomet et al. | |
| 8,666,815 B1 | 3/2014 | Chau | |
| 8,699,005 B2 | 4/2014 | Likholyot | |
| 8,705,892 B2 | 4/2014 | Aguilera et al. | |
| RE44,924 E | 6/2014 | Cooper et al. | |
| 8,854,684 B2 | 10/2014 | Zomet | |
| 8,861,840 B2 | 10/2014 | Bell et al. | |
| 8,861,841 B2 | 10/2014 | Bell et al. | |
| 8,879,828 B2 | 11/2014 | Bell et al. | |
| 8,953,871 B2 | 2/2015 | Zomet | |
| 8,989,440 B2 | 3/2015 | Klusza et al. | |
| 8,996,336 B2 | 3/2015 | Malka et al. | |
| 9,021,947 B2 | 5/2015 | Landa | |
| 9,026,947 B2 | 5/2015 | Lee et al. | |
| 9,035,968 B2 | 5/2015 | Zomet | |
| 9,041,796 B2 | 5/2015 | Malka et al. | |
| 9,071,714 B2 | 6/2015 | Zomet | |
| 9,129,438 B2 | 9/2015 | Aarts et al. | |
| 9,151,608 B2 | 10/2015 | Malka et al. | |
| 9,165,410 B1 | 10/2015 | Bell et al. | |
| 9,171,405 B1 | 10/2015 | Bell et al. | |
| 9,224,206 B1* | 12/2015 | Lookingbill | G06T 7/593 |
| 9,324,190 B2 | 4/2016 | Bell et al. | |
| 9,361,717 B2 | 6/2016 | Zomet | |
| 9,396,586 B2 | 7/2016 | Bell et al. | |
| 9,438,759 B2 | 9/2016 | Zomet | |
| 9,438,775 B2 | 9/2016 | Powers et al. | |
| 9,489,775 B1 | 11/2016 | Bell et al. | |
| 9,495,783 B1 | 11/2016 | Samarasekera et al. | |
| 9,576,401 B2 | 2/2017 | Zomet | |
| 9,619,933 B2 | 4/2017 | Spinella-Marno et al. | |
| 9,635,252 B2 | 4/2017 | Accardo et al. | |
| 9,641,702 B2 | 5/2017 | Bin-Nun et al. | |
| 9,760,994 B1 | 9/2017 | Bell et al. | |
| 9,786,097 B2 | 10/2017 | Bell et al. | |
| 9,787,904 B2 | 10/2017 | Birkler et al. | |
| 9,836,885 B1 | 12/2017 | Eraker et al. | |
| 9,852,351 B2 | 12/2017 | Aguilera Perez et al. | |
| 9,953,111 B2 | 4/2018 | Bell et al. | |
| 9,953,430 B1 | 4/2018 | Zakhor | |
| 9,990,760 B2 | 6/2018 | Aguilera Perez et al. | |
| 9,990,767 B1 | 6/2018 | Sheffield et al. | |
| 10,026,224 B2 | 7/2018 | Bell et al. | |
| 10,030,979 B2 | 7/2018 | Bjorke et al. | |
| 10,055,876 B2 | 8/2018 | Ford et al. | |
| 10,068,344 B2 | 9/2018 | Jovanovic et al. | |
| 10,083,522 B2 | 9/2018 | Jovanovic et al. | |
| 10,102,639 B2 | 10/2018 | Bell et al. | |
| 10,102,673 B2 | 10/2018 | Eraker et al. | |
| 10,120,397 B1 | 11/2018 | Zakhor et al. | |
| 10,122,997 B1 | 11/2018 | Sheffield et al. | |
| 10,127,718 B2 | 11/2018 | Zakhor et al. | |
| 10,127,722 B2 | 11/2018 | Shakib et al. | |
| 10,139,985 B2 | 11/2018 | Mildrew et al. | |
| 10,163,261 B2 | 12/2018 | Bell et al. | |
| 10,163,271 B1 | 12/2018 | Powers et al. | |
| 10,181,215 B2 | 1/2019 | Sedeffow | |
| 10,192,115 B1 | 1/2019 | Sheffield et al. | |
| 10,204,185 B2 | 2/2019 | Mrowca et al. | |
| 10,210,285 B2 | 2/2019 | Wong et al. | |
| 10,235,797 B1 | 3/2019 | Sheffield et al. | |
| 10,242,400 B1 | 3/2019 | Eraker et al. | |
| 10,339,716 B1 | 7/2019 | Powers et al. | |
| 10,366,531 B2 | 7/2019 | Sheffield | |
| 10,375,306 B2 | 8/2019 | Shan et al. | |
| 10,395,435 B2 | 8/2019 | Powers et al. | |
| 10,530,997 B2 | 1/2020 | Shan et al. | |
| 10,643,386 B2 | 5/2020 | Li et al. | |
| 10,708,507 B1 | 7/2020 | Dawson et al. | |
| 10,809,066 B2 | 10/2020 | Colburn et al. | |
| 10,825,247 B1 | 11/2020 | Vincent et al. | |
| 10,834,317 B2 | 11/2020 | Shan et al. | |
| 11,057,561 B2 | 7/2021 | Shan et al. | |
| 11,164,361 B2 | 11/2021 | Moulon et al. | |
| 11,164,368 B2 | 11/2021 | Vincent et al. | |
| 11,165,959 B2 | 11/2021 | Shan et al. | |
| 11,217,019 B2 | 1/2022 | Li et al. | |
| 11,238,652 B2 | 2/2022 | Impas et al. | |
| 11,243,656 B2 | 2/2022 | Li et al. | |
| 11,252,329 B1 | 2/2022 | Cier et al. | |
| 11,284,006 B2 | 3/2022 | Dawson et al. | |
| 11,405,549 B2 | 8/2022 | Cier et al. | |
| 11,405,558 B2 | 8/2022 | Dawson et al. | |
| 11,408,738 B2 | 8/2022 | Colburn et al. | |
| 11,480,433 B2 | 10/2022 | Colburn et al. | |
| 11,481,925 B1 | 10/2022 | Li et al. | |
| 11,494,973 B2 | 11/2022 | Boyadzhiev et al. | |
| 11,501,492 B1 | 11/2022 | Li et al. | |
| 11,514,674 B2 | 11/2022 | Moulon et al. | |
| 11,592,969 B2 | 2/2023 | Li et al. | |
| 2006/0256109 A1 | 11/2006 | Acker et al. | |
| 2010/0232709 A1 | 9/2010 | Zhang et al. | |
| 2012/0075414 A1 | 3/2012 | Park et al. | |
| 2012/0293613 A1 | 11/2012 | Powers et al. | |
| 2013/0018881 A1* | 1/2013 | Bhatt | G06F 3/04845 707/736 |
| 2013/0050407 A1 | 2/2013 | Brinda et al. | |
| 2013/0342533 A1 | 12/2013 | Bell et al. | |
| 2014/0043436 A1 | 2/2014 | Bell et al. | |
| 2014/0044343 A1 | 2/2014 | Bell et al. | |
| 2014/0044344 A1 | 2/2014 | Bell et al. | |
| 2014/0125658 A1 | 5/2014 | Bell et al. | |
| 2014/0125767 A1 | 5/2014 | Bell et al. | |

(56) References Cited

U.S. PATENT DOCUMENTS

| | | |
|---|---|---|
| 2014/0125768 A1 | 5/2014 | Bell et al. |
| 2014/0125769 A1 | 5/2014 | Bell et al. |
| 2014/0125770 A1 | 5/2014 | Bell et al. |
| 2014/0236482 A1 | 8/2014 | Dorum et al. |
| 2014/0267631 A1 | 9/2014 | Powers et al. |
| 2014/0307100 A1 | 10/2014 | Myllykoski et al. |
| 2014/0320674 A1 | 10/2014 | Kuang |
| 2015/0116691 A1 | 4/2015 | Likholyot |
| 2015/0189165 A1 | 7/2015 | Milosevski et al. |
| 2015/0262421 A1 | 9/2015 | Bell et al. |
| 2015/0269785 A1 | 9/2015 | Bell et al. |
| 2015/0302636 A1 | 10/2015 | Arnoldus et al. |
| 2015/0310596 A1 | 10/2015 | Sheridan et al. |
| 2015/0332464 A1 | 11/2015 | O'Keefe et al. |
| 2016/0055268 A1 | 2/2016 | Bell et al. |
| 2016/0134860 A1 | 5/2016 | Jovanovic et al. |
| 2016/0140676 A1 | 5/2016 | Fritze et al. |
| 2016/0217225 A1 | 7/2016 | Bell et al. |
| 2016/0253780 A1* | 9/2016 | Iwamoto .................. G06T 5/80 382/154 |
| 2016/0260250 A1 | 9/2016 | Jovanovic et al. |
| 2016/0286119 A1 | 9/2016 | Rondinelli |
| 2016/0300385 A1 | 10/2016 | Bell et al. |
| 2017/0034430 A1 | 2/2017 | Fu et al. |
| 2017/0067739 A1 | 3/2017 | Siercks et al. |
| 2017/0194768 A1 | 7/2017 | Powers et al. |
| 2017/0195654 A1 | 7/2017 | Powers et al. |
| 2017/0263050 A1 | 9/2017 | Ha et al. |
| 2017/0324941 A1 | 11/2017 | Birkler |
| 2017/0330273 A1 | 11/2017 | Holt et al. |
| 2017/0337737 A1 | 11/2017 | Edwards et al. |
| 2018/0007340 A1 | 1/2018 | Stachowski |
| 2018/0025536 A1 | 1/2018 | Bell et al. |
| 2018/0075168 A1 | 3/2018 | Tiwari et al. |
| 2018/0139431 A1 | 5/2018 | Simek et al. |
| 2018/0143023 A1 | 5/2018 | Bjorke et al. |
| 2018/0143756 A1 | 5/2018 | Mildrew et al. |
| 2018/0144487 A1 | 5/2018 | Bell et al. |
| 2018/0144535 A1 | 5/2018 | Ford et al. |
| 2018/0144547 A1 | 5/2018 | Shakib et al. |
| 2018/0144555 A1 | 5/2018 | Ford et al. |
| 2018/0146121 A1 | 5/2018 | Hensler et al. |
| 2018/0146193 A1 | 5/2018 | Safreed et al. |
| 2018/0146212 A1 | 5/2018 | Hensler et al. |
| 2018/0165871 A1 | 6/2018 | Mrowca |
| 2018/0203955 A1 | 7/2018 | Bell et al. |
| 2018/0241985 A1 | 8/2018 | O'Keefe et al. |
| 2018/0293793 A1 | 10/2018 | Bell et al. |
| 2018/0300936 A1 | 10/2018 | Ford et al. |
| 2018/0306588 A1 | 10/2018 | Bjorke et al. |
| 2018/0348854 A1 | 12/2018 | Powers et al. |
| 2018/0365496 A1 | 12/2018 | Hovden et al. |
| 2019/0012833 A1 | 1/2019 | Eraker et al. |
| 2019/0026956 A1 | 1/2019 | Gausebeck et al. |
| 2019/0026957 A1 | 1/2019 | Gausebeck |
| 2019/0026958 A1 | 1/2019 | Gausebeck et al. |
| 2019/0035165 A1 | 1/2019 | Gausebeck |
| 2019/0041972 A1 | 2/2019 | Bae |
| 2019/0050137 A1 | 2/2019 | Mildrew et al. |
| 2019/0051050 A1 | 2/2019 | Bell et al. |
| 2019/0051054 A1 | 2/2019 | Jovanovic et al. |
| 2019/0087067 A1 | 3/2019 | Hovden et al. |
| 2019/0122422 A1 | 4/2019 | Sheffield et al. |
| 2019/0164335 A1 | 5/2019 | Sheffield et al. |
| 2019/0180104 A1 | 6/2019 | Sheffield et al. |
| 2019/0251645 A1 | 8/2019 | Winans |
| 2019/0287164 A1 | 9/2019 | Eraker et al. |
| 2020/0116493 A1* | 4/2020 | Colburn ................ G06F 18/253 |
| 2020/0284590 A1* | 9/2020 | Chen .................. G01C 21/3841 |
| 2020/0336675 A1 | 10/2020 | Dawson et al. |
| 2020/0389602 A1 | 12/2020 | Dawson et al. |
| 2020/0408532 A1 | 12/2020 | Colburn et al. |
| 2021/0044760 A1 | 2/2021 | Dawson et al. |
| 2021/0117582 A1 | 4/2021 | Kamenca et al. |
| 2021/0377442 A1 | 12/2021 | Boyadzhiev et al. |
| 2021/0385378 A1 | 12/2021 | Cier et al. |
| 2022/0003555 A1 | 1/2022 | Colburn et al. |
| 2022/0028156 A1 | 1/2022 | Boyadzhiev et al. |
| 2022/0028159 A1 | 1/2022 | Vincent et al. |
| 2022/0076019 A1 | 3/2022 | Moulon et al. |
| 2022/0092227 A1 | 3/2022 | Yin et al. |
| 2022/0114291 A1 | 4/2022 | Li et al. |
| 2022/0164493 A1 | 5/2022 | Li et al. |
| 2022/0189122 A1 | 6/2022 | Li et al. |

FOREIGN PATENT DOCUMENTS

| | | |
|---|---|---|
| EP | 2506170 A2 | 10/2012 |
| KR | 101770648 B1 | 8/2017 |
| KR | 101930796 B1 | 12/2018 |
| WO | 2005091894 A2 | 10/2005 |
| WO | 2016154306 A1 | 9/2016 |
| WO | 2018204279 A1 | 11/2018 |
| WO | 2019083832 A1 | 5/2019 |
| WO | 2019104049 A1 | 5/2019 |
| WO | 2019118599 A2 | 6/2019 |
| WO | 2021119024 A1 | 6/2021 |

OTHER PUBLICATIONS

CubiCasa FAQ & Manual, retrieved on Mar. 26, 2019, from https://www.cubi.casa/faq/, 5 pages.

Cupix Home, retrieved on Mar. 26, 2019, from https://www.cupix.com/, 1 page.

Cupix—FAQ, retrieved on Mar. 26, 2019, from https://www.cupix.com/faq.html, 3 pages.

IGuide: 3D Virtual Tours, retrieved on Mar. 26, 2019, from https://goiguide.com/, 6 pages.

immoviewer.com | Automated Video Creation & Simple Affordable 3D 360 Tours, retrieved on Mar. 26, 2019, from https://www.immoviewer.com/, 5 pages.

MagicPlan | #1 Floor Plan App, Construction & Surveying Samples, retrieved on Mar. 26, 2019, from https://www.magicplan.app/, 9 pages.

EyeSpy360 Virtual Tours | Virtual Tour with any 360 camera, retrieved on Mar. 27, 2019, from https://www.eyespy360.com/en-us/, 15 pages.

Indoor Reality, retrieved on Mar. 27, 2019, from https://www.indoorreality.com/, 9 pages.

InsideMaps, retrieved on Mar. 27, 2019, from https://www.insidemaps.com/, 7 pages.

IStaging | Augmented & Virtual Reality Platform for Business, retrieved on Mar. 27, 2019, from https://www.istaging.com/en/, 7 pages.

Metareal, retrieved on Mar. 27, 2019, from https://www.metareal.com/, 4 pages.

PLNAR—The AR 3D Measuring / Modeling Platform, retrieved on Mar. 27, 2019, from https://www.plnar.co, 6 pages.

YouVR Global, retrieved on Mar. 27, 2019, from https://global.youvr.io/, 9 pages.

GeoCV, retrieved on Mar. 28, 2019, from https://geocv.com/, 4 pages.

Biersdorfer, J.D., "How to Make A 3-D Model of Your Home Renovation Vision," in the New York Times, Feb. 13, 2019, retrieved Mar. 28, 2019, 6 pages.

Chen et al. "Rise of the indoor crowd: Reconstruction of building interior view via mobile crowdsourcing." In: Proceedings of the 13th ACM Conference on Embedded Networked Sensor Systems. Nov. 4, 2015, 13 pages.

Immersive 3D for the Real World, retrieved from https://matterport.com/, on Mar. 27, 2017, 5 pages.

Learn About Our Complete 3D System, retrieved from https://matterport.com/how-it-works/, on Mar. 27, 2017, 6 pages.

Surefield FAQ, retrieved from https://surefield.com/faq, on Mar. 27, 2017, 1 page.

Why Surefield, retrieved from https://surefield.com/why-surefield, on Mar. 27, 2017, 7 pages.

(56) References Cited

OTHER PUBLICATIONS

Schneider, V., "Create immersive photo experiences with Google Photo Sphere," retrieved from http://geojournalism.org/2015/02/create-immersive-photo-experiences-with-google-photo-sphere/, on Mar. 27, 2017, 7 pages.

Tango (platform), Wikipedia, retrieved from https://en.wikipedia.org/wiki/Tango_(platform), on Jun. 12, 2018, 5 pages.

Zou et al. "LayoutNet: Reconstructing the 3D Room Layout from a Single RGB Image" in arXiv:1803.08999, submitted Mar. 23, 2018, 9 pages.

Lee et al. "RoomNet: End-to-End Room Layout Estimation" in arXiv:1703.00241v2, submitted Aug. 7, 2017, 10 pages.

Time-of-flight camera, Wikipedia, retrieved from https://en.wikipedia.org/wiki/Time-of-flight_camera, on Aug. 30, 2018, 8 pages.

Magicplan—Android Apps on Go . . . , retrieved from https://play.google.com/store/apps/details?id=com.sensopia.magicplan, on Feb. 21, 2018, 5 pages.

Pintore et al., "AtlantaNet: Inferring the 3D Indoor Layout from a Single 360 Image beyond the Manhattan World Assumption", ECCV 2020, 16 pages.

Cowles, Jeremy, "Differentiable Rendering", Aug. 19, 2018, accessed Dec. 7, 2020 at https://towardsdatascience.com/differentiable-rendering-d00a4b0f14be, 3 pages.

Yang et al., "DuLa-Net: A Dual-Projection Network for Estimating Room Layouts from a Single RGB Panorama", in arXiv:1811.11977[cs.v2], submitted Apr. 2, 2019, 14 pages.

Sun et al., "HoHoNet: 360 Indoor Holistic Understanding with Latent Horizontal Features", in arXiv:2011.11498[cs.v2], submitted Nov. 24, 2020, 15 pages.

Nguyen-Phuoc et al., "RenderNet: A deep convolutional network for differentiable rendering from 3D shapes", in arXiv:1806.06575[cs.v3], submitted Apr. 1, 2019, 17 pages.

Convolutional neural network, Wikipedia, retrieved from https://en.wikipedia.org/wiki/Convolutional_neural_network, on Dec. 7, 2020, 25 pages.

\* cited by examiner

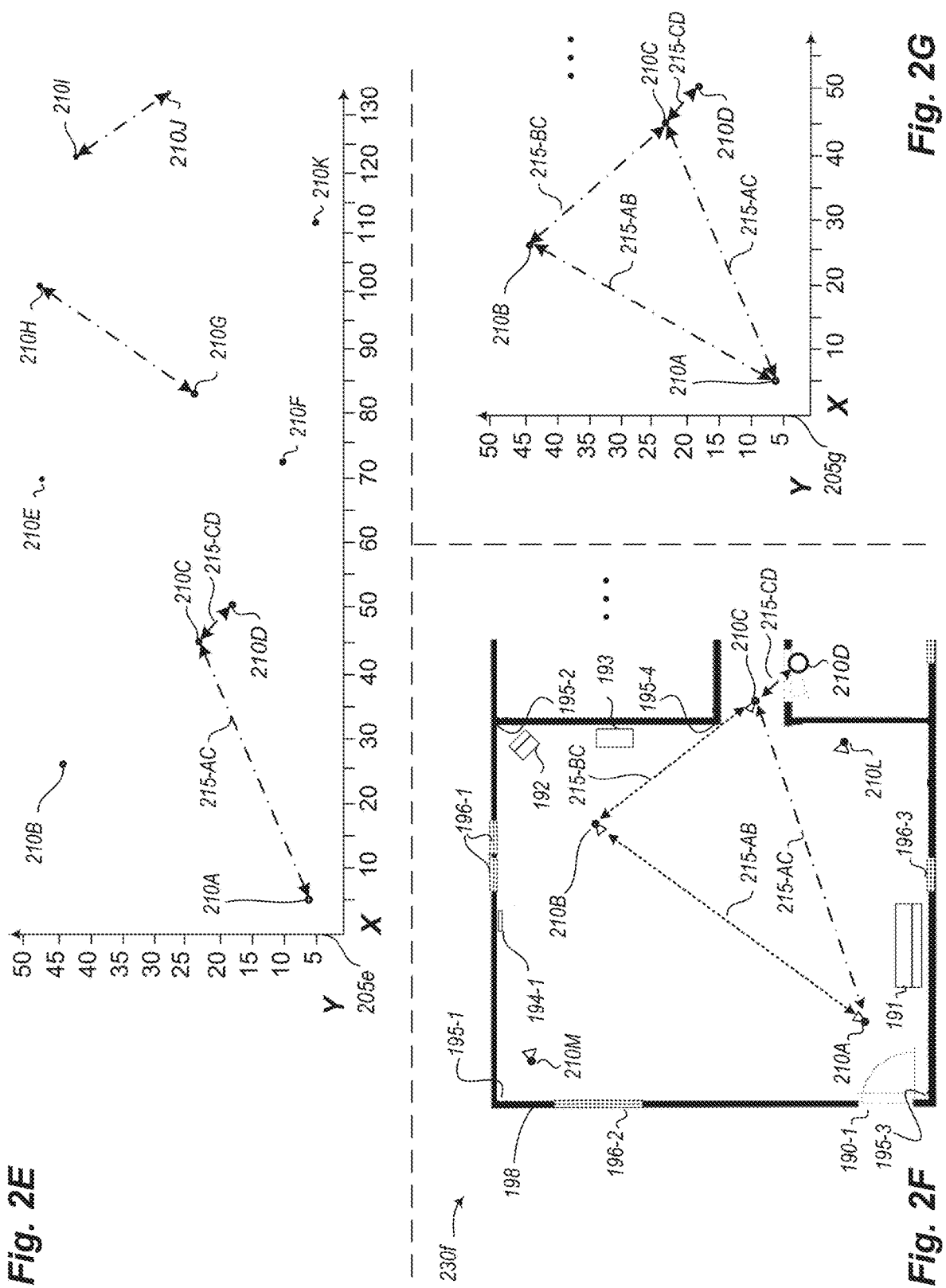

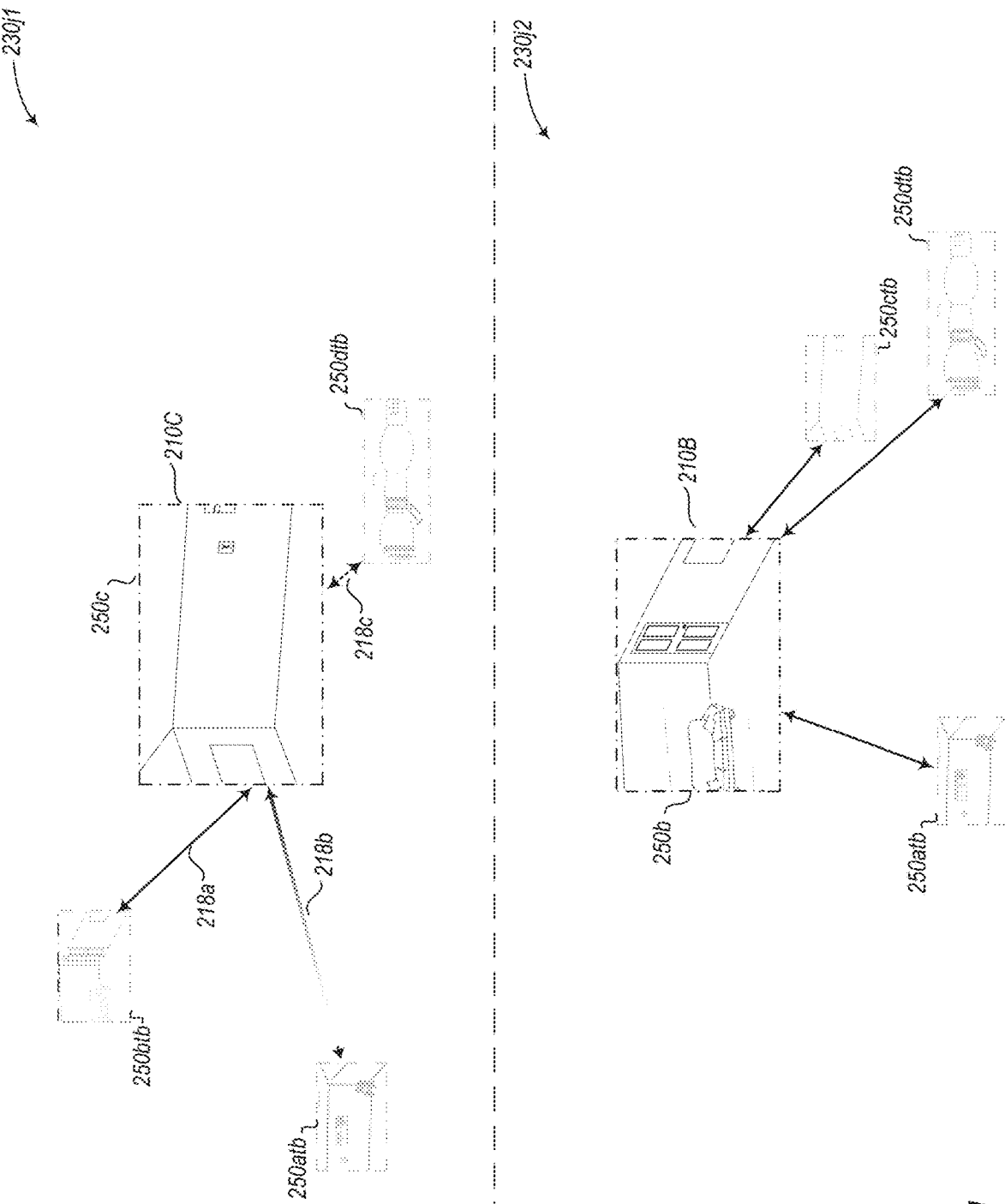

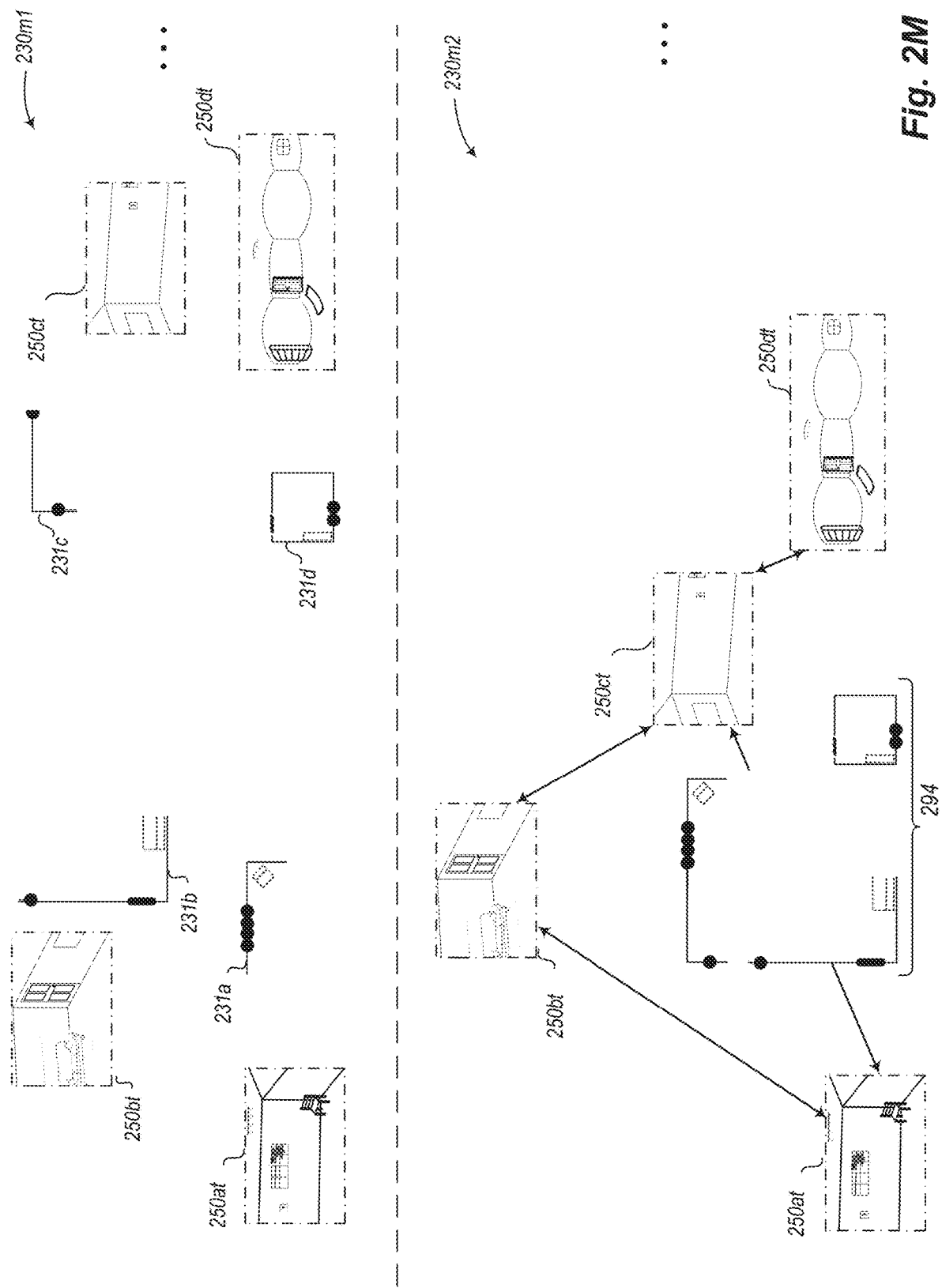

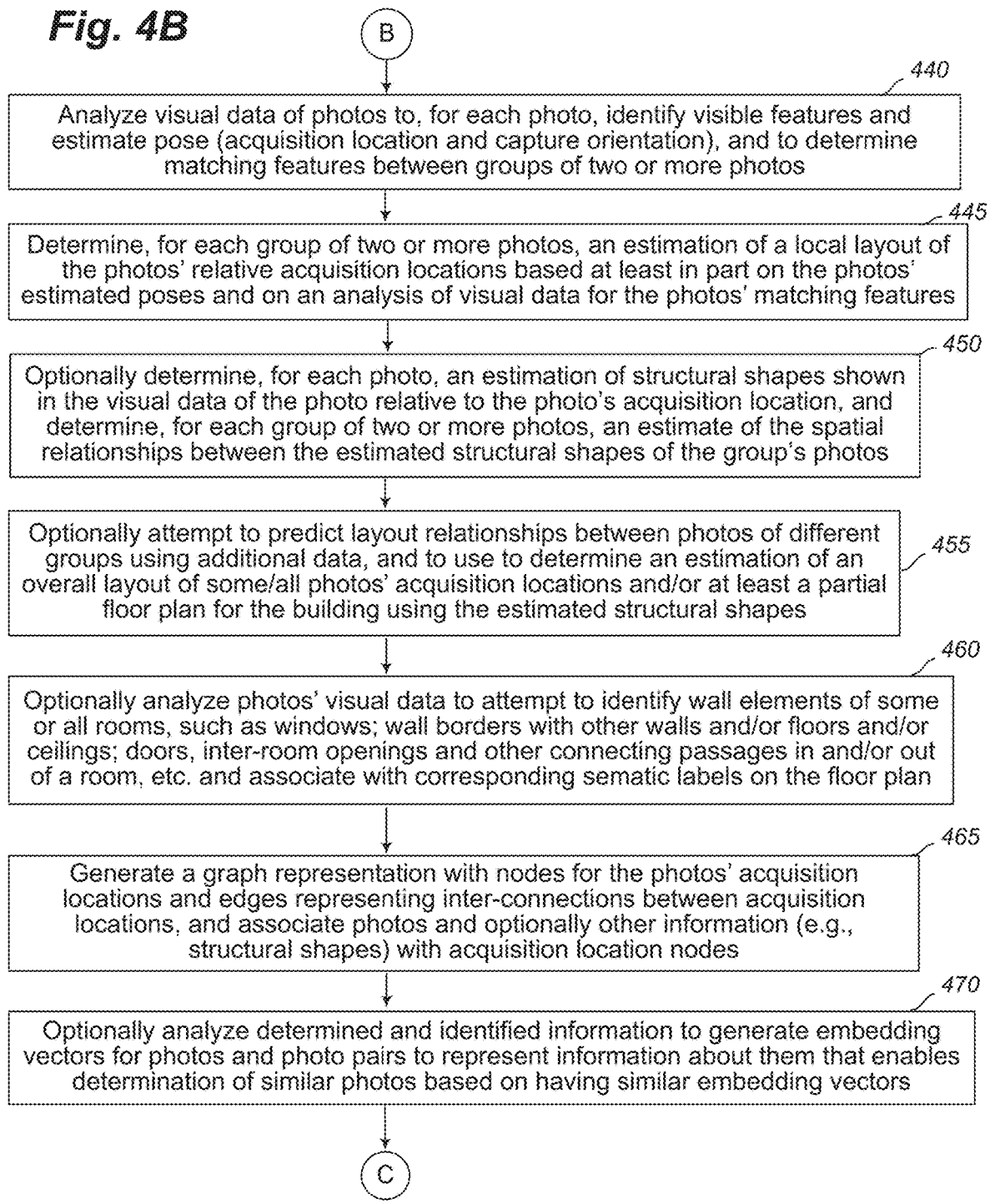

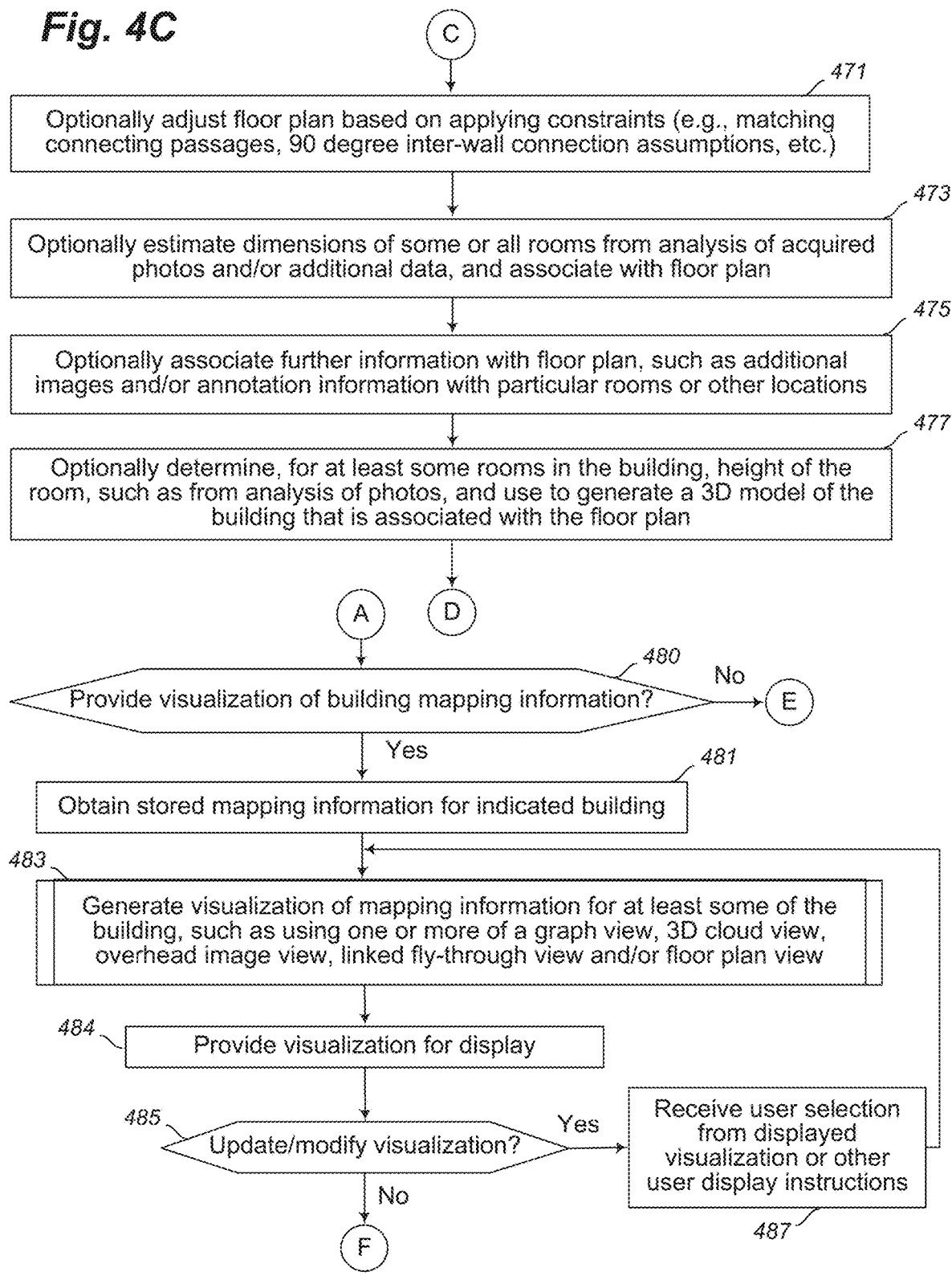

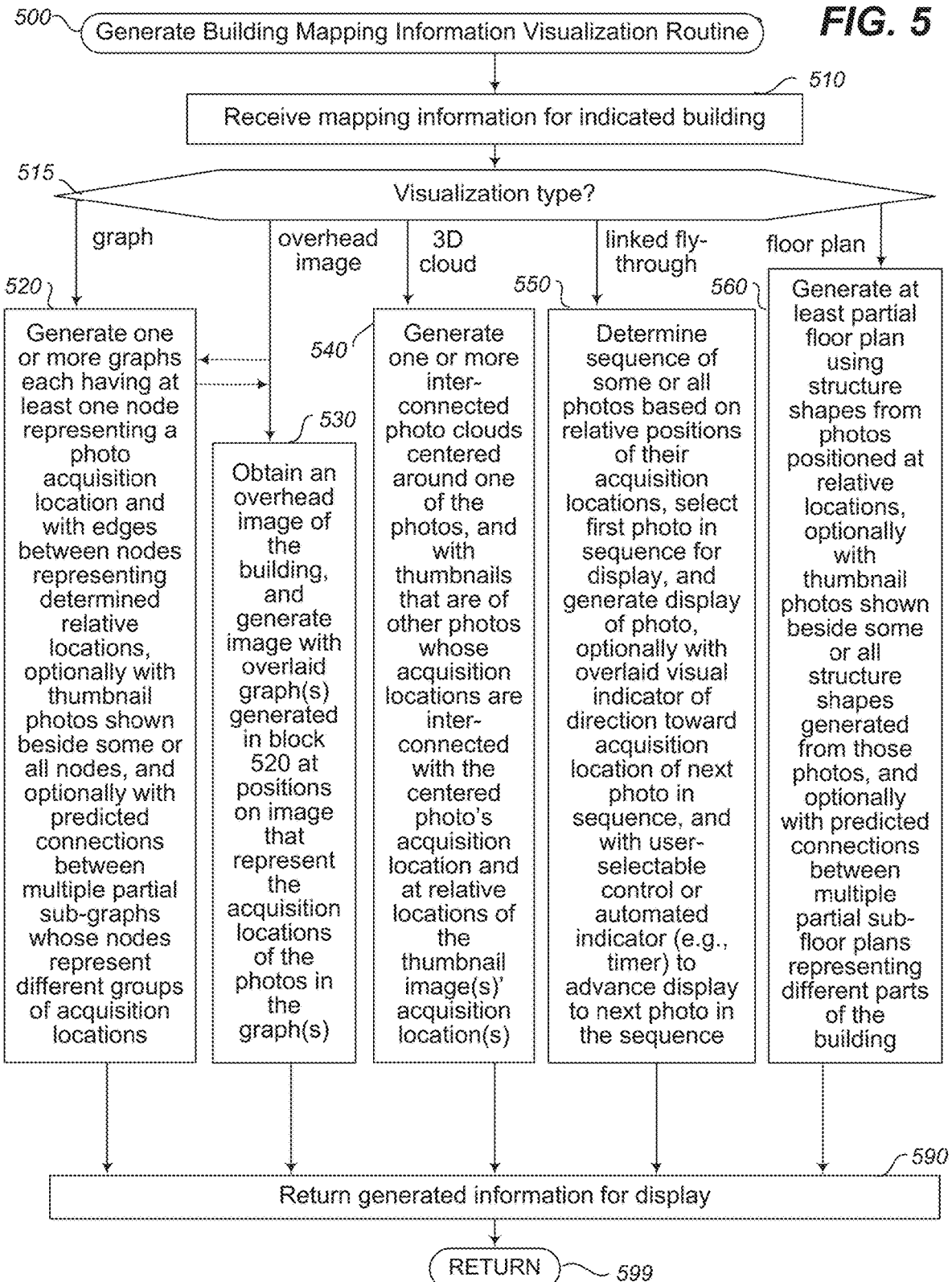

AUTOMATED MAPPING INFORMATION GENERATION FROM ANALYSIS OF BUILDING PHOTOS

CROSS-REFERENCE TO RELATED APPLICATIONS

This application is a continuation of co-pending U.S. patent application Ser. No. 17/459,820, filed Aug. 27, 2021 and entitled "Automated Mapping Information Generation From Analysis Of Building Photos", which is hereby incorporated by reference in its entirety.

TECHNICAL FIELD

The following disclosure relates generally to techniques for automatically generating mapping information for a defined area via analysis of visual data of photos of the area and for subsequently using the generated mapping information in one or more manners, such as to automatically generate and use a floor plan and/or other modeled representation of a building using photos from the building's interior.

BACKGROUND

In various fields and circumstances, such as architectural analysis, property inspection, real estate acquisition and development, remodeling and improvement services, general contracting and other circumstances, it may be desirable to view information about the interior of a house, office, or other building without having to physically travel to and enter the building, including to determine actual as—built information about the building rather than design information from before the building is constructed. However, it can be difficult to effectively capture, represent and use such building interior information, including to display visual information captured within building interiors to users at remote locations (e.g., to enable a user to fully understand the layout and other details of the interior, including to control the display in a user-selected manner). In addition, while a floor plan of a building may provide some information about layout and other details of a building interior, such use of floor plans has some drawbacks in certain situations, including that floor plans can be difficult to construct and maintain, to accurately scale and populate with information about room interiors, to visualize and otherwise use, etc.

BRIEF DESCRIPTION OF THE DRAWINGS

FIGS. 4A-4C illustrate an example embodiment of a flow diagram for a Mapping Information Generation and Visualization Manager (MIGVM) system routine in accordance with an embodiment of the present disclosure.

FIG. 5 illustrates an example embodiment of a flow diagram for a Generate Building Mapping Information Visualization routine in accordance with an embodiment of the present disclosure.

DETAILED DESCRIPTION

Figure 1A:
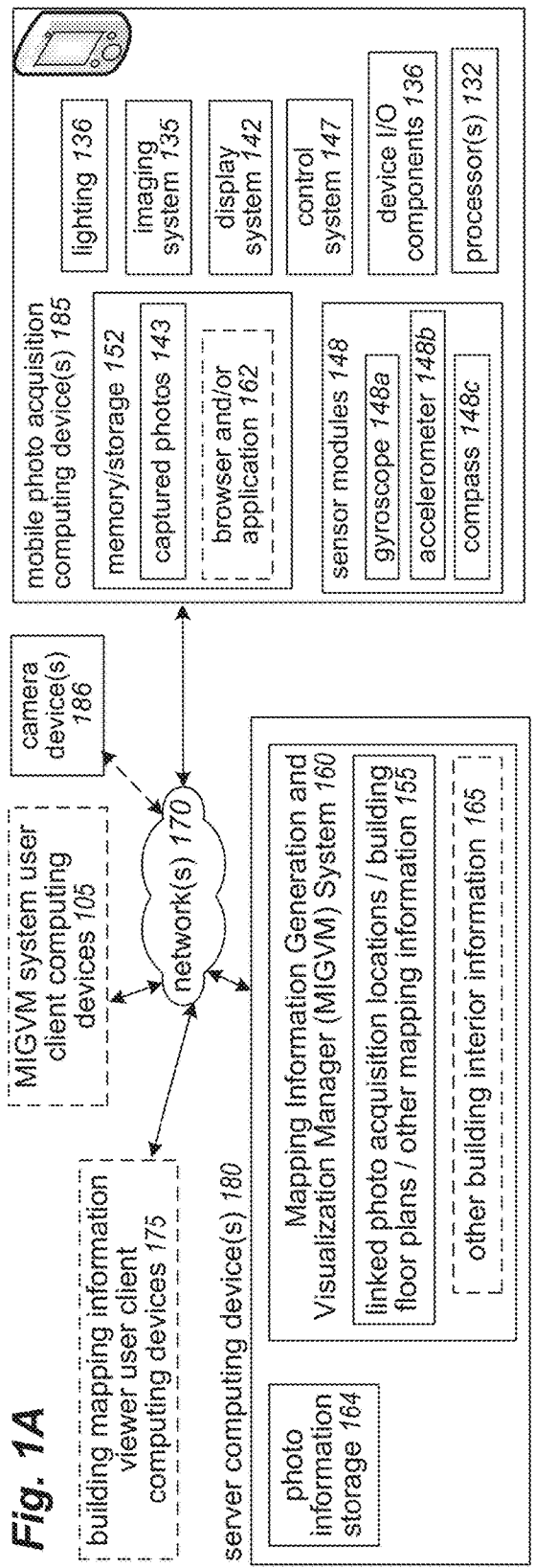
FIGS. 1A-1B are diagrams depicting an exemplary building interior environment and computing system(s) for use in embodiments of the present disclosure, including to automatically analyze visual data of photos for multiple acquisition locations in the building to determine mapping information for the building layout, and to further present or otherwise use the determined building mapping information.

The present disclosure describes techniques for using computing devices to perform automated operations related to generating mapping information for a defined area using photos of the area, and for subsequently using the generated mapping information in one or more further automated manners. In at least some embodiments, the defined area includes an interior of a multi-room building (e.g., a house, office, etc.), and the generated information includes at least a partial floor plan of the building and/or other modeled representation of the building interior, such as from an automated analysis of multiple photos acquired at various acquisition locations within the building and optionally other data acquired related to the building—in at least some such embodiments, the generating is further performed without having or using measured depth information about distances from the photos' acquisition locations to walls or other objects in the surrounding building. The generated floor plan and/or other generated mapping-related information may be further used in various manners in various embodiments, including for controlling navigation of mobile devices (e.g., autonomous vehicles), for display on one or more client devices in corresponding GUIs (graphical user interfaces) using one or more types of visualizations, etc. Additional details are included below regarding the automated generation, visualization and use of mapping information, and some or all of the techniques described herein may, in at least some embodiments, be performed via automated operations of a Mapping Information Generation and Visualization Manager ("MIGVM") system, as discussed further below.

In at least some embodiments and situations, some or all of the photos acquired for a building may be perspective photos that are each acquired without use of a wide-angle lens (e.g., perspective photos with a field of view at or below 60° or 90°) at one of multiple acquisition locations in or around the building. In some such embodiments, supplemental visual data for the building may be further captured and used, such as one or more videos and/or one or more panorama images (e.g., images with a field of view greater than 90°, such as 180° or 360° of horizontal visual coverage around a vertical axis, and optionally represented in a non-perspective spherical coordinate system, and optionally converted into a planar perspective coordinate system for analysis and/or display), although in other embodiments no such supplemental visual data may be used. Furthermore, supplemental acquisition metadata regarding the capture of such photos may be obtained and used in various manners in some embodiments, such as data acquired from IMU (inertial measurement unit) sensors or other sensors of a mobile device as photos are acquired at acquisition locations and/or as the mobile device is carried by a user or otherwise moved between acquisition locations, although in other embodiments no such acquisition metadata may be used. Various other types of supplemental information may also be gathered and used in some embodiments, and additional details are included below related to the acquisition and usage of photos and optionally other related information for a building, with some or all of the related activities being, in at least some embodiments, performed via automated operations of an Automated Photo Capture ("APC") system, as discussed further below.

After multiple photos and optionally other supplemental information are acquired for a building interior (and optionally an exterior of the building), the generation of mapping information for the building (e.g., at least a partial floor plan, linked groups of photos at determined relative positions, etc.) may include automatically determining relative positions of sub-groups of the photos' acquisition locations to each other in a common local coordinate system or other common local frame of reference for that sub-group, and optionally attempting to predict or otherwise determine relative global positions of all the acquisition locations to each other in a common global coordinate system or other common global frame of reference. Once such relative positions are determined, directions and relative distances between some or all pairs of acquisition locations may be determined. With respect to such relative distances, the determination may, for example, include identifying that first and second acquisition locations are twice as far from each other as third and fourth acquisition locations, but without knowing the actual distances between those acquisition locations. Similarly, with respect to such relative directions, the determination may, for example, include identifying that a first acquisition location is to the right of a second acquisition location in a 60° direction (e.g., using the orientation of an estimated pose of a photo acquired at the second acquisition location as a starting direction) and that a third acquisition location is to the left of the second acquisition location in a 45° direction, but without knowing the actual geographical positions of any of those acquisition locations. The determination of the relative positions of some or all of the photos' acquisition locations may be performed in various manners in various embodiments, including to analyze visual data from the photos in order to inter-connect some pairs of photos and/or the corresponding pairs of those photos' acquisition location (e.g., by identifying common matching features in two different photos to use in determining their relative positions to each other, such as based in part on estimated pose information to identify the locations and orientations from which those photos are captured), and to optionally use other supplemental information if available (e.g., from metadata about acquisition of the photos; from other visual data; from other information about the building, such as an overview image of the building or other information about the building such as shape and/or dimensions; etc.). Additional details are included below regarding determining relative positions of photos' acquisition locations to each other in a common coordinate system or other common frame of reference, including with respect to FIGS. 2A-2G and their associated descriptions.

After determining relative positions of at least some of the photos' acquisition locations to each other, such as to have multiple separate sub-groups each having a distinct subset of one or more of the acquisition locations (e.g., with each subgroup's acquisition locations each having at least one determined inter-connection to another acquisition location of the sub-group and not having any inter-connections to other acquisition locations that are not part of the subgroup), the described techniques of the MIGVM system may further include automated operations to generate a separate sub-graph for each subgroup, with each such sub-graph including a node for each acquisition location in that subgroup and including edge inter-connections between pairs of two nodes for which relative position information is determined (e.g., with each such inter-connection between two nodes representing the determined relative position being those nodes' two acquisition locations, such as the determined relative direction and distance between those two acquisition locations). In some such embodiments, the multiple sub-graphs may in the aggregate include all of the acquisition locations, such as to form a complete graph of the building's acquisition locations if the multiple sub-graphs were inter-connected. Additional information may further be associated with some or all such graph nodes, such as information about one or more photos acquired at a node's corresponding acquisition location, information about a surrounding room, etc. In addition, the created sub-graphs may further be used as part of at least some visualizations of the generated mapping information for the building, as discussed in greater detail elsewhere herein, including with respect to FIGS. 2I-2M and their associated descriptions.

In addition, the generation of at least a partial floor plan for the building, if performed in a particular embodiment, may further include automatically determining, for each room in the building and using one or more photos whose visual data includes some of an interior of that room, partial structural shapes that are visible in those photos for that rooms, such as to correspond to structural elements such as one or more walls, floors, ceilings, inter-room passages (e.g., doorways and other inter-wall openings), windows, fireplaces, islands, countertops, etc., and optionally to correspond to at least some non-structural elements (e.g., appliances, furniture, etc.). The generation may further determine relative spacing between multiple partial structural shapes for a room, such as based at least in part on determined relative positions of the acquisition locations of those photos and estimated relative distances and directions of those structural shapes from those acquisition locations—in some cases, the determination of the relative spacing may be further performed between partial structural shapes of multiple rooms, such as based at least in part on the positions of any connecting passages between the rooms and/or using one or more photos each having visual data that includes parts of multiple rooms. Such connecting inter-room passages may include one or more of doorways, windows, stairways, non-room hallways, etc., and the automated analysis of the photos' visual data may identify such features based at least in part on identifying the outlines of the passages, identifying different content within the passages than outside them (e.g., different colors, shading, light intensities, heights, etc.), etc. The generation of at least a partial floor plan for the building may also in some embodiments include applying constraints of one or more types, including based on connecting passages between rooms (e.g., to co-locate or otherwise match connecting passage information in two or more rooms that the passage connects), and optionally constraints of other types (e.g., locations of the building exterior where rooms should not be located, shapes of adjacent rooms, overall dimensions of the building and/or of particular rooms in the building, an exterior shape of some or all of the building, etc.). In some embodiments and in situations with a building having multiple stories or otherwise having multiple levels, the connecting passage information may further be used to associate corresponding portions on different sub-floor plans of different floors or levels. It will be appreciated that if sufficient photos are captured to, in the aggregate, have visual data of all indoor structural surfaces of a building, the generated floor plan may be a complete floor plan—in other situations, a predicted complete floor plan may be generated by predicting missing parts from one or more partial floor plans. In addition, in at least some embodiments, the automated analysis of the photos may further identify some or all such information and/or additional information (e.g., an estimated room type) by using machine learning (e.g., via a corresponding trained machine learning model), such as to estimate a room type by identifying features or characteristics corresponding to different room types—in other embodiments, at least some such information may be obtained in other manners, such as to receive corresponding information from one or more users (e.g., based on user annotations of one or more photos in the room, such as to identify borders between walls, ceiling and floor; based on other user input, such as adjustments to automatically determined information; etc.). In some embodiments, the automated analysis of the photos' visual data may further identify additional information in one or more photos, such as dimensions of objects (e.g., objects of known size) and/or of some or all of the rooms, as well as estimated actual distances of photos' acquisition locations from walls or other features in their rooms.

As noted above, the generated mapping information for a building may be used to provide various visualizations in various embodiments, including using generated sub-graphs of inter-connected acquisition locations and/or at least a partial floor plan. Such visualizations may, in at least some embodiments, be displayed to one or more users on one or more client devices in a GUI, and may optionally include visible user-selectable controls and other user-selectable indicators that a particular user may use to modify the controls of the GUI, such as to change the display to new selected information or to otherwise modify a display of current information.

As a first non-exclusive example, in some embodiments a visualization may be used that displays one or more generated sub-graphs each having one or more inter-connected nodes representing a respective acquisition location for one or more related buildings (e.g., multiple buildings on a single property, such as a primary building and one or more associated out buildings, multiple primary buildings, etc.), such as with a visual representation of each node. The display of a sub-graph with multiple inter-connected nodes may further include placing the visual representation of each node at a position corresponding to the determined relative positions of that node's acquisition location with respect to the acquisition locations for one or more other nodes of the sub-graph to which that node's acquisition location is linked. In some embodiments, edges may further be displayed between the nodes of a sub-graph whose acquisition locations are linked, optionally with visual indicators to indicate determined relative position information (e.g., relative or actual directions between two nodes' acquisition locations, relative or actual distances between two nodes' acquisition locations, etc.). In some embodiments, additional information may be displayed for each node, such as to display visual data corresponding to one or more photos captured at that node's acquisition location—such visual data may have various forms in various situations, such as a thumbnail image of such a photo or other reduced size version of such a photo, a full size version of such a photo, a partial version showing only some of such a photo (e.g., a cropped image), a blurred or otherwise obscured version of a full size or reduced size image of the photo. In addition, if multiple sub-graphs are simultaneously displayed, and if predicted inter-connections between two or more such sub-graphs are available (e.g., relative positions of two or more nodes in different sub-graphs), additional visual indicators of such predicted inter-connections may be provided in at least some such embodiments, such as to further determine the positions of the two or more such nodes to reflect the relative positions of those two or more such nodes, and/or to show visual indications of such inter-connections between those two or more such nodes and/or their sub-graphs (e.g., in a manner to visually distinguish such inter-connections from other edge inter-connections within sub-graphs, if also visually shown). Some or all of the displayed elements may further be user-selectable in order to obtain an updated display of additional information about the selected element, such as for nodes, edge connections and visual data, and such as to display additional information about corresponding acquisition locations and/or photos. Additional details are included elsewhere herein, including with respect to the example of FIG. 2I and associated text.

As a second non-exclusive example, in some embodiments a visualization may be used that displays, for each of one or more generated sub-graphs for one or more related buildings, a cloud having displayed information for each node of the sub-graph to represent a respective acquisition location, with the displayed information for each node including visual data from at least one photo captured at that node's acquisition location (e.g., a thumbnail image of or other reduced size version of such a photo, a full size version of such a photo, a partial version showing only some of such a photo, a blurred or otherwise obscured version of a full size or reduced size image of the photo, etc.). In some embodiments, for a sub-graph with multiple inter-connected nodes, the display of a corresponding cloud may include selecting one node whose visual data is displayed more prominently (e.g., centered and in a larger size than the visual data for other nodes of the sub-graph, such as a full-size version of a photo acquired at that node's acquisition location), with the other nodes of that sub-graph having their visual data shown at positions corresponding to those nodes' acquisition locations' relative positions to the acquisition location of the selected node, and shown less prominently than that of the visual data of the selected node (e.g., in a smaller size than the visual data for that of the selected node, such as a thumbnail image, and/or with some or all of the visual data blurred or otherwise obscured). In some embodiments, edges may further be displayed between the displayed information for the selected node and the other nodes of a sub-graph whose acquisition locations are linked, optionally with visual indicators to indicate determined relative position information. In some embodiments, if clouds are simultaneously displayed for multiple sub-graphs, and if predicted inter-connections between two or more such sub-graphs are available (e.g., relative positions of two or more nodes in different sub-graphs), additional visual indicators of such predicted inter-connections may be provided in at least some such embodiments, such as to further determine the positions of the two or more such nodes to reflect the relative positions of those two or more such nodes, and/or to show visual indications of such inter-connections between those two or more such nodes and/or their sub-graphs (e.g., in a manner to visually distinguish such inter-connections from other edge inter-connections within sub-graphs, if also visually shown). Some or all of the displayed elements may further be user-selectable in order to obtain an updated display of additional information about the selected element, such as for visual data and other displayed node information (if any), edge connections, etc., and such as to display additional information about corresponding acquisition locations and/or photos (e.g., to show a new cloud using the visual data for a new selected acquisition location or photo as the centered and prominent display, with the displayed information for the other nodes of that sub-graph optionally being located to reflect their acquisition locations' relative positions to the new selected node's acquisition location and/or being shown in a deemphasized manner). Additional details are included elsewhere herein, including with respect to the example of FIG. 2J and associated text.

As a third non-exclusive example, in some embodiments a visualization may be used that displays one or more generated sub-graphs each having one or more inter-connected nodes representing a respective acquisition location for one or more related buildings, such as with a visual representation of each node, and with the displayed sub-graph(s) overlaid on one or more images of the building(s) to which the sub-graph(s) correspond. For example, an overhead image of the building(s) may be obtained, such as from above a top of the building(s) (e.g., an image from a satellite, overhead drone or plane, etc.), an exterior of the some or all of the building(s) may be determined from the overhead image, and the display of a sub-graph with multiple inter-connected nodes may include placing the visual representation of each node at a location corresponding to the determined relative positions of that node's acquisition location with respect to the acquisition locations for one or more other nodes of the sub-graph to which that node's acquisition location is linked, with the locations of those nodes further selected relative to the exterior of the building(s) (e.g., to show an acquisition location's node's information at an estimated spot within the building(s) for that acquisition location). The one or more sub-graphs may further be displayed in various manners, as discussed above with respect to the first non-exclusive example and elsewhere herein. Additional details are included elsewhere herein, including with respect to the example of FIG. 2K and associated text.

As a fourth non-exclusive example, in some embodiments a visualization may be used that displays, for each of one or more generated sub-graphs each having multiple nodes with associated acquisition locations in one or more buildings, information corresponding to a sequence of those nodes and/or their associated acquisition locations. In particular, a determination of such a sequence may be made in various manners, such as using the inter-connections between those nodes and/or their acquisition locations, and/or by using estimated positions of those acquisition locations within the building(s). In some embodiments, the display may include showing visual data associated with a first acquisition location in the sequence (e.g., a full size photo acquired at that acquisition location), optionally with visual information overlaid on that visual data to show a direction toward a next acquisition location in the sequence. In such embodiments, the display may proceed to consecutively display visual data for successive acquisition locations in the sequence in a similar manner, such as in an automated manner (e.g., after a current photo or other visual data is displayed for a specified amount of time or one or more other defined criteria are satisfied) or as initiated by a user (e.g., based on a selection by the user of information in the display or other instruction received from the user). In some embodiments, the display of information for such a sub-graph with multiple inter-connected nodes may include (whether instead of or in addition to displaying consecutive visual data for the successive nodes' acquisition locations, such as before the consecutive visual data is displayed) simultaneously showing visual representations of each node (e.g., as discussed above with respect to the first non-exclusive example and elsewhere herein) along with one or more visual indicators to indicate the sequence of those nodes' acquisition locations. Some or all of the displayed elements may further be user-selectable in order to obtain an updated display of additional information about the selected element, in a manner similar to that discussed elsewhere herein. Additional details are included elsewhere herein, including with respect to the example of FIG. 2L and associated text.

As a fifth non-exclusive example, in some embodiments a visualization may be used that displays, for each of one or more generated sub-graphs each having multiple nodes with associated acquisition locations in one or more buildings, information corresponding to at least a partial floor plan generated using visual data of the photos acquired at the acquisition locations of those nodes, optionally with additional information (e.g., visual data for each node or other visual representation of each node, such as discussed above with respect to the first non-exclusive example and elsewhere herein). The display of a floor plan corresponding to a sub-graph with multiple inter-connected nodes may further obtaining structural shapes visible in the photos acquired at the multiple nodes' acquisition locations, and displaying a visual representation of some or all such structural shapes at a position corresponding to the determined relative spacing of that structural shape with respect to the other structural shapes being shown. Information for the one or more sub-graphs may further be displayed in various manners, as discussed above with respect to the first non-exclusive example and elsewhere herein, including to display one or more structural shapes determined from an acquisition location's photo(s) adjacent to or otherwise proximate to displayed visual data for the photo(s) and/or other displayed visual representations for those acquisition locations. Some or all of the displayed elements may further be user-selectable in order to obtain an updated display of additional information about the selected element, in a manner similar to that discussed elsewhere herein. Additional details are included elsewhere herein, including with respect to the example of FIG. 2M and associated text.

In some embodiments, one or more types of additional processing may be performed, such as to determine additional mapping-related information for one or more related building(s) and to optionally display such additional mapping-related information in conjunction with one or more of the example visualizations discussed above and elsewhere herein. As one example, one or more types of additional information about a building may be received, such as additional photos, annotations or other descriptions of particular rooms or other locations, overall dimension information, etc., and associated with corresponding acquisition locations of captured photos (e.g., with particular locations in a floor plan). As another example, in at least some embodiments, additional processing of photos is performed to determine estimated distance information of one or more types, such as to measure sizes in photos of objects of known size, and use such information to estimate room width, length and/or height. Estimated size information for one or more rooms may be associated with the floor plan, stored and optionally displayed—if the size information is generated for all rooms within a sufficient degree of accuracy, a more detailed floor plan of the building may further be generated, such as with sufficient detail to allow blueprints or other architectural plans to be generated. In addition, if height information is estimated for one or more rooms, a 3D (three-dimensional) model of some or all of the 2D (two-dimensional) floor plan may be created, associated with the floor plan, stored and optionally displayed. Such generated floor plans and optionally additional associated information may further be used in various manners, as discussed elsewhere herein.

The described techniques provide various benefits in various embodiments, including to allow floor plans and/or other modeled representations of multi-room buildings and other structures to be automatically generated from photos acquired in the buildings or other structures, including without having or using measured depth information from depth sensors or other distance-measuring devices about distances from photos' acquisition locations to walls or other objects in a surrounding building or other structure—such described techniques may further provide more complete and accurate room shape information and in greater varieties of environmental conditions (e.g., in situations in which objects in a room occlude a single photo's view of at least some of the walls and/or floor and/or ceiling but in which the combination of the views from multiple photos eliminates or reduces that problem, etc.). Non-exclusive examples of additional such benefits of the described techniques include the following: the ability to analyze the visual data of a target photo to detect objects of interest in the enclosing room (e.g., structural wall elements, such as windows, doorways and other wall openings, etc.) and to determine locations of those detected objects in a determined room shape for the enclosing room; the ability to analyze additional captured data (e.g., movement data from one or more IMU sensors, visual data from one or more image sensors, etc.) to determine a travel path of an image acquisition device in multiple rooms, to identify wall openings (e.g., doorways, staircases, etc.) based at least in part on that additional data (and optionally on visual data of one or more target photos acquired in the one or more rooms), and to optionally further use such information about identified wall openings to position together determined 3D room shapes of the multiple rooms; the ability to inter-connect multiple target photos and/or their acquisition locations and to display at least one of the target photos with one or more visual indicators in one or more directions of one or more other photos at one or more other linked acquisition locations (e.g., user-selectable visual indicators that when selected cause the display of a respective other one of the photos); etc. Furthermore, such automated techniques allow such a floor plan and/or other modeled representation to be generated much more quickly than previously existing techniques, and in at least some embodiments with greater accuracy, based at least in part on using information acquired from the actual building environment (rather than from plans on how the building should theoretically be constructed), as well as enabling the capture of changes to structural elements that occur after a building is initially constructed (e.g., remodels and other renovations). Such described techniques further provide benefits in allowing improved automated navigation of a building by mobile devices (e.g., semi-autonomous or fully-autonomous vehicles), including to significantly reduce their computing power used and time used to attempt to otherwise learn a building's layout. In addition, in some embodiments the described techniques may be used to provide an improved GUI in which a user may more accurately and quickly obtain information about a building's interior (e.g., for use in navigating that interior), including in response to search requests, as part of providing personalized information to the user, as part of providing value estimates and/or other information about a building to a user, etc. Various other benefits are also provided by the described techniques, some of which are further described elsewhere herein.

For illustrative purposes, some embodiments are described below in which specific types of information are acquired, used and/or presented in specific ways for specific types of structures and by using specific types of devices—however, it will be understood that the described techniques may be used in other manners in other embodiments, and that the invention is thus not limited to the exemplary details provided. As one non-exclusive example, while specific types of data structures (e.g., graphs of inter-connected photos and/or photos' acquisition locations, 2D floor plans, 2.5D or 3D computer models, queues, caches, databases, etc.) are generated and used in specific manners in some embodiments, it will be appreciated that other types of information to describe buildings and their acquisition locations may be similarly generated and used in other embodiments, including for buildings (or other structures or layouts) separate from houses, and that photos and other building information may be used in other manners in other embodiments. As another non-exclusive example, while floor plans for houses or other buildings may be used for display to assist viewers in navigating the buildings, generated mapping information may be used in other manners in other embodiments. As yet another non-exclusive example, while some embodiments discuss obtaining and using data from one or more types of image acquisition devices (e.g., a mobile computing device and/or a separate camera device), in other embodiments the one or more devices used may have other forms, such as to use a mobile device that acquires some or all of the additional data but does not provide its own computing capabilities (e.g., an additional 'non-computing' mobile device), multiple separate mobile devices that each acquire some of the additional data (whether mobile computing devices and/or non-computing mobile devices), etc. In addition, the term "building" refers herein to any partially or fully enclosed structure, typically but not necessarily encompassing one or more rooms that visually or otherwise divide the interior space of the structure—non-limiting examples of such buildings include houses, apartment buildings or individual apartments therein, condominiums, office buildings, commercial buildings or other wholesale and retail structures (e.g., shopping malls, department stores, warehouses, etc.), supplemental structures on a property with another main building (e.g., a detached garage or shed on a property with a house), etc. The term "acquire" or "capture" as used herein with reference to a building interior, acquisition location, or other location (unless context clearly indicates otherwise) may refer to any recording, storage, or logging of media, sensor data, and/or other information related to spatial characteristics and/or visual characteristics and/or otherwise perceivable characteristics of the building interior or subsets thereof, such as by a recording device or by another device that receives information from the recording device. As used herein, the term "panorama photo" or "panorama photo") may refer to a visual representation that is based on, includes or is separable into multiple discrete component photos originating from a substantially similar physical location in different directions and that depicts a larger field of view than any of the discrete component photos depict individually, including photos with a sufficiently wide-angle view from a physical location to include angles beyond that perceivable from a person's gaze in a single direction (e.g., greater than 120° or 150° or 180°, etc.). The term "sequence" of acquisition locations, as used herein, refers generally to two or more acquisition locations that are each visited at least once in a corresponding order, whether or not other non-acquisition locations are visited between them, and whether or not the visits to the acquisition locations occur during a single continuous period of time or at multiple different times, or by a single user and/or device or by multiple different users and/or devices. In addition, various details are provided in the drawings and text for exemplary purposes, but are not intended to limit the scope of the invention. For example, sizes and relative positions of elements in the drawings are not necessarily drawn to scale, with some details omitted and/or provided with greater prominence (e.g., via size and positioning) to enhance legibility and/or clarity. Furthermore, identical reference numbers may be used in the drawings to identify the same or similar elements or acts.

Figure 2A:
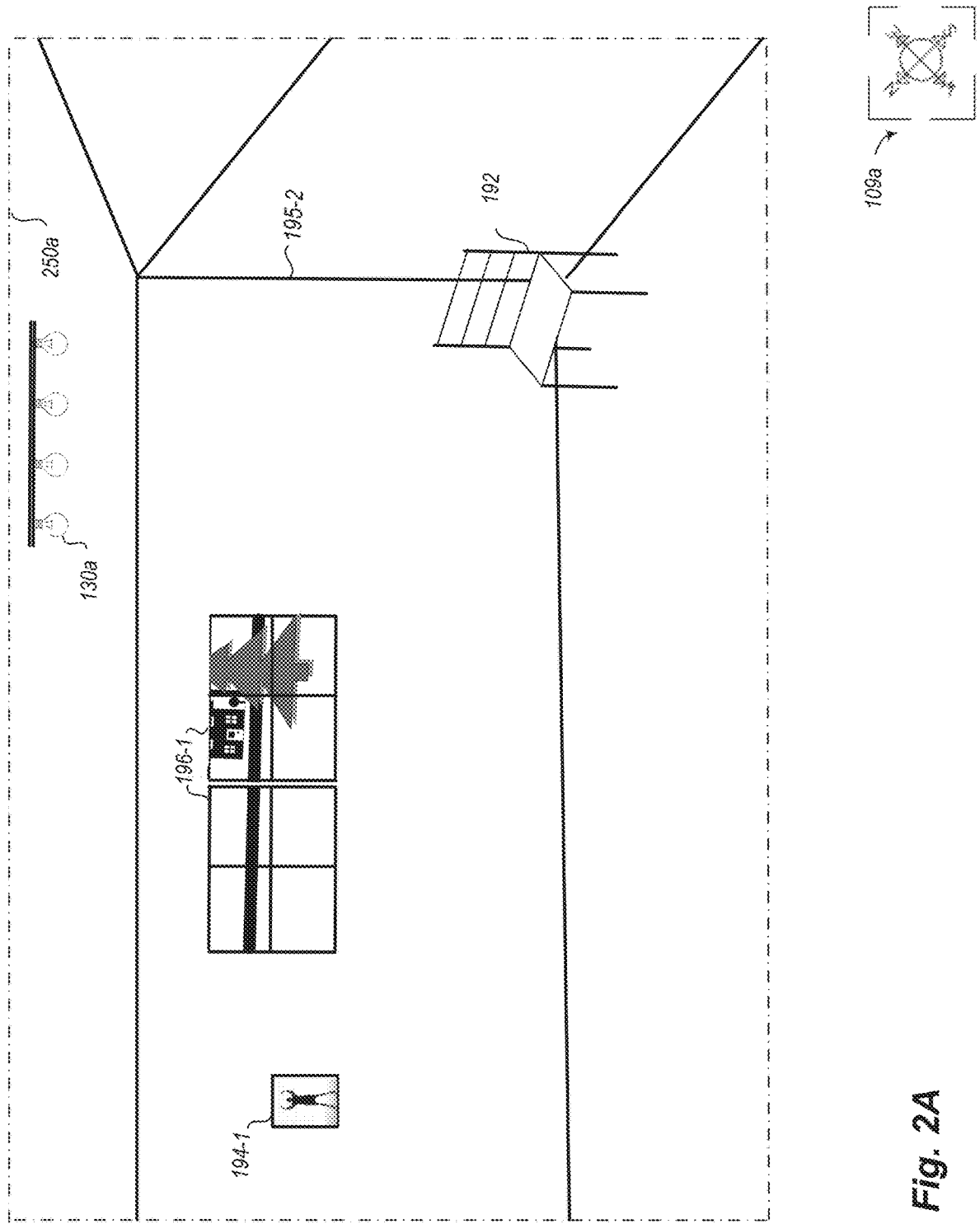
FIGS. 2A-2N illustrate examples of acquiring photos at multiple acquisition locations for a building, of automated operations to analyze visual data of the photos to determine mapping information for the building layout, and of subsequently using the determined building mapping information in one or more automated manners.
Figure 2B:
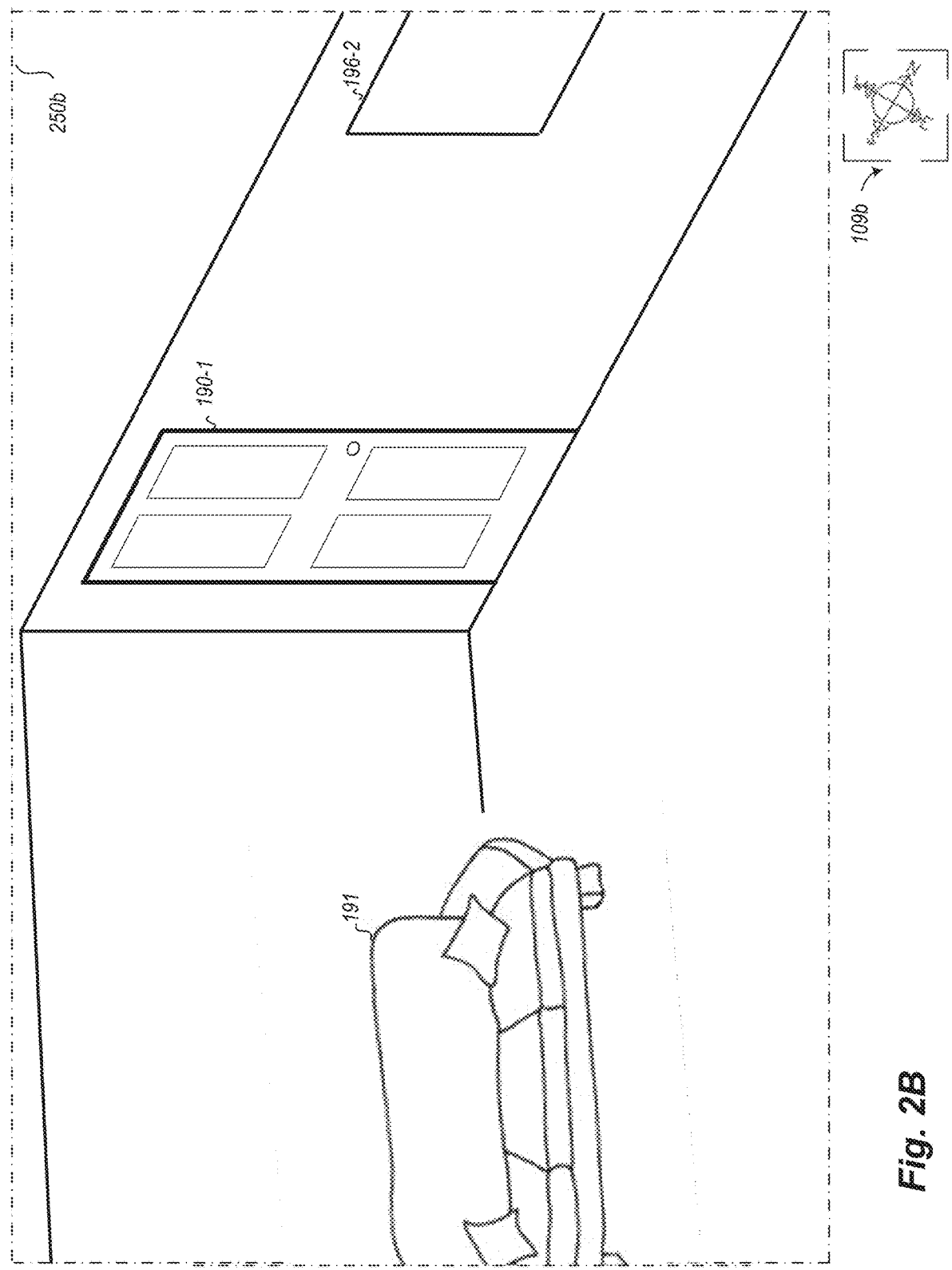
Figure 2C:
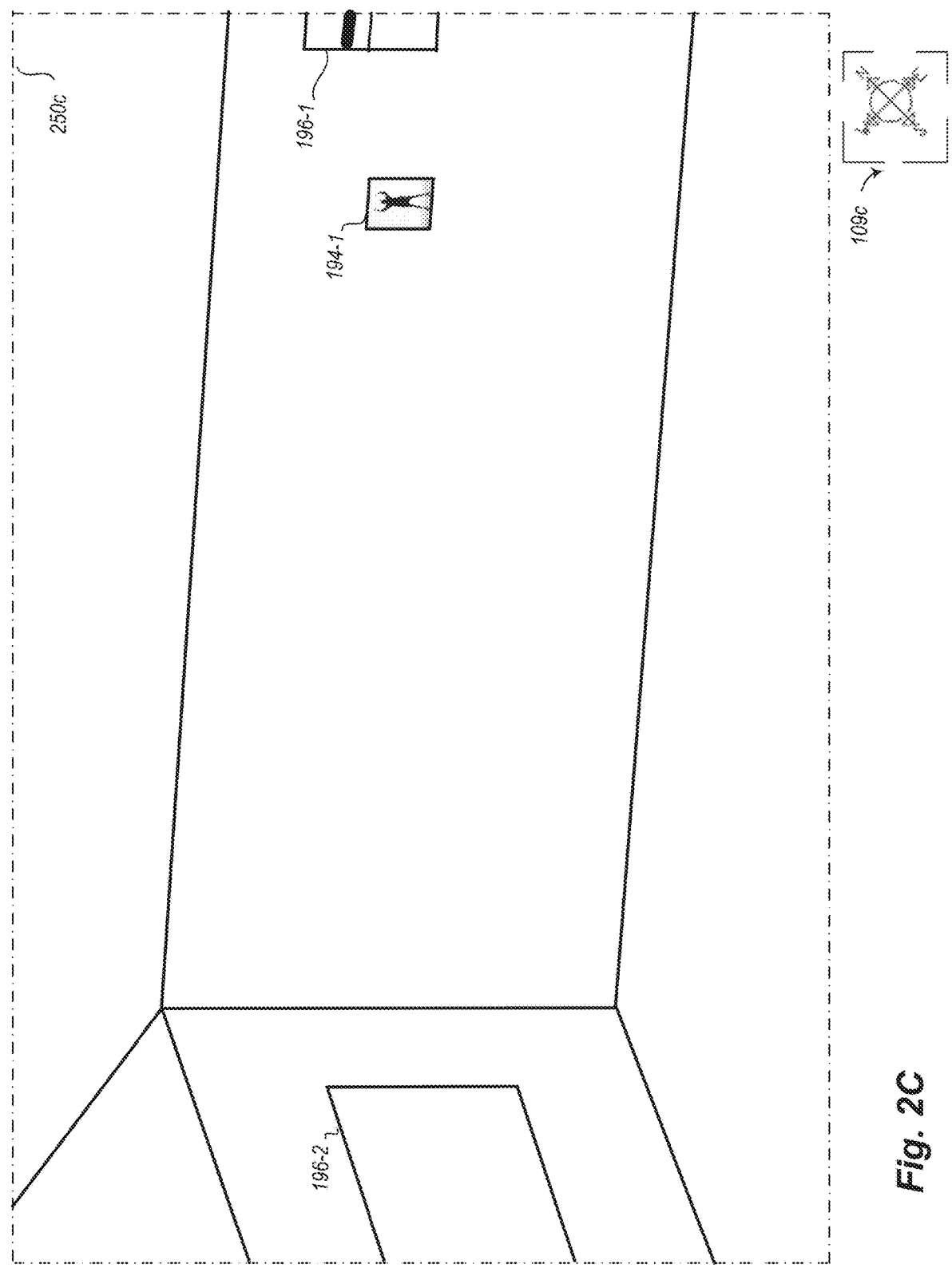

FIG. 1A is an example block diagram of various computing devices and systems that may participate in the described techniques in some embodiments. In particular, after photos are captured, such as by one or more mobile image acquisition computing devices 185 and/or one or more camera devices 186, the photos and associated information for them (e.g., annotations, metadata, inter-connection linking information, etc.) may be stored with information 164 on one or more server computing systems 180 for later use. Such information 164 may further be included as part of captured building interior information 165 that is subsequently used by an MIGVM (Mapping Information Generation and Visualization Manager) system 160 executing on one or more server computing systems 180 (whether on the same or different server computing systems on which the information 164 is stored) to generate corresponding building mapping information 155 (e.g., sub-graphs of linked acquisition locations, floor plans, etc.). FIG. 2N shows one example of such a floor plan, as discussed further below, and additional details related to the automated operation of the MIGVM system are included elsewhere herein, including with respect to FIGS. 4A-4C and 5. The captured building interior information 165 may further include other types of information acquired from a building environment, such as additional visual data and/or other types of data captured in or around a building, as discussed in greater detail elsewhere herein.

Figure 1B:
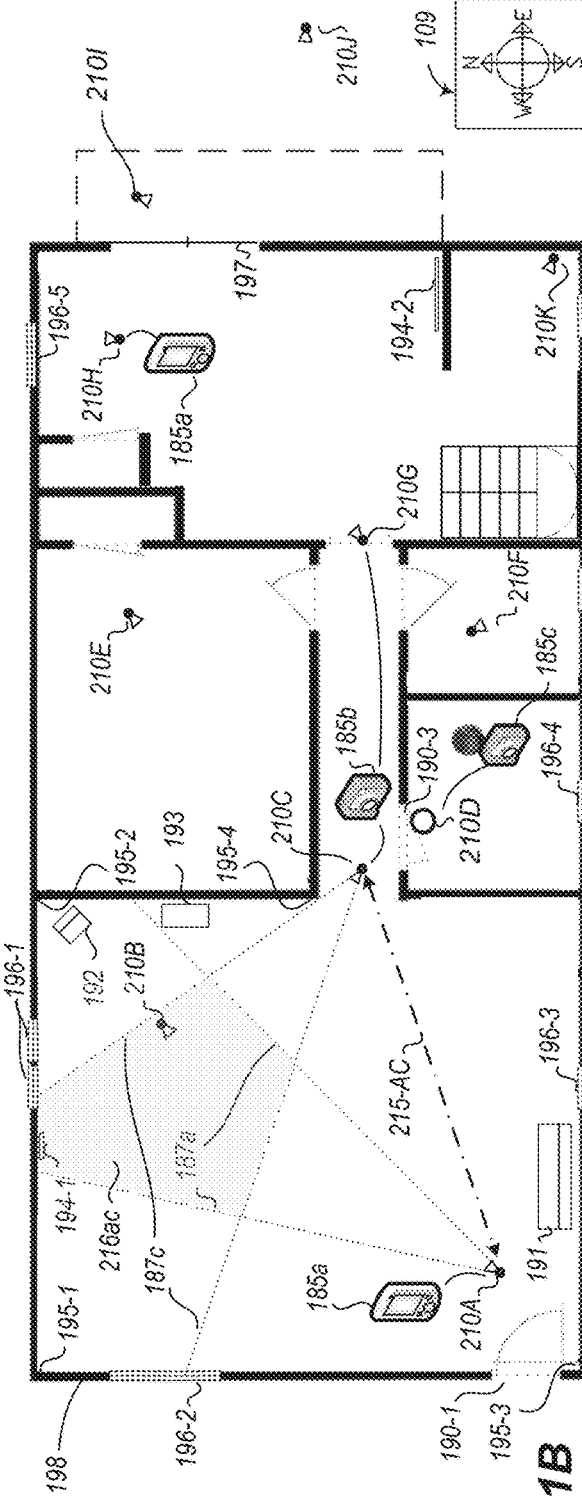

The capture of some or all the photos may be performed in the illustrated embodiment of FIG. 1A by an APC (Automated Photo Capture) system executing on a photo acquisition and analysis mobile device 185, such as an application 162 located on memory and/or storage 152 of that device—in other embodiments, all of the photos may be captured without use of such an APC system. If a copy of the APC system is used on a device 185 to assist in the photo capture, one or more hardware processors 132 of the mobile device may execute the APC system to acquire various photos 143 and optionally associated additional information using one or more imaging systems 135 of the mobile device, which are subsequently transferred over one or more computer networks 170 to the storage 164 on the server computing system(s) 180. Similarly, if a camera device 186 is used as part of the photo capture, resulting photos may be stored on storage (not shown) of the camera device and transferred over one or more computer networks 170 to the storage 164 on the server computing system(s) 180, such as directly by the camera device if it includes corresponding transmission capabilities (not shown) or after the photos are transferred to another device (not shown) that does include such transmission capabilities. As part of the operations of the APC system, various other hardware components of the mobile device 185 may be further used, such as the display system 149 (e.g., to display instructions and/or constituent photo information), device I/O components 147 (e.g., to receive instructions from and present information to the user), sensor modules 148 that include an IMU gyroscope 148a and an IMU accelerometer 148b and an IMU compass 148c (e.g., to acquire and associate sensor data with the acquisition of particular corresponding constituent photos), one or more lighting components 136, etc.—similarly, a camera device 186 may include some or all such components in some embodiments and situations. FIG. 1B shows one example of such acquisition of photos for a particular house 198, and FIGS. 2A-2C show examples of such photos.

One or more users (not shown) of one or more client computing devices 105 may further optionally interact over the computer networks 170 with the MIGVM system 160, such as to assist in creating or modifying building mapping information and/or in subsequently using the generated mapping information in one or more further automated manners—such interactions by the user(s) may include, for example, providing instructions for generated building mapping information, providing information to include with generated building mapping information, obtaining and optionally interacting with particular generated mapping information and/or with additional associated information, etc. In addition, one or more users (not shown) of one or more client computing devices 175 may further optionally interact over the computer networks 170 with the server computing systems 180, such as to retrieve and use generated building mapping information and/or individual photos and/or other information associated with such generated building mapping information—such interactions by the user(s) may include, for example, obtaining and optionally interacting with one or more types of visualizations of generated mapping information for one or more buildings. In addition, generated mapping information (or a portion of it) may be linked to or otherwise associated with one or more other types of information, including for a floor plan or other generated mapping information for a multi-story or otherwise multi-level building to have multiple associated sub-floor plans or other subgroups of associated building mapping information for different stories or levels that are interlinked (e.g., via connecting stairway passages), for a two-dimensional ("2D") floor plan of a building to be linked to or otherwise associated with a three-dimensional ("3D") rendering of the building, etc. Also, while not illustrated in FIG. 1A, in some embodiments the client computing devices 175 (or other devices, not shown), may receive and use information about generated mapping-related information in additional manners, such as to control or assist automated navigation activities by those devices (e.g., by autonomous vehicles or other devices), whether instead of or in addition to display of a visualization of the identified information.

In addition, in the depicted computing environment of FIG. 1A, the network 170 may be one or more publicly accessible linked networks, possibly operated by various distinct parties, such as the Internet. In other implementations, the network 170 may have other forms. For example, the network 170 may instead be a private network, such as a corporate or university network that is wholly or partially inaccessible to non-privileged users. In still other implementations, the network 170 may include both private and public networks, with one or more of the private networks having access to and/or from one or more of the public networks.

Furthermore, the network 170 may include various types of wired and/or wireless networks in various situations. In addition, the client computing devices 175 and server computing systems 180 may include various hardware components and stored information, as discussed in greater detail below with respect to FIG. 3.

Additional details related to embodiments of a system providing at least some such functionality are included in U.S. Non-Provisional patent application Ser. No. 17/064,601, filed Oct. 7, 2020 and entitled "Connecting And Using Building Data Acquired From Mobile Devices" (which includes disclosure of an example BICA system that is generally directed to obtaining and using panorama images from within one or more buildings or other structures); in U.S. Non-Provisional patent application Ser. No. 17/082,044, filed Oct. 28, 2020 and entitled "Automated Control Of Image Acquisition Via Acquisition Location Determination" (which includes disclosure of an example ICA system that is generally directed to obtaining and using panorama images from within one or more buildings or other structures); in U.S. Non-Provisional patent application Ser. No. 17/019,247, filed Sep. 12, 2020 and entitled "Automated Mapping Information Generation From Inter-Connected Images"; in U.S. Non-Provisional patent application Ser. No. 17/080,604, filed Oct. 26, 2020 and entitled "Generating Floor Maps For Buildings From Automated Analysis Of Visual Data Of The Buildings' Interiors"; and in U.S. Provisional Patent Application No. 63/035,619, filed Jun. 5, 2020 and entitled "Automated Generation On Mobile Devices Of Panorama Images For Buildings Locations And Subsequent Use"; each of which is incorporated herein by reference in its entirety.

FIG. 1B depicts a block diagram of an exemplary building interior environment in which photos have been captured and are ready for use (e.g., to generate and provide corresponding mapping information for the building and optionally its exterior and associated buildings, not shown, such as a garage, shed, accessory dwelling unit, etc.), as well as for use in presenting the photos and/or associated information to users. In particular, FIG. 1B includes a building 198 with an interior that was captured at least in part via multiple photos, such as by one or more users (not shown) carrying one or more devices with photo acquisition capabilities through the building interior to multiple acquisition locations 210. In this example, a mobile computing device 185a may be used by a first user to capture a first group of one or more perspective photos at a first time, a camera device 185b may be used by a second user to capture a second group of one or more perspective photos at a separate second time, and a camera device 185c may be used by a third user to capture a third group of one or more groups of additional visual data (e.g., one or more videos, panorama images, additional perspective photos, etc.) at a separate third time—as discussed elsewhere herein, mapping information may be initially generated for the building using a first set of photos and optionally additional information, and may later be updated to incorporate one or more additional photos and optionally further additional information that are captured after the initial generation of the mapping information. An embodiment of the APC system (e.g., application 162 executing on a user's mobile device 185) may in some embodiments automatically perform or assist in the capturing of the data representing the building interior. While the mobile device 185a of the user may include various hardware components, such as one or more cameras or other imaging systems 135, one or more sensors 148 (e.g., a gyroscope 148a, an accelerometer 148b, a compass 148c, etc., such as part of one or more IMUs, or inertial measurement units, of the mobile device; an altimeter; light detector; etc.), a GPS receiver, one or more hardware processors 132, memory 152, a display 149, a microphone, etc., the mobile device may not in at least some embodiments have access to or use equipment to measure the depth of objects in the building relative to a location of the mobile device, such that relationships between different photos and their acquisition locations may be determined in part or in whole based on matching elements in different photos and/or by using information from other of the listed hardware components, but without using any data from any such depth sensors—similarly, the camera devices 185b and/or 185c may similarly not have access to or use equipment to measure the depth of objects in the building relative to a location of the mobile device. In addition, while directional indicator 109 is provided for reference of the viewer, the device(s) 185 and/or APC system may not use such absolute directional information in at least some embodiments, such as to instead determine relative directions and distances between photos acquired at acquisition locations 210 without regard to actual geographical positions or directions.

In operation, a user associated with a device 185 arrives at a first acquisition location 210A within a first room of the building interior (in this example, an entryway from an external door 190-1 to the most westward room, which in this example is a living room), and captures a view of a portion of the building interior that is visible from that acquisition location 210A—in this example, the angle of view of the resulting photo is the northeast portion of the living room, as shown by sight lines 187a. The actions of the user and/or the mobile device may be controlled or facilitated via use of one or more programs executing on the mobile device, such as APC application 162, and the capture may include visual information depicting objects or other elements (e.g., structural details) that may be visible from the acquisition location in those directions. In the example of FIG. 11B, such objects or other elements in the building 198 include various elements that are structurally part of the walls (or "wall elements"), such as the doorways 190 and 197 and their doors (e.g., with swinging and/or sliding doors), windows 196, inter-wall borders (e.g., corners or edges) 195 (including corner 195-1 in the northwest corner of the building 198, corner 195-2 in the northeast corner of the first room, and corner 195-e in the southwest corner of the first room)—in addition, such objects or other elements in the example of FIG. 1B may further include other elements within rooms, such as furniture 191-193 (e.g., a couch 191; chair 192; table 193; etc.), pictures or paintings or televisions or other objects 194 (such as 194-1 and 194-2) hung on walls, light fixtures, etc. The user may also optionally provide a textual or auditory identifier to be associated with an acquisition location, such as "entry" for acquisition location 210A or "living room" for acquisition location 210B, while in other embodiments the MIGVM system may later automatically generate such identifiers (e.g., by automatically analyzing visual data and/or other recorded information for a building to perform a corresponding automated determination, such as by using machine learning) or the identifiers may not be used.

After a photo for the first acquisition location 210A has been captured, the user may proceed to another acquisition location (such as acquisition location 210H), optionally capturing movement data during travel between the acquisition locations, such as visual data and/or other data from the hardware components (e.g., from one or more IMUs, from the camera, etc.). At the next acquisition location, the user may similarly use the mobile device to capture one or more photos from that acquisition location. This process may repeat from some or all rooms of the building and optionally external to the building, as illustrated for other acquisition locations 210B-210K. In addition, in this example, a user (whether the same or different) uses camera device 185b to capture one or more photos at one or more acquisition locations at one or more times (whether the same or different than the capture by computing device 185a), including acquisition location 210C in this example, and optionally one or more other acquisition locations 210A-210B and 210D-210K—in this example, the angle of view of the resulting photo is the northwest portion of the living room, as shown by sight lines 187c. These example photos from acquisition locations 210A and 210C have an area of overlap 216ac in this example, which may be later used by the MIGVM system to inter-connect (or 'link') together these photos and/or their acquisition locations (with corresponding line 215-AC between them being shown for the sake of illustration), such as to determine relative positional information between these two acquisition locations, as discussed in greater detail with respect to FIG. 2D and elsewhere herein. Such automated operations of the MIGVM system may further generate and store corresponding inter-connections for other pairs of acquisition locations and/or their captured photos, including in some embodiments and situations to further connect at least some acquisition locations whose photos do not have overlapping visual coverage and/or that are not visible to each other (e.g., a connection, not shown, between acquisition locations 210B and 210E).

Additional details related to embodiments of generating and using linking information between panorama images, including using travel path information and/or elements or other features visible in multiple images, are included in U.S. Non-Provisional patent application Ser. No. 17/064,601, filed Oct. 7, 2020 and entitled "Connecting And Using Building Data Acquired From Mobile Devices" (which includes disclosure of an example BICA system that is generally directed to obtaining and using linking information to inter-connect multiple panorama images captured within one or more buildings or other structures); in U.S. Non-Provisional patent application Ser. No. 17/080,604, filed Oct. 26, 2020 and entitled "Generating Floor Maps For Buildings From Automated Analysis Of Visual Data Of The Buildings' Interiors"; and in U.S. Provisional Patent Application No. 63/035,619, filed Jun. 5, 2020 and entitled "Automated Generation On Mobile Devices Of Panorama Images For Buildings Locations And Subsequent Use"; each of which is incorporated herein by reference in its entirety.

Various details are provided with respect to FIGS. 1A-1B, but it will be appreciated that the provided details are non-exclusive examples included for illustrative purposes, and other embodiments may be performed in other manners without some or all such details.

FIGS. 2A-2N illustrate examples of automatically generating mapping information for a building using perspective photos acquired by one or more devices from one or more acquisition locations at one or more times, such as for the building 198 discussed in FIG. 1B, as well as subsequently using the generated mapping information in one or more automated manners.

In particular, FIG. 2A illustrates an example perspective photo 250a taken in a northeasterly direction from acquisition location 210A in the living room of house 198 of FIG. 1B—the directional indicator 109a is further displayed in this example to illustrate the northeasterly direction in which the photo is taken. In the illustrated example, the displayed photo includes built-in elements (e.g., light fixture 130a), furniture (e.g., chair 192-1), two windows 196-1, and a picture 194-1 hanging on the north wall of the living room. No inter-room passages into or out of the living room (e.g., doors or other wall openings) are visible in this photo. However, multiple room borders are visible in the photo 250a, including horizontal borders between a visible portion of the north wall of the living room and the living room's ceiling and floor, horizontal borders between a visible portion of the east wall of the living room and the living room's ceiling and floor, and the inter-wall vertical border 195-2 between the north and east walls.

FIG. 2B continues the examples of FIG. 2A, and illustrates an additional perspective photo 250b taken in a southwesterly direction in the living room of house 198 of FIG. 1B, such as from acquisition location 210B—the directional indicator 109b is further displayed to illustrate the southwesterly direction in which the photo is taken. In this example photo 250b, a portion of window 196-2 is visible, as is a couch 191 and visual horizontal and vertical room borders in a manner similar to that of FIG. 2A. This example photo 250b further illustrates an inter-room passage for the living room, which in this example is a door 190-1 to enter and leave the living room (which FIG. 1B identifies as a door to the west exterior of the house).

FIG. 2C continues the examples of FIGS. 2A-2B, and illustrates an additional perspective photo 250c taken in a northwesterly direction in the living room of house 198 of FIG. 1B, such as from acquisition location 210C—the directional indicator 109c is further displayed to illustrate the northwesterly direction in which the image is taken. In this example photo 250c, a small portion of one of the windows 196-1 is visible, along with a portion of window 196-2, and picture 194-1. In addition, horizontal and vertical room borders are visible in photo 250c in a manner similar to that of FIG. 2A.

Figure 2D:
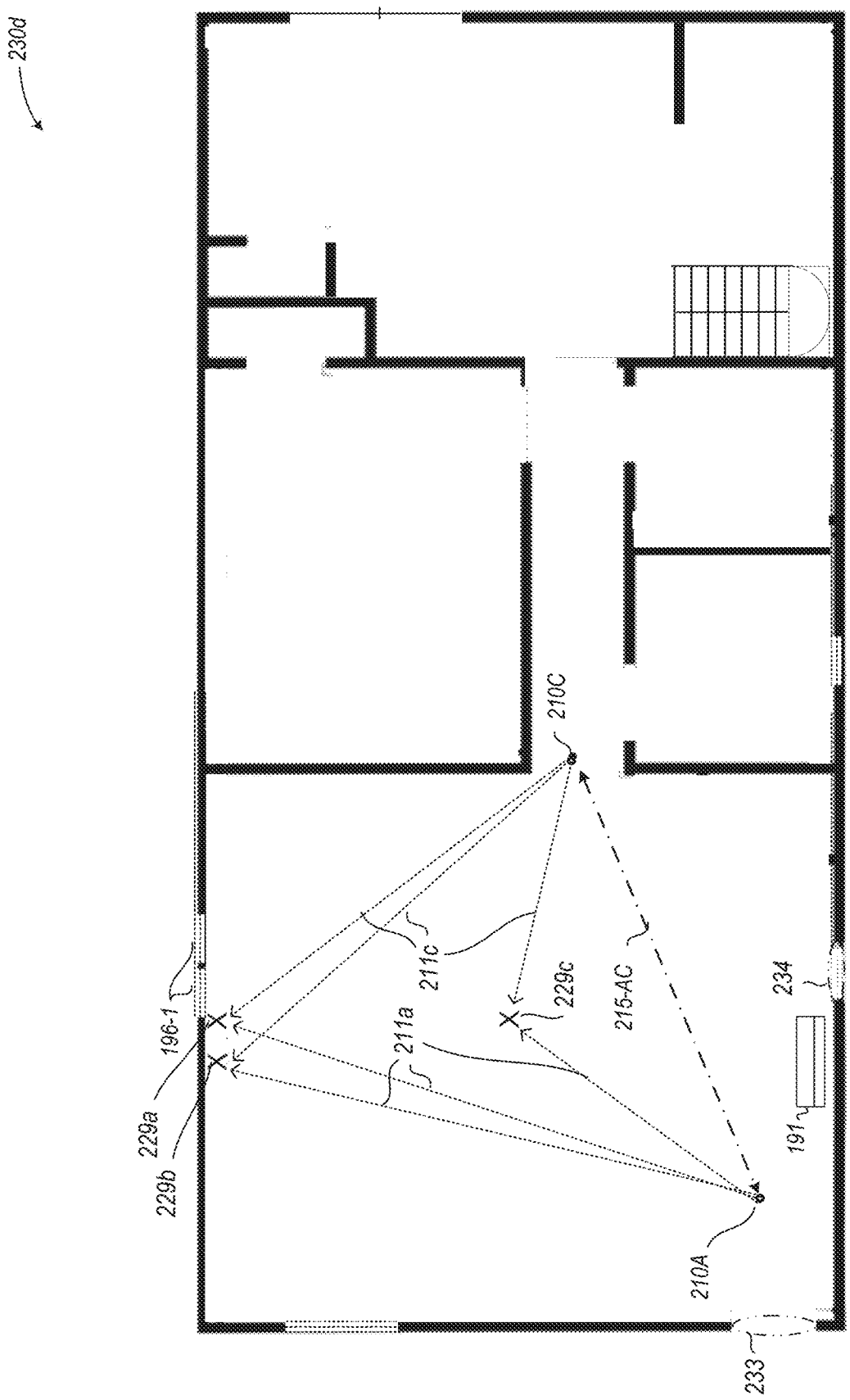

FIG. 2D continues the examples of FIGS. 2A-2C, and illustrates information 230d corresponding to later automated operations by the MIGVM system to determine inter-connection information 215-AC between acquisition locations 210A and 210C and those acquisition locations' photos. In particular, the automated operations of the MIGVM system include analyzing the visual data of the photos taken from acquisition locations 210A and 210C, such as to identify a variety of matching features that are visible in the visual data of both photos (e.g., in the overlap area of 216ac shown in FIG. 1B), and to use sightlines 211a from acquisition location 210A and sightlines 211c from acquisition location 210C to determine relative placement of those features from those acquisition locations (e.g., using determined view angle orientation from each acquisition location to the matching features in order to determine a relative rotation and translation between acquisition locations 210A and 210C, assuming that sufficient overlap in the two photos' visual data is available). In the example of FIG. 2D, the matching features may include elements 229a, 229b and 229c illustrated in FIG. 2D, such as the western edge or corner of window 196-14 feature 229a, some or all of the picture 194-1 for feature 229b, and one or more points in the center of the room for feature 229c (e.g., one or more points on the floor that are visible and distinguishable from other points on the floor). It will be appreciated that numerous other features may be visible in the two photos, including points on structural elements such as the walls, floor, ceiling, windows, corners, borders, etc. and points on non-structural elements such as furnishings. Some features may be visible from only one acquisition location, such as for the northeast corner 195-2, and thus may not be used for the comparison and analysis of the photos' visual data from these two acquisition locations (although it may be used for the generation of structural shapes from the photo captured acquisition location 210A).

After analyzing multiple such features in the living room between the photos from the acquisition locations 210A and 210C, various information may be determined regarding the positions of the acquisition locations 210A and 210C in the room. Note that in this example the acquisition location 210C is near the border between rooms 229a and 229c and includes visual coverage of the living room (and with a different orientation from that acquisition location may include visual data from multiple rooms), and thus may provide information for and be associated with one or both of those rooms—similarly, the panorama image acquired from acquisition location 210D may include visual data from the living room and bedroom and hallway. While the hallway may be modeled as a separate room in this example, in other embodiments such hallways may instead be treated as part of one or more rooms connecting to the hallway, or instead the hallway may be treated as a connecting passage between rooms rather than as a separate room—similarly, small areas such as closets and/or alcoves/nooks may not be analyzed as a separate room and instead treated as part of the larger containing room (optionally as unmapped space within the room), although in other embodiments such small areas could instead be separately represented (including to optionally have one or more acquisition locations located within them). While illustrated only with respect to the living room and two acquisition locations, it will be appreciated that similar analysis may be performed for each of the acquisition locations, and with respect to some or all of the rooms in the building. In addition, analysis of information in the photos may further be used to determine additional position information in the room for one or more such acquisition locations, such as to further determine specific dimensions of distances from an acquisition location to one or more nearby walls or other structural features of the room-information for such dimension determination may be determined in some embodiments by using sizes of known objects (e.g., door frames, door handles, lightbulbs, etc.), and extrapolating to corresponding sizes of other features and distances between locations. In this manner, such an analysis may provide the position of each acquisition location in a room, of connecting passage locations for the room, and optionally an estimate of at least a partial room shape using one or more partial structural shapes determined from one or more photos whose visual data includes at least part of that room.

In some embodiments, an automated determination of a position within a room of an acquisition location and/or of an estimated full or partial room shape may be further performed using machine learning, such as via a deep convolution neural network that estimates a 2D or 3D layout of a room from one or more photos (e.g., a rectangular, or "box" shape; non-rectangular shapes; etc.). Such determination may include analyzing the photo(s) to align the photo(s)' visual data so that the floor is level and the walls are vertical (e.g., by analyzing vanishing points in the photos) and to identify and predict corners and boundaries, with the resulting information fit to a 2D and/or 3D form (e.g., using layout parameters, such as for an outline of floor, ceiling and walls to which photo information is fitted). In addition, in some embodiments humans may provide manual indications of estimated room shapes for rooms from photos, which may be used in generation of a corresponding floor plan, as well as later used to train models for use in corresponding subsequent automated generation of room shapes for other rooms from their photos. In some embodiments, certain assumptions may be employed for automated analysis of photo(s) of at least some rooms, such as one or more of the following: the room shape should be predominantly rectangular/cuboid; if the room shape is not predominantly rectangular/cuboid, multiple acquisition locations should be used within the room; the room should be at least a minimum number of visible corners and/or walls (e.g., 3, 4, etc.); the room should have a level floor and walls perpendicular to the floor; the walls should be flat rather than curved; the photo is acquired from a camera at a specified level above the floor (e.g., 5 feet, approximately midway between floor and ceiling, etc.); the photo is acquired from a camera at a specified distance from one or more walls (e.g., 4 feet, 5 feet, 6 feet, 7 feet, 8 feet, 9 feet, 10 feet, etc.); etc. In addition, if multiple room shape estimates are available for a room (e.g., from multiple acquisition locations within the room), one may be selected for further use (e.g., based on positions of the acquisition locations within the room, such as a most central), or instead the multiple shapes estimates may be combined, optionally in a weighted manner. Such automated estimation of a room shape may further be performed in at least some embodiments by using one or more techniques such as SfM (structure from motion), Visual SLAM (simultaneous localization and mapping), sensor fusion, etc. if corresponding data is available.

In some embodiments, computer vision algorithms are used to extract the data and features that are used in subsequent topology-related algorithms. The processing may include first determining relative poses between photos, with one non-exclusive example technique for doing so as follows:

Input: Set of photos $\{I_1, I_2, \ldots I_n\}$

Output: Matrix of pose estimates for photos, $P_{i \times j}$

For each photo pair $(I_i, I_j)$ in the photo set: compute Essential matrix using 5-point and 8-point algorithms; and compute relative rotation R and translation T from the Essential matrix $P[i, j]=\{R,T\}$ In some embodiments, the relative poses may be determined between two or more photos based at least in part of identifying and using matching visual features in the visual data of the two or more photos. In other embodiments, the determinations may be made by analyzing visual data of the two or more photos without explicitly identifying and using matching visual features, such as by using machine learning methods to analyze visual data of two photos and determine a direction between the photos' acquisition locations. One non-exclusive example of training a machine learning algorithm to learn the direction (e.g., relative pose) between two photos without explicitly identifying matching visual features is as follows:

Input: Set of images $\{I_1, I_2, \ldots I_n\}$ machine learned model M that takes as input 2 photos and returns relative pose estimate Output: Matrix of pose estimates for images, $P_{i \times j}$ For each images pair $(I_i, I_j)$ in the image set:

Compute output from running inference on model $M(I_i, I_j)=\{R, T\}$ $P[i,j]=\{R,T\}$ Pretraining of the relative pose machine learning model M Input: Training data set of images $\{I_1, I_2, \ldots I_n\}$ and true pose labels $\{R_i, T_i\}$ for each image pair Output: Model M with learned network structure and weights to predict $\{R, T\}$ for any new image pair Training: Optimize the network structure and weights so that the loss (L1, L2, etc.) between the network-estimated pose and true pose for each image pair in the data set is minimized. Note that the model M may also be trained to estimate relative pose between m images at a time, with m being>=2. The algorithm above would then input m images to model M and use averaging/consensus/other methods to combine results for a given image pair ($I_i$, $I_j$).

The processing may next include determining a 3D structure from multiple photos, with one non-exclusive example technique for doing so as follows:

Input: Set of photos $\{I_1, I_2, \ldots I_n\}$ and relative poses matrix P,

Output: Estimated 3D structure and camera poses from all or a subset of photos SC=(S,C), where $S_i=\{(x_{i1}, y_{i1}, z_{i1}), (x_{i2}, y_{i2}, z_{i2}), \ldots (x_{ik}, y_{ik}, z_{ik})\}$ represents the k estimated x, y, and z coordinates of 3D world points and $C_j=\{(C_{j1}^T, C_{j1}^R), (C_{j2}^T, C_{j2}^R), \ldots (C_{jm}^T, C_{jm}^R)\}$ represent the m estimated camera positions within the structure 1

For all possible groupings of photos $Gr_i \in \{I_1, I_2, \ldots I_n\}$ (or a smaller set of groupings, for computational efficiency), estimate 3D structure $S_i$ and camera poses $C_i$ for the group $Gr_i$ using a bundle adjustment technique. In other embodiments, the structure can also be determined through alternative forms other than the above described (x, y, z) coordinates of the points in the world, such as by decomposing the scene into planes, surfaces, and voxel representations.

The processing may next include determining a local layout estimate from multiple photos using computer vision and machine learning algorithms to estimate the layout of a building corresponding to the viewpoint of each perspective photo or a subset of perspective photos—although no single estimated local layout may cover the entire building, multiple individual local layouts may be combined, with one non-exclusive example technique for determining a local layout estimate as follows:

Input: Set of photos $\{I_2, I_2, \ldots I_n\}$, relative poses matrix $P_{i \times j}$, structure estimates SC=(S, C)

Output: Local layouts of different sub-sections of the building LL=$\{LL_1, LL_2, \ldots LL_1\}$, where $LL_i=\{(x_{i1}, y_{i1}), (x_{i2}, y_{i2}), \ldots (x_{iw}, y_{iw})\}$ represents the w estimated x, y coordinates of the building's layout, as visualized from the top-down view.

For all possible groupings of photos $Gr_j \in \{I_1, I_2, \ldots I_n\}$ (including singleton photos), if the grouping is not a singleton and if P and SC do not indicate strong visual connectivity within the group, then skip processing of the grouping. Otherwise, estimate 3D planes p from the photos (using computer vision or machine learning);

estimate probability of the planes in p belonging to 'floor' or 'wall' category; for planes with probability>threshold T, estimate their top-down projection;

estimate the room shape polygon $LL_i=\{(x_{i1}, y_{i1}), (x_{i2}, y_{i2}), \ldots (x_{iw}, y_{iw})\}$ from the top-down projection.

Other variations are also possible, including the following: processing points and lines (instead of planes); and/or using object detection models (to identify structures such as furniture, appliances) to reason about the local layout; and/or using room label classification to include fine-grained context for different room-types (such as kitchen, bedroom, etc.); and/or using an integrated end-to-end machine learning model to estimate $LL_i$ directly from the input data.

The processing may next include determining relative and global relationships between photos, with one non-exclusive example technique for doing so as follows:

Input: Estimated 3D structure set SC=$\{SC_0, SC_1, \ldots SC_t\}$ and relative pose matrix between photos $P_{i \times j}$ Output: A constraint graph CG(possibly disjoint) representing estimated combined relative structure Create an empty graph, and then for each $SC_i \in SC$ Add all the 3D $S_y$ points from the structure set $SC_i$ along with estimated camera poses C, as nodes in the graph Add edges between points and camera pose nodes as determined by the structure At this stage, a possibly disjoint graph exists, and a given photo may have multiple estimated camera pose nodes (each from a different structure set) that do not share a common global reference frame.

Next, establish connections between the disjoint sub-graphs using the pose estimates from $P_{i \times j}$ by for each element (R,T) $\in$ P[i,j]:

If camera pose nodes corresponding to i and j do not exist in graph, create and add these nodes If camera pose nodes corresponding to i and j exist in the graph (note multiple instances of camera pose nodes may be possible), add constraint edge (R T) between camera pose nodes referenced by and j Optionally, perform one or more of the following:

Perform matching of points that occur in different structure subsets

Perform optimization and bundle adjustment to obtain a better estimate for camera poses For camera poses that have multiple node instances, estimate the most probable single value of pose The processing may next include determining room types and semantic labels, with one non-exclusive example technique for doing so as follows:

Input: Set of photos $\{i_1, i_2, \ldots I_n\}$

Output: Semantic attributes A=$\{A_1, A_2, \ldots A_n\}$

For each photo $I_i \in \{I_1, I_2, \ldots I_n\}$, run machine learning models to determine Room type ('kitchen', 'bedroom', etc.)

Presence of object types in the photo ('TV', 'couch', 'fridge', etc.)

Floor/ceiling type ('carpet', 'tiles', 'vaulted_ceiling', 'popcorn_ceiling', etc.)

Semantic structures in the photo ('wall', 'door', 'window', 'counter', 'staircase', etc.)

generating $A_i$={collection of above attributes}

The processing may next include learning embedding vectors to represent attributes of rooms and room pairs, with training examples and objective functions being implemented using, for example, a neural network that determines the quality used to define neighborhood in the embedding. One non-exclusive example technique for learning such embedding vectors is as follows:

Input: Set of photos $l=\{I_1, I_2, \ldots I_n\}$

Output: Individual embeddings array EI=$\{EI_1, EI_2, \ldots, EI_n\}$ and pairwise embeddings matrix $EP_{x \times y}$ To generate an individual room embeddings array:

Create a training data set with photos I and a matrix $M_{x \times y}$ representing 'closeness' of the individual photos. Closeness may be estimated using, for example, spatial closeness from ground truth, spatial position estimates as discussed above, labels and attributes as discussed above, or through human labeling of photo pairs.

Train a network such that the embedding learned in the network minimizes the distance between photos deemed close in the matrix M and maximizes the distance between photos deemed not close in the matrix M.

Save the trained weights and network N.

Resulting in, for each photo $I_j \in \{I_1, I_2, \ldots I_n\}$, $EI_i = N(I_i)$.

To generate a room pair embeddings array:

Create a training data set with photo pairs $II = \{(I_i, I_j)\}$ for all possible and j values and $MM_{ij \times kl}$ representing closeness of the pair (i,j) and k,l), with closeness estimated as noted above.

Train a network such that the embedding learned in the network minimizes the distance between photo pairs deemed close in the matrix MM and maximizes the distance between photos deemed not close in the matrix MM.

Save the trained weights and network NN.

Resulting in, for each photo pair $II_{ij} \in \{(I_i, I_j)\}, EP[i,j] = NN(II_{ij})$, The processing may next optionally include determining learned house layout priors using machine learning, such as by analyzing a database of floor plans from buildings unrelated to the current building to learn information about prior probabilities or other prior likelihoods such as generic house layouts and spatial configuration of rooms. Such additional data can be useful in making additional inferences about the current building, such as for use during the topology processing and/or visualization processing. One non-exclusive example technique for doing so is as follows:

Input: Data base of floor plans $F = \{F_1, F_2, \ldots F_f\}$

Output: A data representation that encodes generic priors, room shapes, population statistics (number of rooms, sizes, etc.), L L can be estimated using different machine learning paradigms:

Neural Network-Based

Using suitably designed output values, loss function, and network architecture (such as encoder-decoder, graph neural networks), the network and its weights constitute L $A_n$ example output value for the network is a constraint graph representation of the same form as CG from spatial relationship estimation algorithms. Minimizing the L2 or L1 losses between the predicted graph and ground truth graph from the floor plan causes the neural network to learn the required representation L Probabilistic graphical model-based representation, as using generative models is an alternative to neural networks.

A generative model L, learned from the data, encodes the probability and spatial relationship between the individual rooms in each floor plan. The generative model can be used to estimate quantities such as probability of a predicted constraint graph CG, most likely CG given the observed photos 1, probability of a given edge in the CG, etc.

The processing may next include performing topology analysis using the outputs generated above (e.g., features and representations) to return a graph representing spatial and semantic relations between the photos (to enable later visualizations that render photos and additional related information for viewing). Such a topological graph can be constructed through many approaches, with one non-exclusive example technique for doing so inducing a spatial bias to the graph (enabling better spatial understanding of the house), as follows:

Input: Set of photos $\{I_1, I_2, \ldots I_n\}$ and all or a subset of outputs from processing described above (e.g., $OI = \{O_1, O_2, \ldots O_n\}$ for individual photo-based outputs and $OP = \{O_{ij}\}$ for all possible i and j values for photo-pair based outputs)

Output: A connected graph G=(V,E) of photos with spatially and semantically consistent neighbors for each photo. $V = \{V_1, V_2, \ldots V_n\}$ are nodes corresponding to each photo and $E = \{E_1, E_2, \ldots E_e\}$ are edges connecting photos that are consistent neighbors The Spatial-Biased Graph Generation Algorithm Includes:

Start with empty set V

For photos $I_i$ that have an estimated camera pose from algorithms above, create a node in the graph corresponding to the camera pose $V_i \rightarrow \{V\}$ For each pair (i,j) of nodes in graph:

If $Q(OI_i, OI_j)$>acceptable threshold, add edge $E_{ij}$ to E, where Q is a function that, given the algorithm outputs $OI_i$ and $OI_j$, determines whether they are acceptable neighbors or not If $OP_{ij}$, which represents the quality of the pair connection (i,j), is >acceptable threshold, add edge $E_{ij}$ to E For photos Ik that do not have a corresponding camera pose, estimate the nearest neighbor l based on output from semantic and embedding algorithms discussed above, including:

For all Nodes $V_i \in V$,

Find k with best value of $Q(OI_k, OI_i)$ or $OP_{Ki}$, where l=i

Add edge $E_{kl}$ to E

Optional further steps include graph densification and/or graph sparsification and/or a spanning tree, as follows:

Graph Densification

For all possible values of (i, j)

If $Q(OI_i, OI_j)$>acceptable threshold, add edge $E_{ij}$ to E

If $OP_{ij}$ is>acceptable threshold, add edge $E_{ij}$ to E

Graph Sparsification

For all possible edges $E_i \in E$

If $Q(OI_i, OI_j)$<unacceptable threshold, remove edge $E_{ij}$ to E

If $OP_{ij}$ is <unacceptable threshold, remove edge $E_{ij}$ to E

Spanning Tree

Run minimum spanning tree algorithm on the graph to prevent loops

FIG. 2E continues the examples of FIGS. 2A-2D, and illustrates example information 205e about relative position information that has been determined for the acquisition locations 210A-210K and their corresponding photos, such as by using common local coordinate systems or other common local frames of reference for each subgroup of photos/acquisition locations for which inter-connections are determined. As previously noted, relative positional information between two or more photos may be determined in various manners in various embodiments, including by analyzing the photos' visual data to determine common features or objects visible in multiple photos, and optionally by analyzing additional information (e.g., photo acquisition metadata). It will be noted that, as the number of acquisition locations that are visible from each other increases, the precision of a position of a particular acquisition location may similarly increase. In this example, several acquisition locations are not inter-connected with any other acquisition locations (e.g., acquisition locations 210B, 210E, 210F and 210K), such as due to having associated photos captured at those acquisition locations that lack sufficient overlap in visual data with any other acquisition locations' photos, and thus correspond to subgroups with a single acquisition location. In addition, while acquisition locations 210I and 210J are outside the building and thus may not be used as part of generation of a building floor plan, they may nonetheless be inter-connected with one or more interior acquisition locations (although not in this example) and such possible inter-connections to interior acquisition locations (e.g., acquisition locations 210G or 210H) may nonetheless be used when determining the relative positions of such interior acquisition location(s).

FIGS. 2F and 2G continue the examples of FIGS. 2A-2E, and in particular FIG. 2F illustrates information 230f that shows a portion of the building 198 of FIG. 1B that includes the living room and portions of the hallway and next rooms to the east, such as to show the inter-connections 215-AC and 215-CD that have been determined in FIG. 2E between acquisition location pairs 210A and 210C, and 210C and 210D, respectively. FIG. 2F further illustrates that possible inter-connections 215-AB and/or 215-BC might be further determined if additional information is available to link acquisition location 210B with one or both of acquisition locations 210A and 210C, respectively. FIG. 2G further illustrates information 205g in a manner similar to that of a portion of information 205e of FIG. 2E, but with the additional inter-connections 215-AB and 215-BC added, such as after analysis of additional information (e.g., additional photos from one or more acquisition locations, additional visual data from other sources such as one or more videos or panorama images, additional nonvisual data from one or more IMU sensors, etc.), as discussed elsewhere herein, such as to create an updated larger group that includes acquisition locations 210A, 210B, 210C and 210D. As one example, if additional photos are obtained from additional acquisition locations 210L and 210M (e.g., after the initial processing discussed with respect to FIG. 2E is performed and optionally associated visualizations are provided) with the indicated fields of view, those additional photos may create sufficient overlap with the photos acquired at acquisition locations 210A, 210B and 210C to enable the additional inter-connections 215-AB and 215-AC to be determined. While not illustrated, additional photos and/or other additional information may similarly be used to further inter-connect other acquisition locations, such as to inter-connect acquisition locations 210E and 210F, and to inter-connect acquisition locations 210G-210K (including in that situation to inter-connect acquisition locations both inside and outside of house 198). Similarly, while acquisition locations for a second floor of the house 198 are not illustrated in this example, some or all such acquisition locations may be inter-connected with at least some acquisition locations on the main floor of the house 198 (e.g., to at least acquisition location 210G near the main floor portion of the stairs between the main floor and the second floor). While also not illustrated in this example, acquisition locations between multiple related buildings (e.g., the house 198 and one or more outbuildings or other associated buildings) may similarly be inter-connected, optionally via one or more intervening exterior acquisition locations outside the multiple buildings.

Figure 2H:
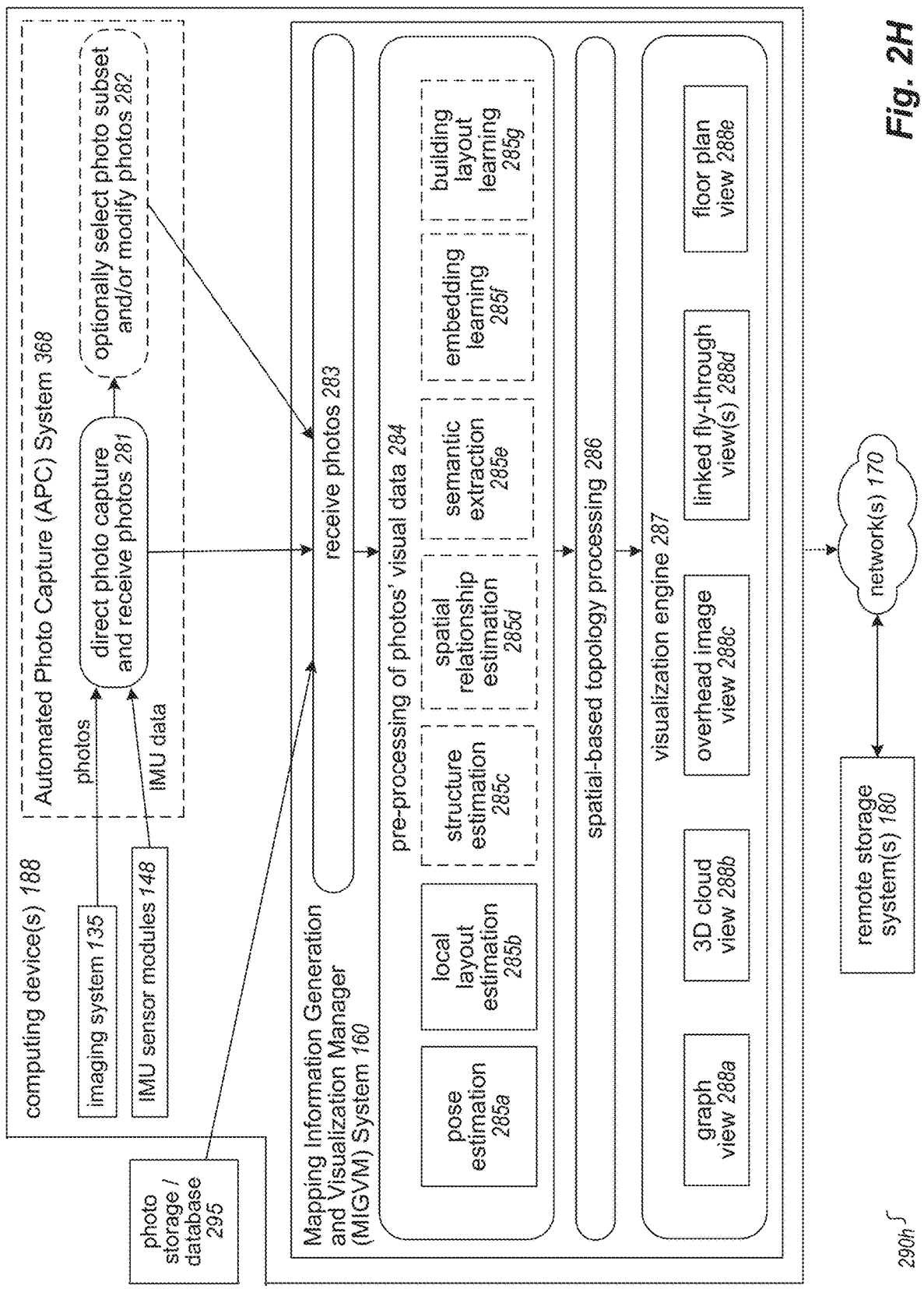

FIG. 2H further illustrates information 290h to show an example architecture and information processing flow to perform some or all of the described techniques. In this example, one or more computing devices 188 execute an embodiment of the MIGVM system 160 of FIG. 1A and optionally an embodiment of an APC system 162 of FIG. 1A, such as to correspond to computing devices 180 and optionally 185 of FIG. 1A. The embodiment of the MIGVM system 160 of FIG. 2H operates to receive photos 283 for one or more related buildings, perform preprocessing of the photos' visual data 284, perform spatial-based topology processing 286 using the results of that preprocessing, and then provide a visualization engine 287 to generate and provide one or more types of visualizations of the resulting generated mapping information for the building(s). The photos received in step 283 may come from, for example, a photo storage location 295 (e.g., a database) and/or from execution of the APC system 162—if from the APC system 162 provide some or all of the photos, it may do so by capturing and receiving 281 photos using one or more imaging systems 135 and optionally receiving additional information from IMU sensor modules 148, and optionally performing processing 282 to select a subset of the photos for use (e.g., based on attributes of those photos, such as clarity or other indications of sufficient detail in the visual data of those photos for further analysis) and/or to modify the photos in one or more manners (e.g., to change the format of the photos, to crop or resize or otherwise modify the photos, etc.). As part of step 284 to preprocess the photos' visual data, the MIGVM system 160 may perform automated operations to estimate pose 285a of the photos and to perform an estimate 285b of the local layout for subgroups of inter-connected photos, such as in a manner discussed in greater detail elsewhere herein. The preprocessing may further optionally include one or more additional steps, such as to perform an estimation 285c of structural shapes visible in the photos, an estimation 285d of spatial relationships between multiple partial structural shapes, processing 285e to extract semantic information from photos, processing 285f to learn embedding vector information for photos, and/or processing 285g to learn an overall holding layout (e.g., by using estimated structural shapes and corresponding spatial relationship information, and optionally further predicting missing parts of the information), such as in a manner discussed in greater detail elsewhere herein. The topology processing 286 may further use the information from the preprocessing 284 to generate sub-graphs for each subgroup of one or more inter-connected acquisition locations and associated photos, as discussed in greater detail elsewhere herein. In this example embodiment, the visualizations available from the visualization engine 287 include a graph view 288a, a cloud view 288b, an overhead image view 288c, a linked fly-through view 288d, and/or a floor plan view 288e, such as in a manner discussed in greater detail elsewhere herein, including with respect to FIGS. 2I-2M. In the illustrated embodiment, the one or more computing devices 188 may further interact with one or more other systems over one or more computer networks 170, including one or more remote storage systems 180 on which information generated by the MIGVM system may be stored for later use.

Figure 2I:
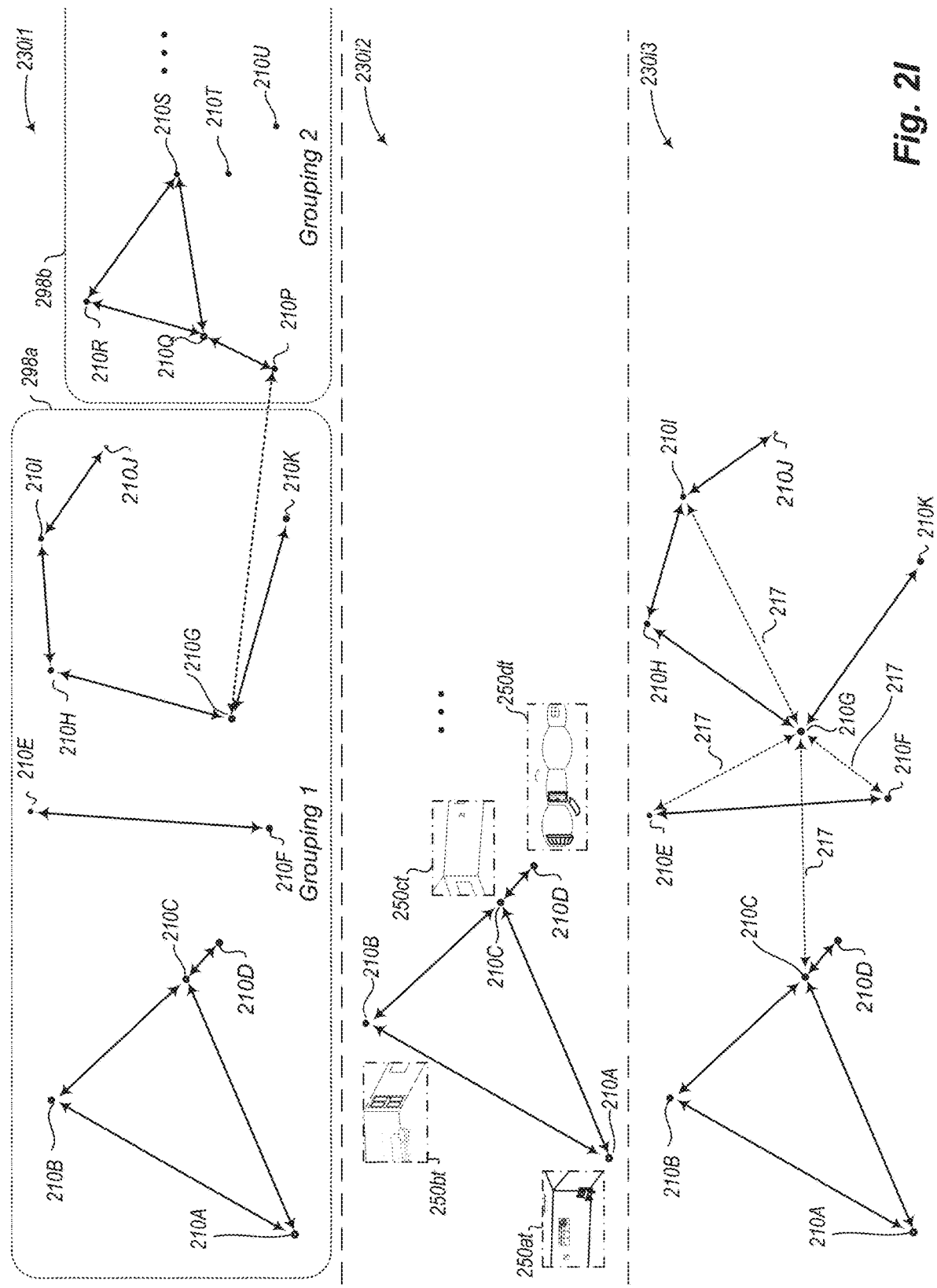

FIG. 2I continues the examples of FIGS. 2A-2H, and in particular includes information 230i1, 230i2 and 230i3 to illustrate example graph view visualizations in some embodiments that may be displayed in one or more GUIs (not shown). In particular, information 230i1 illustrates a first example graph view in which multiple sub-graphs are shown that each corresponds to one of the subgroups of inter-connected acquisition locations, such as in a 'top-down' view from the perspective of an overhead location, including in this example to include acquisition location 210B as part of a group of inter-connected acquisition locations with 210A, 210C and 210D, and to have acquisition locations 210G-210K all part of the same subgroup of inter-connected acquisition locations. In this first example graph view, the sub-graphs are disjoint (having separate acquisition location members without overlaps between sub-graphs) and are visually separate (not shown to be inter-connected)—accordingly, the positions of acquisition location nodes within a sub-graph may be selected to accurately reflect relative positions of those acquisition locations, but the positions of acquisition location nodes in different sub-graphs may not reflect relative positions between those acquisition locations. In addition, each acquisition location is displayed in this first example graph view with a corresponding visual representation (which in this example is a black dot), and edges are shown in this example between nodes for inter-connected acquisition locations—thus, for example, the node for acquisition location 210D only has a single edge inter-connection to the node for acquisition location 210C, while the node for acquisition location 210C has three edge inter-connections to the nodes for the three other acquisition locations in its subgroup. While the different sub-graphs are not inter-connected in this first example graph view, this example illustrates that different sub-graphs may be grouped together in other manners according to one or more defined criteria (e.g., predefined criteria, user-specified criteria, etc.), such as to have a grouping 1 298a that includes all of the acquisition locations on the first floor of the house 198, and to have a second grouping 2 298b that corresponds to additional acquisition locations 210P-210U on the second floor of the house 198 (not shown in FIG. 1B), or instead to have groupings (not shown) to separate a first grouping of acquisition locations within house 198 from one or more second groupings of acquisition locations outside house 198 (e.g., with one of the second groupings including acquisition locations within any buildings, while another of the second groupings includes acquisition locations outside of house 198 but within another related building). The grouping 2 further illustrates that some subgroups and corresponding sub-graphs may include only a single acquisition location node, such as if the available information is not yet sufficient to inter-connect that acquisition location with any other acquisition locations. Conversely, one or more nodes in the different groupings may be inter-connected, such as illustrated by a potential inter-connection between acquisition location 210G (near the bottom of the stairs on the main level) and acquisition location 210P (e.g., on the stairs, such as on a landing that has visual overlap with an area visible from acquisition location 210G). In other situations, only a single sub-graph may be displayed at a single time, edge connections and/or visual representations of nodes may not be shown or may be shown in other manners, and/or other visual changes may be made.

Information 230i2 illustrates a second example graph view in which displays of one or more sub-graphs may be shown in a manner similar to that of the first example graph view (although only the sub-graph for acquisition locations 210A, 210B, 210C and 210D is illustrated in this example), but with additional information shown for each acquisition location node. In particular, in this example, a thumbnail image is shown for each acquisition location node that includes some or all of the visual data of a photo captured at that acquisition location but in a reduced size—in other embodiments, the accompanying visual data may have other forms, such as a full-size photo, a photo or thumbnail image whose visual data is blurred or otherwise obscured, etc. In addition, in the first and second example graph views, some or all of the displayed information may be selectable by a user to obtain additional related functionality—as one example, selection of one of the thumbnail images 250at, 250bt, 250ct or 250dt of the second example graph view may cause a full-size image of the corresponding photo to be displayed, while selection of a node or edge may display additional available information about the corresponding one or more acquisition locations (e.g., additional information about a room in which the one or more acquisition locations are situated). Furthermore, a GUI in which one or more such views are shown (including example views discussed with respect to FIGS. 2I-2M) may have various other user-selectable controls, in addition to the user-selectable controls corresponding to selection of such displayed information that is part of a view.

Information 230i3 illustrates a third example graph view in a manner similar to that of the first example graph view, but in which additional predicted inter-connections between different sub-graphs are shown, such as to provide a prediction of the various acquisition locations in a single common global frame of reference. In particular, additional predicted inter-graph edge connections 217 have been added to correspond to additional predicted inter-connections may be an analysis of additional available information. As with the first and second example graph views, some or all of the displayed information in this third example graph view (and in other example views shown in other examples of FIGS. 2I-2M) may be selectable by a user to obtain additional related functionality. It will be appreciated that various other changes may be made in other embodiments.

FIG. 2J continues the examples of FIGS. 2A-2I, and in particular includes information 230j1 and 230j2 to illustrate example cloud view visualizations that may be displayed in some embodiments in one or more GUIs (not shown), such as to further use information from estimated photo poses and/or estimated structural shapes, including to provide a 3D visualization of inter-connected acquisition locations in some such embodiments. In particular, information 230j1 illustrates a cloud of visual information corresponding to acquisition locations 210A-210D, such as to have some similarities to information 230i2 of FIG. 2I. However, in this cloud view example, one of the acquisition location photos has been selected to be an initial primary photo (in this example, photo 250c captured at acquisition location 210C) that is centered and shown in an emphasized manner relative to that of the other photos (e.g., in a larger size, such as a full-size format), with thumbnail images for the other inter-connected acquisition locations being shown around that primary photo at corresponding relative positions (e.g., 3D relative positions) for those other inter-connected acquisition locations. In particular, in this example, the secondary deemphasized thumbnail images 250atb, 250btb and 250dtb are shown not only in a smaller size relative to that of the primary photo, but are also shown with the visual data of those thumbnail images being at least partially blurred or otherwise obscured to deemphasize those photos' visual data, and correspondingly further emphasize the primary photo. In a manner similar to that of the graph view examples, some or all of the displayed information may be selectable by a user to obtain additional related functionality—as one example, selection of one of the blurred thumbnail images may cause the corresponding photo to become the new primary photo in an updated display within the GUI, with the cloud view updated to emphasize that new primary photo. In particular, information 230j2 illustrates an example in which the thumbnail image 250btb for acquisition location 210B of information 230j1 has been selected in information 230j1, with the new primary photo 250b shown in information 230j2 in an emphasized manner, and with thumbnail images of the other acquisition locations being positioned at determined relative positions with respect to acquisition location 210B and being shown in a deemphasized manner similar to that of information 230j1 (including for previous primary photo 250c). Information 230j1 further illustrates an example of different types of edge connection visualizations that may be varied in some embodiments and situations, such as to reflect three-dimensional geographical positions, degrees of certainty, or other factors, as shown using different visual attributes for edge connections 218a-218c. As with the example graph views, some or all of the displayed information in these example cloud views may be selectable by a user to obtain additional related functionality. It will be appreciated that various other changes may be made in other embodiments.

Figure 2K:
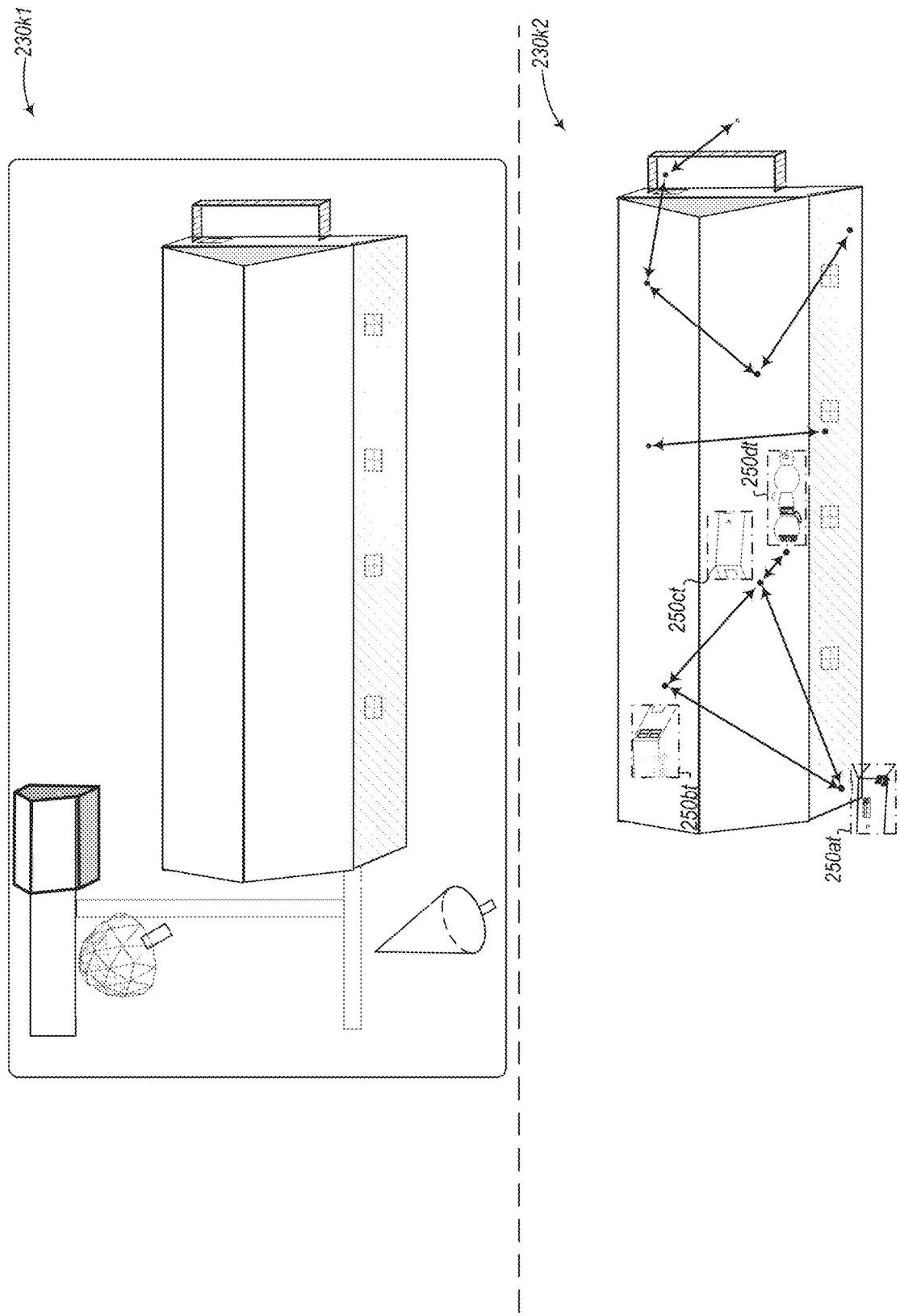
Figure 2L:
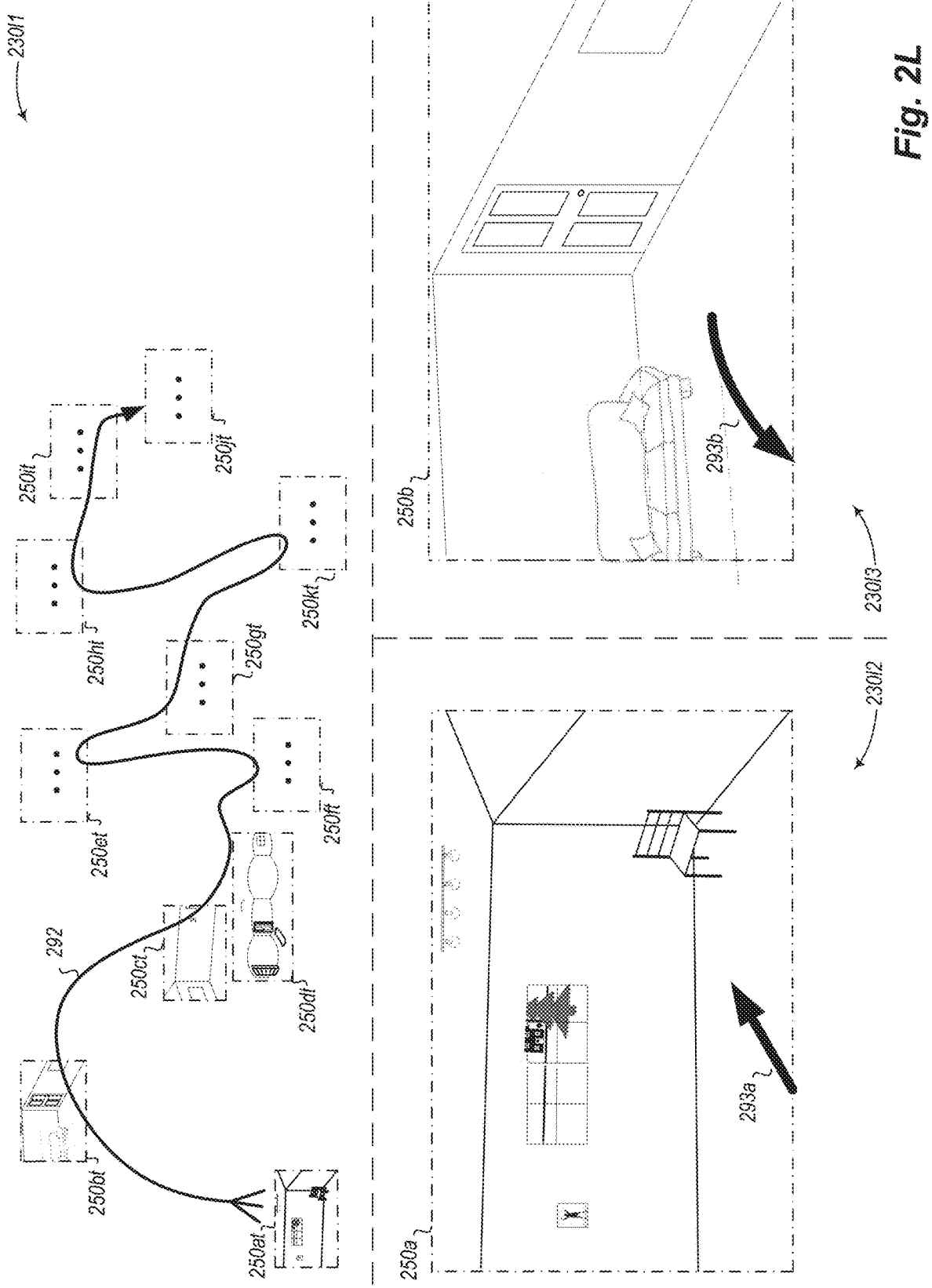
Figure 2N:
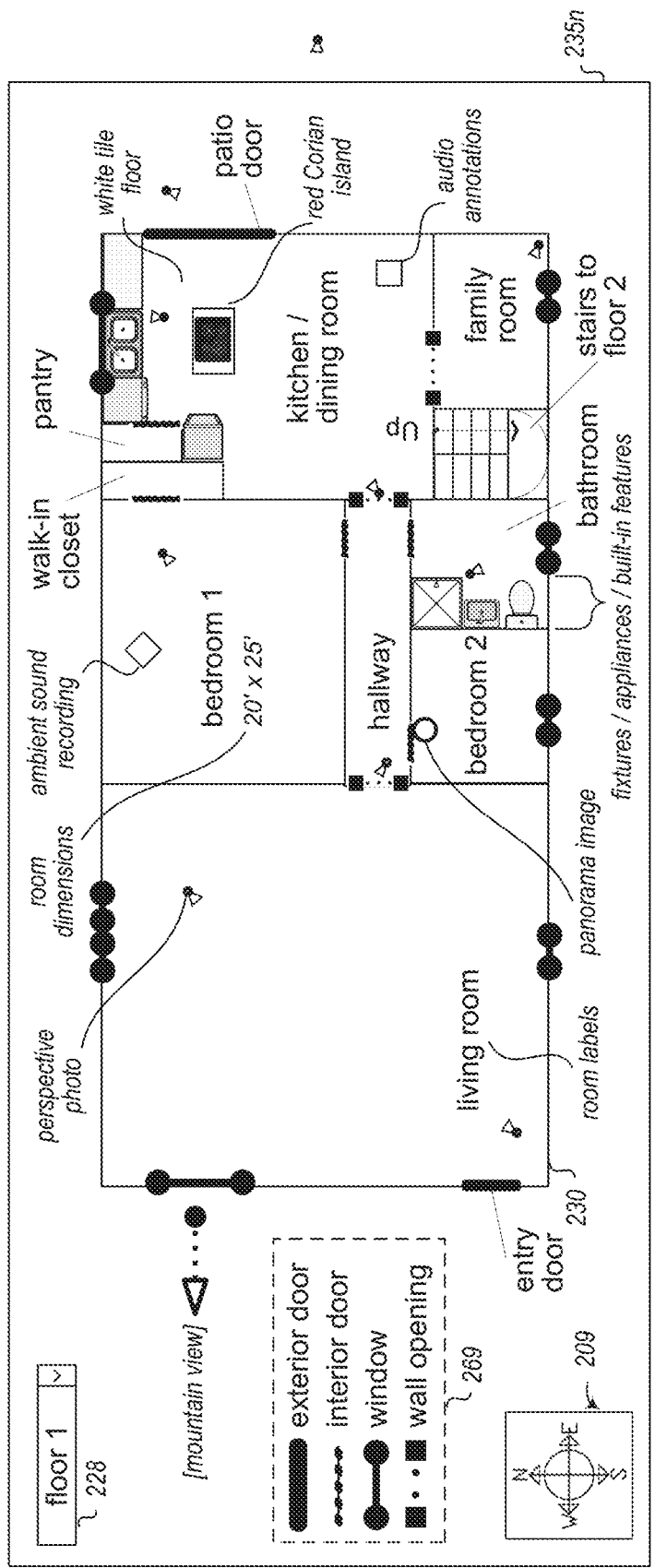

FIG. 2K continues the examples of FIGS. 2A-2J, and in particular includes information 230k2 to illustrate an example overhead image view visualization that may be displayed in some embodiments in one or more GUIs (not shown). In particular, information 230k1 first illustrates an example overhead image for the house 198 (although in at least some embodiments such information 230k1 may not be displayed to users), which in this example shows not only the house but also a surrounding yard and area, such as to include a garage, sidewalks, trees, and a deck. Information 230k2 further illustrates how the display of one or more sub-graphs may be overlaid on at least a portion of such an overhead image (e.g., on a portion of the overhead image that shows the house), such as to show the positions of the various acquisition locations in estimated relative positions corresponding to the exterior of the house (as well as relative to other acquisition locations within the same subgroup). In this example, thumbnail images are further shown for one sub-graph, although in other embodiments no such images may be shown for any sub-graphs or instead such images or other types of visual data (e.g., full-size photos) may be shown for all sub-graphs. Similarly, while all of the sub-graphs are displayed in this example, in other embodiments and situations only one or a subset of the sub-graphs may be included. While not shown in this example, one or more street-level images may further be used and displayed with overlaid sub-graph information in an analogous manner to that of the overhead image, whether instead of or in addition to the overhead image. As with the example graph views, some or all of the displayed information in these example overhead image views may be selectable by a user to obtain additional related functionality. It will be appreciated that various other changes may be made in other embodiments.

In one example embodiment, a determination of inferred internal positions of externally visible structures such as doors and windows may be used to perform the relative positioning of some or all acquisition locations with respect to the house exterior, such as via the following:

Input: Set of photos $\{I_1, I_2, \ldots I_n\}$, connected graph $G=(V,E)$ from topology algorithm, top-down or street-level image T of the house Output: A modified connected graph $G'=(V', E')$, of photos with their spatial locations aligned to image T. Optional additional output—a modified interactive image T' with the graph G' and photos 1 embedded in it For each photo $I_i$, use machine learning to detect objects and semantically meaningful attributes such as windows, walls, swimming pool, trees, lawn, etc. wherever possible, and call these $M_i=\{M_{i1}, M_{i2}, \ldots\}$. Then, estimate the shape of the room walls using computer vision and machine learning algorithms, referred to as $W_i$. Using 3D geometry or machine learned functions, estimate the position for each element in $M_i$ and $W_i$ with respect to the spatial graph G, estimated by the topology algorithm, with the positions referred to as $IM_i$ and $IW_i$. Project these position values to a top-down view, say $IM_i^T$ and $IW_i^T$. For the overhead and/or street-level image T, run image processing and computer vision algorithms to detect external walls of the house, with their detection positions in the image referred to as EMV. Next, run computer vision and machine learning algorithms to detect semantically meaningful attributes (as defined for the perspective photo above) with algorithms or models specifically designed and tuned for overhead and/or street-level views, with their detected positions in the image referred to as $EM_i$. Then, estimate a global translation and rotation value $T_G$ and $R_G$, such that when applied to the spatial graph G and projected positions $IM_i^T$ and $IW_i^T$, returns predicted positions $\widetilde{IM_i^T}$ and $\widetilde{IW_i^T}$ that have least error for their matching detections in $EM_i$ and $EW_i$. Next, establish matching objects or attributes between the sets $IM_i^T$ and $EW_i$, and sets $IW_i^T$ and $EM_i$. Matching may be performed using the label of the object/attribute or through a learned descriptor for the objects/attributes. Then optimize for the best $T_G$ and $R_G$ such that the error between matching objects in $\widetilde{IM_i^T}$ and $EM_i$, and $\widetilde{IW_i^T}$ and $EW_i$ is minimized. Here $\widetilde{IM_i^T}$ =Transform($IM_i^T, T_G, R_G$) and $\widetilde{IW_i^T}$ =Transform($IW_i^T, T_G, R_G$), where =Transform(X,T,R) applies the translation T and rotation R to yield the transformed coordinates of a point X. Optionally, as an alternative to matching objects, a RANSAC algorithm may be used to generate hypotheses for matching points and candidate $T_G$ and $R_G$ values, with the best candidate chosen after running many iterations of the algorithm. Then apply the best $T_G$ and $R_G$ value to the graph nodes in G to yield a transformed graph G'. Optionally, embed the graph nodes in G' onto the image T to yield image T' for visualization FIG. 2L continues the examples of FIGS. 2A-2K, and in particular includes information 23011, 23012 and 23013 to illustrate examples of a linked fly-through view visualization that may be displayed in some embodiments in one or more GUIs (not shown). In particular, information 23011 illustrates an example of visual data being shown for each acquisition location, along with a visual indicator 292 to show a determined sequence of those acquisition locations (beginning with the acquisition location 250A represented by thumbnail image 250at, moving to acquisition location 250B represented by thumbnail image 250bt, and continuing on until reaching a last acquisition location 250J represented by thumbnail image 250jt, although specific example visual data for acquisition locations 250et-250kt are not included for the sake of clarity). In some embodiments and situations, such information 23011 may be shown as a beginning of the linked fly-through view visualization before continuing to information displays such as that shown for information 23012 and 23013, while in other embodiments and situations such an overview shown in information 23011 may not be displayed to users. In this example, information 23012 and 23013 show examples of information displays corresponding to the first and second acquisition locations in the determined sequence, such as to be shown consecutively, with information 23012 including the photo 250a corresponding to the first acquisition location 250A and information 23013 including the photo 250b corresponding to the second acquisition location 250B. In this example, photo 250a further has an overlaid visual indicator 293a to indicate a direction from the first acquisition location to the next acquisition location in the sequence (i.e., to the second acquisition location), and photo 250b similarly has been overlaid visual indicator 293b to indicate a direction from that second acquisition location to the next acquisition location in the sequence (which is acquisition location 210C). While not illustrated in FIG. 2L, in other embodiments visual indicator(s) may be overlaid on a displayed photo or other displayed information to show directions to one or more previous acquisition locations in a sequence (whether by default or in response to a user request or instructions), whether in addition to or instead of visual indicator(s) overlaid on that displayed photo or other displayed information to show directions to one or more next acquisition locations in the sequence. Similarly, while not displayed in this example, in other embodiments a sequence for multiple acquisition locations may have other forms (e.g., a circle, having conditionals, having loops, etc.). In addition, while the displays for the remaining acquisition locations in the sequence are not shown, it will be appreciated that similar information may be displayed for each acquisition location in the sequence, with the display for the last acquisition location optionally not including an overlaid directional indicator (or instead may show a directional indicator back to the first acquisition location in the sequence, such as if the fly-through tour rotates back to the beginning of the sequence after the display for the last acquisition location is shown). In some embodiments, the information displays for the sequence of acquisition locations may proceed in an automated manner without further user interaction once the display for the first acquisition location in the sequence is initiated, while in other embodiments and situations a user may be able to control the advancement from the display of one acquisition location to that for a next acquisition location, such as by clicking on the currently displayed photo or otherwise indicating to proceed. As with the example graph views, some or all of the displayed information in these example linked fly-through views may be selectable by a user to obtain additional related functionality. It will be appreciated that various other changes may be made in other embodiments.

In one example embodiment, a determination of a sequence of acquisition locations may be made via the following:
  Input: Set of photos $\{I_1, I_2, \ldots I_n\}$, connected graph G from topology algorithm or G' from visualization algorithm applied to overhead image and/or street-level image
  Output: Automatically generated renderings for each photo (I'), sequences of edges between photos that may be rendered (FE) and transitions (FT) between photos that can be integrated automatically in a video-like stream or upon mouse clicks or other prompts by the user
  For each photo $IJ \in \{I_1, I_2, \ldots I_n\}$, generate a renderable photo or 3D format $I_i'$. suitable for the GUI to be used (e.g., incorporated within a browser, app, etc.). The renderable 3D format may be obtained, for example, using algorithms for depth estimation from single or multiple photos, and the 3D format may be, for example, sparse point depth-based or surface-based or voxel-based, depending on the algorithm used to estimate the depth. Depth may also be inferred through semantic segmentation of the photo into floor/wall/ceiling segments and using a geometry of the house to estimate the 3D position and relationships between these segments. Then, from the input graph G (or G), estimate a path or multiple paths from the graph along which the fly-through experience would traverse. Graph algorithms may be used to estimate a sequence of edges FE, such as to estimate the longest sequence of edges starting from a given node. The starting node may be a random node or one selected according to one or more defined criteria (e.g., containing the main door of the house, such as may be estimated through computer vision algorithms). For each edge $e=(imj) \in FE$, then estimate the fly-through transition parameters f, which the rendering algorithm would use to enable the transition from the starting photo i to destination photo j represented by e. An example of the transition f is the relative pose between camera poses at photos i and j, as follows: $f \to \{FT\}$.

FIG. 2M continues the examples of FIGS. 2A-2L, and in particular includes information 23012 to illustrate an example floor plan view visualization that may be displayed in some embodiments in one or more GUIs (not shown). Information 230m1 first shows partial structural shape information corresponding to acquisition locations 210A-210D (although in at least some embodiments such information 230m1 may not be displayed to users), including visual indicators of doors and windows in this example, and with visual data for each acquisition location being shown (in this example, thumbnail images 250at-250dt), and with additional partial structural shapes 231a-231d corresponding to structural shapes determined from the visual data of the photos associated with those thumbnail images. In this example, since the photos for these acquisition locations provide only a partial view of the interior of the living room, the partial structural shapes 231a-231c generated from the photos acquired at acquisition locations 210A-210C show only part of the living room walls. Information 230m2 further illustrates a floor plan view that incorporates such visual data for the acquisition locations along with the partial structural shapes illustrated in information 230m1, with the partial structural shapes being positioned based on estimated spatial relationships between them in order to represent the known parts of the living room's walls, as well as the visual indicators of windows and doors. Since the panorama photo for acquisition location 210D shows all of the interior of the bedroom in which that acquisition location is situated, a full structural shape 231d for that bedroom is generated, with the partial floor plan 294 of information 230m2 showing estimated relative spacing of the various structural shapes obtained from the photos for the acquisition locations 210A-210D. While not illustrated in FIG. 2M, such a partial floor plan view may further include predicted information about missing structural shape information for some or all of a room, such as to predict the missing wall, window and inter-room passage information for the living room. As with the example graph views, some or all of the displayed information in these example floor plan views may be selectable by a user to obtain additional related functionality. It will be appreciated that various other changes may be made in other embodiments.

In one example embodiment, a determination of at least a partial floor plan may be made via the following:
  Input: Set of photos $\{I_1, I_2, \ldots I_n\}$, local layouts LL=$\{LL_1, LL_2, \ldots LL_t\}$, connected graph G from topology algorithm
  Output: A partial or full floor plan LL' with spatially arranged local layouts and embedded photos
  For each layout $LL_i \in LL$, compute its global pose and rotation transform T based on the graph G. Then, transform $T(LL_i) \to LL_i'$ so that it aligns with the global reference frame, connect $LL_i$ to its respective photo from l for visualization, and add $LL_i'$ to LL'. Optionally further optimize the positions and rotations of LL so that the projected layouts of structures observed from multiple photos have least distance between their projections in the multiple local layouts.

FIG. 2N illustrates one example 235n of a 2D floor plan for the house 198, such as may be presented to an end-user in a GUI based on information generated for example visualization views (e.g., a floor plan view), with the living room being the most westward room of the house (as reflected by directional indicator 209)—it will be appreciated that a 3D or 2.5D computer model with wall height information may be similarly generated and displayed in some embodiments, whether in addition to or instead of such a 2D floor plan. Various types of information are illustrated on the 2D floor plan 235 mn in this example. For example, such types of information may include one or more of the following: room labels added to some or all rooms (e.g., "living room" for the living room); room dimensions added for some or all rooms; visual indications of fixtures or appliances or other built-in features added for some or all rooms; visual indications added for some or all rooms of positions of additional types of associated and linked information (e.g., of panorama photos and/or videos and/or other visual data that an end-user may select for further display, of audio annotations and/or sound recordings that an end-user may select for further presentation, etc.); visual indications added for some or all rooms of doors and windows; visual indications of built-in features (e.g., a kitchen island); visual indications of installed fixtures and/or appliances (e.g., kitchen appliances, bathroom items, etc.); visual indications of appearance and other surface information (e.g., color and/or material type and/or texture for installed items such as floor coverings or wall coverings or surface coverings); visual indications of views from particular windows or other building locations and/or of other information external to the building (e.g., a type of an external space; items present in an external space; other associated buildings or structures, such as sheds, garages, pools, decks, patios, walkways, gardens, etc.); a key or legend 269 identifying visual indicators used for one or more types of information; etc. When displayed as part of a GUI, some or all such illustrated information may be user-selectable controls (or be associated with such controls) that allows an end-user to select and display some or all of the associated information (e.g., to select the 360° panorama image indicator for acquisition location 210D or perspective photo indicator for acquisition location 210B to view some or all of the respective panorama image or photo (e.g., in a manner similar to that of FIG. 2B or 2J or 2L for photo 250b of acquisition location 210B). In addition, in this example a user-selectable control 228 is added to indicate a current floor that is displayed for the floor plan, and to allow the end-user to select a different floor to be displayed—in some embodiments, a change in floors or other levels may also be made directly from the floor plan, such as via selection of a corresponding connecting passage in the illustrated floor plan (e.g., the stairs to floor 2). It will be appreciated that a variety of other types of information may be added in some embodiments, that some of the illustrated types of information may not be provided in some embodiments, and that visual indications of and user selections of linked and associated information may be displayed and selected in other manners in other embodiments.

In addition, as noted elsewhere herein, in some embodiments one or more corresponding GUIs may be provided to enable user input to be provided to supplement information automatically determined by the MIGVM system, such as for connecting disjoint subgraphs, to edit/remove connections that the user finds incorrect, to adjust relative positions or other automatically determined information, etc. Furthermore, in at least some embodiments, a user's experience may be enhanced by personalization of visualizations for a user based on user-specific information (e.g., the user's history, user-specified preferences, etc.) and/or machine-learned predictions. In addition, crowd-sourced improvement of the overall system for other users may be used in some embodiments, such as by obtaining and incorporating additional perspective photos and/or other visual data (e.g., after initial automated determinations are performed by the MIGVM system using an initial set of perspective photos and optionally additional information), based on each individual user's edits, etc. For graph and cloud visualizations, for example, a user can be provided control on how to group and/or filter the acquisition locations and/or associated photos to be shown, such as by specifying one or more grouping criteria and/or filtering criteria—as one example, a filter or slider user-selectable control may enable a user to choose between 'view-point' criteria (e.g., to organize a sub-graph by relative poses computed through computer vision algorithms), 'room-type' criteria (e.g., to organize a sub-graph by grouping together rooms of the same type, such as bedrooms or bathrooms), or other criteria. It will be appreciated that additional types of user-selectable controls may be used.

Additional details related to embodiments of a system providing at least some such functionality of an MIGVM system or related system for generating floor plans and associated information and/or presenting floor plans and associated information are included in U.S. Non-Provisional patent application Ser. No. 16/190,162, filed Nov. 14, 2018 and entitled "Automated Mapping Information Generation From Inter-Connected photos" (which includes disclosure of an example Mapping Information Generation and Visualization Manager, or MIGVM, system that is generally directed to automated operations for generating and displaying a floor plan or other floor plan of a building using photos acquired in and around the building); in U.S. Non-Provisional patent application Ser. No. 16/681,787, filed Nov. 12, 2019 and entitled "Presenting Integrated Building Information Using Three-Dimensional Building Models" (which includes disclosure of an example MIGVM system that is generally directed to automated operations for displaying a floor plan or other floor plan of a building and associated information); in U.S. Non-Provisional patent application Ser. No. 16/841,581, filed Apr. 6, 2020 and entitled "Providing Simulated Lighting Information For Three-Dimensional Building Models" (which includes disclosure of an example MIGVM system that is generally directed to automated operations for displaying a floor plan or other floor plan of a building and associated information); in U.S. Non-Provisional Patent application Ser. No. 17/080,604, filed Oct. 26, 2020 and entitled "Generating floor plans For Buildings From Automated Analysis Of Visual Data Of The Buildings' Interiors" (which includes disclosure of an example VTFM system that is generally directed to automated operations for generating a floor plan or other floor plan of a building using visual data acquired in and around the building); and in U.S. Non-Provisional patent application Ser. No. 16/807,135, filed Mar. 2, 2020 and entitled "Automated Tools For Generating Mapping Information For Buildings" (which includes disclosure of an example MIGVM system that is generally directed to automated operations for generating a floor plan or other floor plan of a building using photos acquired in and around the building); in U.S. Non-Provisional patent application Ser. No. 17/069,800, filed Oct. 13, 2020 and entitled "Automated Tools For Generating Building Mapping Information"; and in U.S. Non-Provisional patent application Ser. No. 17/013, 323, filed Sep. 4, 2020 and entitled "Automated Analysis Of photo Contents To Determine The Acquisition Location Of The photo" (which includes disclosure of an example MIGVM system that is generally directed to automated operations for generating a floor plan or other floor plan of a building using photos acquired in and around the building); each of which is incorporated herein by reference in its entirety. In addition, further details related to embodiments of a system providing at least some such functionality of a system for using acquired photos and/or generated floor plans are included in U.S. Non-Provisional patent application Ser. No. 17/185,793, filed Feb. 25, 2021 and entitled "Automated Usability Assessment Of Buildings Using Visual Data Of Captured $I_n$-Room photos" (which includes disclosure of an example Building Usability Assessment Manager, or BUAM, system that is generally directed to automated operations for analyzing visual data from photos captured in rooms of a building to assess room layout and other usability information for the building's rooms and optionally for the overall building, and to subsequently using the assessed usability information in one or more further automated manners); each of which is incorporated herein by reference in its entirety.

Various details have been provided with respect to FIGS. 2A-2N, but it will be appreciated that the provided details are non-exclusive examples included for illustrative purposes, and other embodiments may be performed in other manners without some or all such details.

Figure 3:
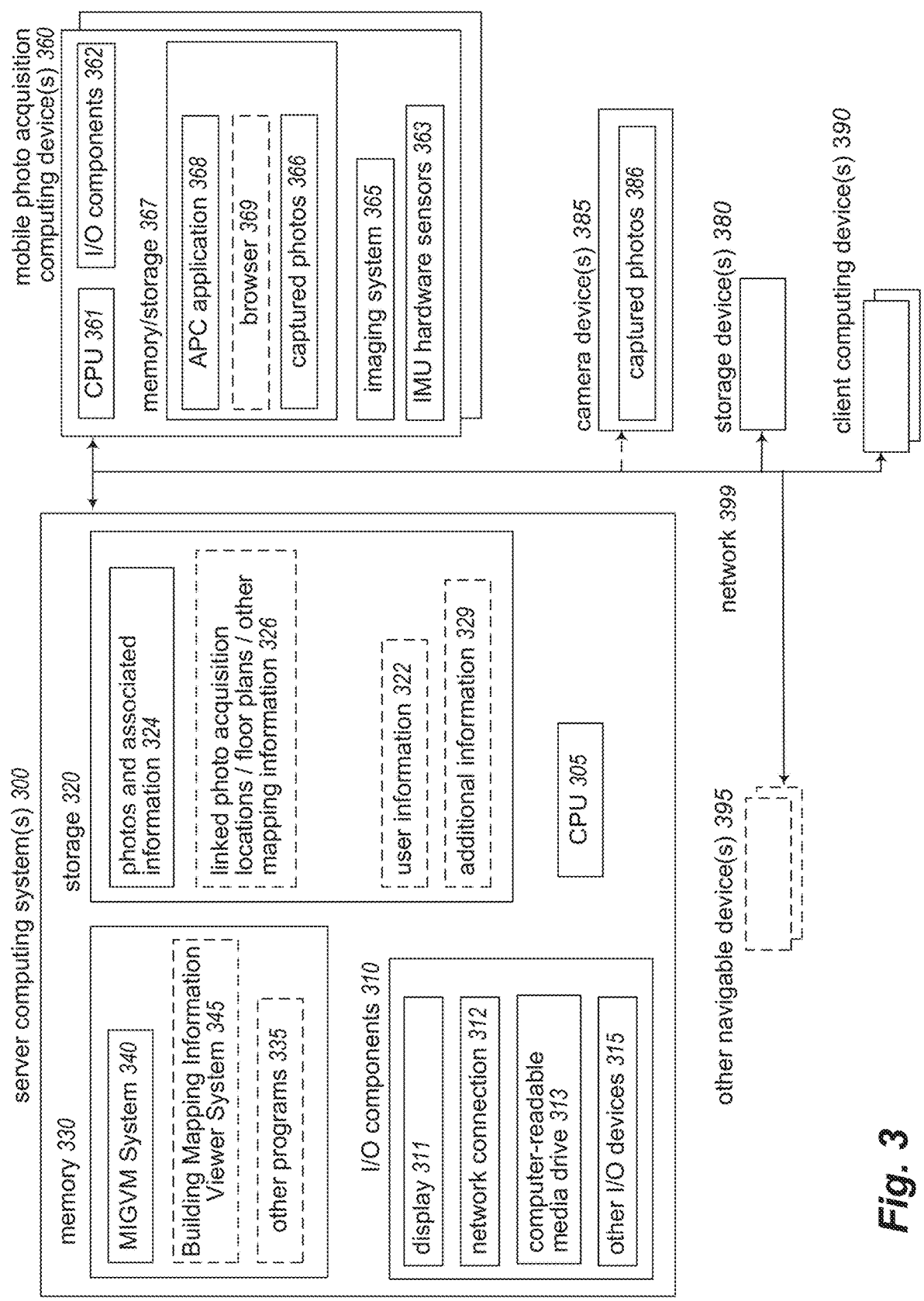
FIG. 3 is a block diagram illustrating a computing system suitable for executing an embodiment of a system that performs at least some of the techniques described in the present disclosure.

FIG. 3 is a block diagram illustrating an embodiment of one or more server computing systems 300 executing an implementation of an MIGVM system 340—the server computing system(s) and MIGVM system may be implemented using a plurality of hardware components that form electronic circuits suitable for and configured to, when in combined operation, perform at least some of the techniques described herein. In the illustrated embodiment, each server computing system 300 includes one or more hardware central processing units ("CPU") or other hardware processors 305, various input/output ("I/O") components 310, storage 320, and memory 330, with the illustrated I/O components including a display 311, a network connection 312, a computer-readable media drive 313, and other I/O devices 315 (e.g., keyboards, mice or other pointing devices, microphones, speakers, GPS receivers, etc.).

The server computing system(s) 300 and executing MIGVM system 340 may communicate with other computing systems and devices via one or more networks 399 (e.g., the Internet, one or more cellular telephone networks, etc.), such as user client computing devices 390 (e.g., used to generated mapping-related information and/or associated photos or other visual data), mobile photo acquisition computing devices 360 (e.g., on which an APC system application 368 may optionally execute to perform the acquisition of captured photos 366), optionally one or more camera devices 385 that perform the acquisition of captured photos 386 if the camera devices include networking capabilities or other data transmission capabilities, optionally other storage devices 380 (e.g., used to store and provide additional information related to buildings; used to store and provide captured photos, such as instead of or in addition to devices 360 and/or 385; etc.), and optionally other navigable devices 395 that receive and use generated mapping-related information for navigation purposes (e.g., for use by semi-autonomous or fully autonomous vehicles or other devices).

In the illustrated embodiment, an embodiment of the MIGVM system 340 executes in memory 330 in order to perform at least some of the described techniques, such as by using the processor(s) 305 to execute software instructions of the system 340 in a manner that configures the processor(s) 305 and computing system 300 to perform automated operations that implement those described techniques. The illustrated embodiment of the MIGVM system may include one or more components, not shown, to each perform portions of the functionality of the MIGVM system, and the memory may further optionally execute one or more other programs 335—as one specific example, a copy of the APC system may execute as one of the other programs 335 in at least some embodiments, such as instead of or in addition to the APC system 368 on the computing device(s) 360, and as another specific example, a copy of a Building Mapping Information Viewer system 345 may execute to provide visualization view information to end users (e.g., users of client computing devices 390), although in other embodiments such a Mapping Information Viewer system may instead execute on one or more such client computing devices 390. The MIGVM system 340 may further, during its operation, store and/or retrieve various types of data on storage 320 (e.g., in one or more databases or other data structures), such as various types of user information 322, photo and other associated information 324 (e.g., photo acquisition IMU data and/or other metadata, and such as for analysis to generate mapping-related information; to provide to users of client computing devices 390 for display; etc.), generated mapping-related information 326 (e.g., generated and sub-graphs of linked acquisition locations, floor plans and/or constituent structural shapes, building and room dimensions for use with associated floor plans, etc.) and/or various types of optional additional information 328 (e.g., additional images and/or videos and/or other visual data, non-visual data captured in a building, annotation information, various analytical information related to presentation or other use of one or more building interiors or other environments captured by an APC system, etc.).

Some or all of the user client computing devices 390 (e.g., mobile devices), computing devices 360, camera devices 385, storage devices 380, and other navigable devices 395 may similarly include some or all of the same types of components illustrated for server computing system 300. As one non-limiting example, the computing devices 360 are each shown to include one or more hardware CPU(s) 361, I/O components 362, memory and/or storage 367, as well as an imaging system 365 and IMU hardware sensors 363, and with an embodiment of the APC system 368 on memory/storage 367 and captured photos 366 that are generated by the APC system, as well as optionally other programs such as a browser 369. While particular components are not illustrated for the other navigable devices 395 or other devices/systems 380 and 385 and 390, it will be appreciated that they may include similar and/or additional components.

It will also be appreciated that computing system 300 and the other systems and devices included within FIG. 3 are merely illustrative and are not intended to limit the scope of the present invention. The systems and/or devices may instead each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, digital music player devices, handheld gaming devices, PDAs, wireless phones, Internet appliances, and various other consumer products that include appropriate communication capabilities. In addition, the functionality provided by the illustrated MIGVM system 340 may in some embodiments be distributed in various components, some of the described functionality of the MIGVM system 340 may not be provided, and/or other additional functionality may be provided.

It will also be appreciated that, while various items are illustrated as being stored in memory or on storage while being used, these items or portions of them may be transferred between memory and other storage devices for purposes of memory management and data integrity. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the MIGVM system 340 and/or APC software 368 executing on server computing systems 300 and/or computing devices 360) and/or data structures, such as by execution of software instructions of the one or more software programs and/or by storage of such software instructions and/or data structures, and such as to perform algorithms as described in the flow charts and other disclosure herein. Furthermore, in some embodiments, some or all of the systems and/or components may be implemented or provided in other manners, such as by consisting of one or more means that are implemented partially or fully in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 4A:
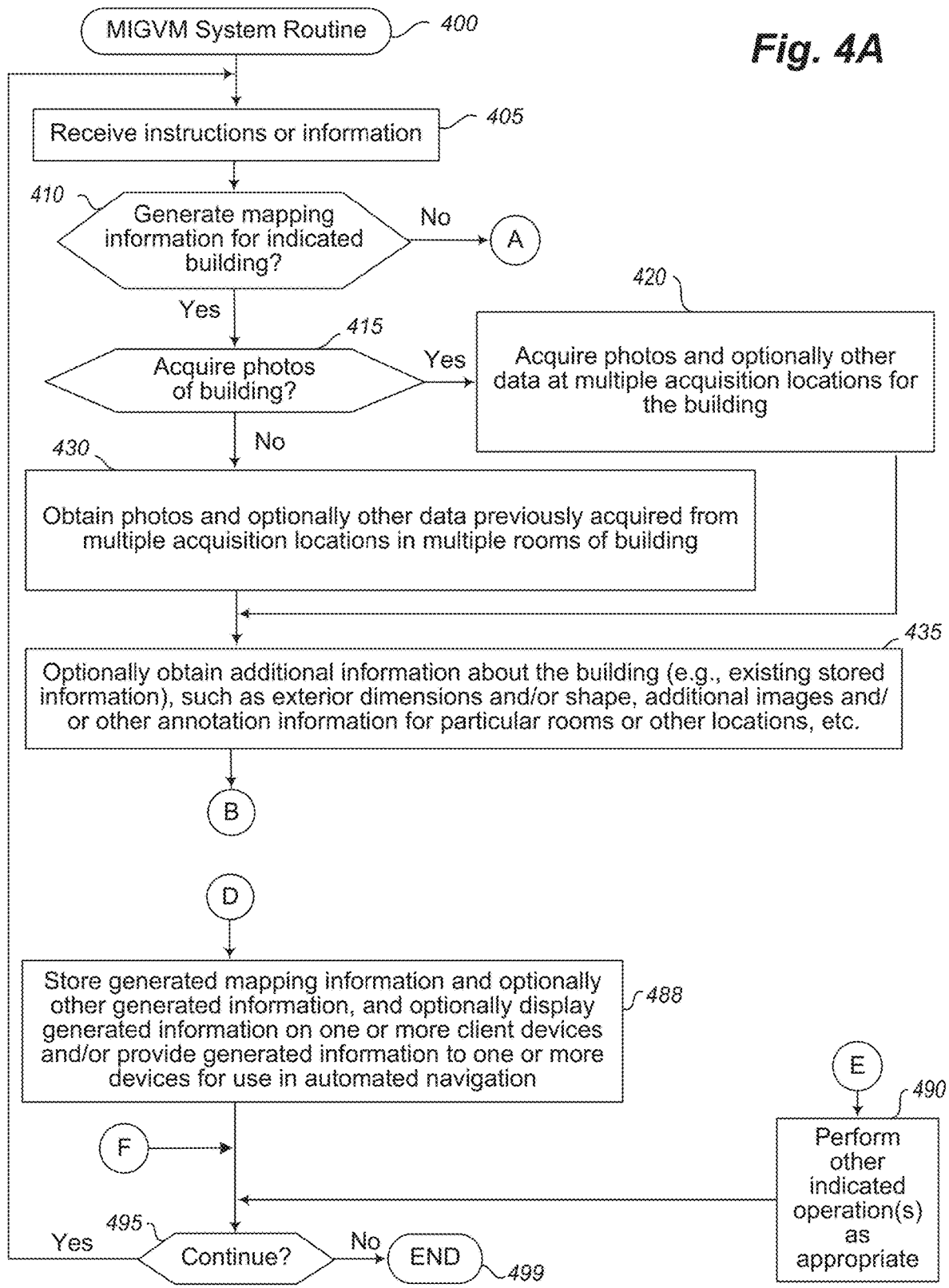

FIGS. 4A-4C illustrate an example embodiment of a flow diagram for a Mapping Information Generation and Visualization Manager (MIGVM) System routine 400. The routine may be performed by, for example, execution of the MIGVM system 160 of FIG. 1A, the MIGVM system 340 of FIG. 3, and/or an MIGVM system as described with respect to FIGS. 2D-2N and elsewhere herein, such as to generate mapping-related information (e.g., linked acquisition locations and associated photos, at least a partial floor plan, etc.) for a defined area based at least in part on photos of the area. In the example of FIGS. 4A-4C, the generated mapping information includes linked acquisition locations and associated photos and at least a partial 2D floor plan and 3D computer model of a building, such as a house, but in other embodiments, other types of mapping information may be determined and generated for other types of buildings and used in other manners, as discussed elsewhere herein.

The illustrated embodiment of the routine begins at block 405, where information or instructions are received. The routine continues to block 410 to determine whether the instructions received in block 405 indicate to generate mapping information for an indicated building, and if so the routine continues to perform blocks 415-488 to do so, and otherwise continues to block 480.

Figure 7:
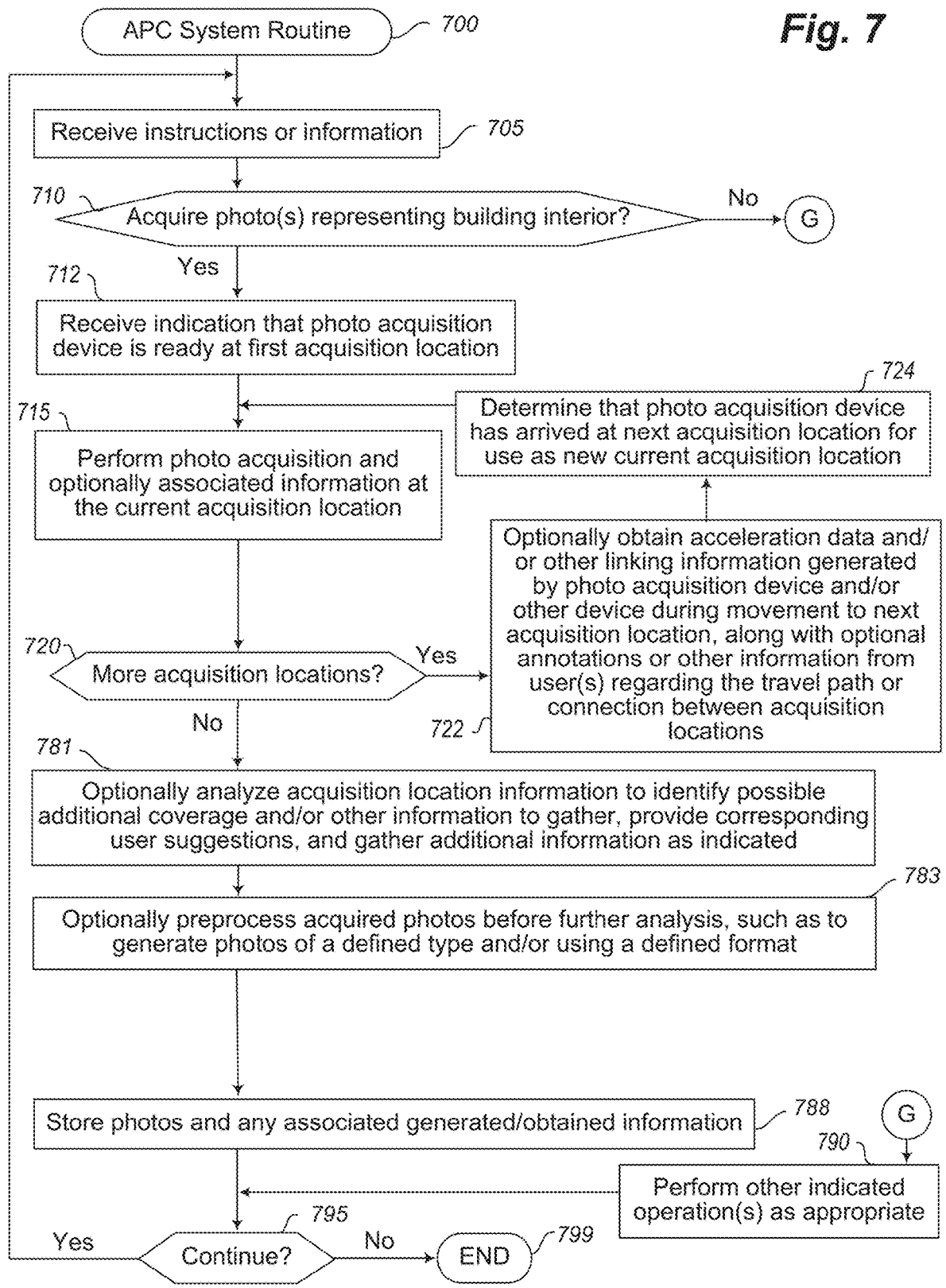
FIG. 7 illustrates an example embodiment of a flow diagram for an Automated Photo Capture (APC) system routine in accordance with an embodiment of the present disclosure.

In block 415, the routine determines whether photo information is already available for the building, or if such information instead is to be acquired. If it is determined in block 415 that the information is to be acquired, the routine continues to block 420 to acquire such information, optionally waiting for one or more users or devices to move throughout the building and acquire perspective photos and optionally additional information at multiple acquisition locations in multiple rooms of the building, as discussed in greater detail elsewhere herein-FIG. 7 provides one example embodiment of an APC system routine for performing at least some such photo acquisition. If it is instead determined in block 415 that photos of the building are already available, the routine continues instead to block 430 to obtain existing photos and optionally additional information for the building, optionally along with metadata information related to photo acquisition and/or movement between the acquisition locations, such as may in some situations have been supplied in block 405 along with the corresponding instructions.

After blocks 420 or 430, the routine continues to block 435 to optionally obtain additional available information about the building (whether based on activities performed during initial photo acquisition and/or afterwards), such as based on acquired annotation information and/or information from one or more external sources (e.g., online databases, information provided by one or more end-users, etc.) and/or information from analysis of acquired photos (e.g., initial photos and/or additional photos, such as for additional photos captured at locations different from acquisition locations of the initial photos)—such additional obtained information may include, for example, exterior dimensions and/or shape of the building, information about built-in features (e.g., a kitchen island), information about installed fixtures and/or appliances (e.g., kitchen appliances, bathroom items, etc.); information about visual appearance information for building interior locations (e.g., color and/or material type and/or texture for installed items such as floor coverings or wall coverings or surface coverings), information about views from particular windows or other building locations, other information about areas external to the building (e.g., other associated buildings or structures, such as sheds, garages, pools, decks, patios, walkways, gardens, etc.; a type of an external space; items present in an external space; etc.).

After block 435, the routine continues to block 440 to analyze visual data of the photos, including to, for each photo, identify visible features (e.g., structural wall elements) and estimate pose (including acquisition location and capture orientation), and to then determine matching features between subgroups of two or more photos. In block 445, the routine then determines, for each subgroup of two or more photos, an estimation of a local layout of the photos' relative acquisition location positions based at least in part on the photos' estimated poses and on an analysis of visual data for the photos' matching features. In block 450, the routine then optionally determines, for each photo, an estimation of structural shapes shown in the visual data of the photo, as well as to determine estimated locations of those structural shapes relative to the photo's acquisition location, and to then determine, for each subgroup of two or more photos, an estimate of the spatial relationships between the estimated structural shapes from the photos of the subgroup. In block 455, the routine then optionally attempts to predict layout relationships between acquisition locations and associated photos of different subgroups using additional data, and to use that predicted information to determine an estimation of an overall layout of some or all of the acquisition locations and their associated photos, and/or to determine at least a partial floor plan for the building using the estimated structural shapes. In block 460, the routine then optionally analyzes the photos' visual data to attempt to identify wall elements of some or all rooms, such as windows, wall borders with other walls and/or floors and/or ceilings, doors and other inter-room openings and other connecting passages in and out of rooms, etc., and to associate some or all such identified wall elements with corresponding semantic labels that are added to the floor plan or otherwise use to annotate captured photos. In block 465, the routine then generates a graph representation that includes nodes for the various acquisition locations and includes edges representing inter-connections between acquisition locations of a subgroup, with the graph representation including multiple separate and disjointed subgraphs unless all acquisition locations are inter-connected, and associates corresponding photos and optionally additional information for acquisition locations with their nodes. In block 470, the routine then optionally analyzes the photos as well as other information determined by the MIGVM system to generate embedding vectors to represent photos and photo pairs, such as to represent information about them that enables determination of similar photos that have similar embedding vectors. Additional details are included elsewhere herein regarding example embodiments for the operations of blocks 440-470. In addition, it will be appreciated that while blocks 440-470 are illustrated as separate operations in this example, in some embodiments a single analysis of the photos may be performed to acquire or determine multiple types of information, such as those discussed with respect to some or all of blocks 440-470.

After block 470, the routine optionally performs one or more steps 471-477 to determine and associate additional information with the floor plan. In block 471, the routine optionally adjusts the partial or full floor plan by applying one or more constraints, such as based on matching connecting passages between rooms, using 90° inter-wall connections assumptions, etc., as discussed in greater detail elsewhere herein. In block 473, the routine optionally estimates the dimensions of some or all of the rooms, such as from analysis of photos and/or their acquisition metadata or from overall dimension information obtained for the exterior of the building, and associates the estimated dimensions with the floor plan—it will be appreciated that if sufficiently detailed dimension information is available, architectural drawings, blueprints, etc. may be generated from the floor plan. In block 475, the routine optionally associates further information with the floor plan (e.g., with particular rooms or other locations within the building), such as additional photos and/or additional types of other acquired information in the building and/or annotation information. In block 477, the routine further estimates heights of walls in some or all rooms, such as from analysis of photos and optionally sizes of known objects in the photos, as well as height information about a camera when the photos were acquired, and further uses such information to generate a 3D computer model of the building, with the 3D model and the floor plan being associated with each other.

After block 477, the routine continues to block 488 to store the generated mapping information and optionally other generated information, and to optionally further use the generated mapping information, such as to provide generated mapping-related information to one or more recipients (e.g., to provide that generated information to one or more other devices for use in automating navigation of those devices and/or associated vehicles or other entities). The routine may further continue to generate and provide visualizations of one or more views of the generated mapping-related information, such as returning to block 405 via block 495, and then continuing to block 480.

If it is instead determined in block 410 that the information or instructions received in block 405 are not to generate mapping information for an indicated building, the routine continues instead to block 480 to determine if the information or instructions received in block 405 are to provide a visualization of generated mapping-related information for a building (e.g., for mapping information that was just generated for that building via operations of blocks 435-477, for stored mapping information that was previously generated, etc.), and if so continues to perform blocks 481-487 to generate and provide such a visualization. In particular, in block 481 the routine obtains stored mapping-related information for the indicated building, and continues to block 483 to generate one or more visualizations of the mapping-related information for at least some of the building (e.g., one or more of a graph view, cloud view, overhead image view, linked fly-through view, floor plan view, etc.)—FIG. 5 illustrates one example of a routine for generating such a visualization, such as after being invoked in block 483. In block 484, the routine then receives the generated visualization, and provides it for display, such as by transmitting the generated visualization to one or more client devices over one or more networks for display in GUIs on those client devices. In block 485, the routine then waits for instructions and determines whether to proceed to update and/or modify the provided visualization, such as in response to one or more selections made by the recipients of the provided visualization (e.g., via use of one or more user-selectable controls in a GUI in which the visualization is displayed). If it is determined in block 485 to update or modify the visualization, the routine continues to block 487, where it receives information about a user selection or other instruction corresponding to the update or modification, and then returns to block 483 to generate a corresponding updated or modified visualization. It will be appreciated that in some embodiments and situations, some such modifications and updates may be performed locally on the client device without further interactions with the computing device executing the routine 400, such as to change the display options in a manner associated with information already provided for the visualization. In addition, it will be appreciated that while the illustrated example embodiment may in some places indicate operations in a synchronous manner in which the routine waits for certain types of information before proceeding, in other embodiments the routine may operate in an asynchronous manner in which the routine continues to perform additional types of operations while waiting for such types of information and then responding accordingly when that information is received.

If it is instead determined in block 490 that the information or instructions received in block 405 are not to provide a visualization of generated mapping-related information for a building, the routine continues instead to block 490 to perform one or more other indicated operations as appropriate. Such other operations may include, for example, receiving and responding to requests for previously generated computer models and/or floor plans and/or other generated mapping-related information (e.g., requests for such information to provide it to one or more other devices for use in automated navigation; requests for such information for display on one or more client devices, such as for such information matching one or more specified search criteria; etc.), obtaining and storing information about buildings for use in later operations (e.g., information about dimensions, numbers or types of rooms, total square footage, adjacent or nearby other buildings, adjacent or nearby vegetation, exterior photos, overhead images, street-level images, etc.), etc.

After blocks 488 or 490, or if it is determined in block 485 not to update or modify the provided visualization, the routine continues to block 495 to determine whether to continue, such as until an explicit indication to terminate is received, or instead only if an explicit indication to continue is received. If it is determined to continue, the routine returns to block 405 to wait for and receive additional instructions or information, and otherwise continues to block 499 and ends.

FIG. 5 illustrates an example embodiment of a flow diagram for a Generate Building Mapping Information Visualization component routine 500. The routine may be performed by, for example, execution of a component of the MIGVM system 160 of FIG. 1A, of the MIGVM system 340 of FIG. 3, and/or of an MIGVM system as described with respect to FIGS. 2D-2N and elsewhere herein, such as to generate one or more visualizations of mapping-related information for at least some of an indicated building (e.g., one or more of a graph view, cloud view, overhead image view, linked fly-through view, floor plan view, etc.)—in at least some embodiments, the routine may be invoked at block 483 of routine 400 of FIGS. 4A-4C and return to that location when completed. While the illustrated embodiment of the routine 500 generates only a single type of view for a single building at a time, it will be appreciated that other embodiments of the routine may simultaneously generate and return multiple different types of views with respect to mapping-related information generated for a building and/or may simultaneously generate and return one or more types of views for multiple buildings (e.g., multiple related buildings, such as on a single property; multiple separate buildings for comparison; etc.).

The illustrated embodiment of the routine 500 begins at block 510, where mapping-related information is received for an indicated building. The routine then continues to block 515, where it determines a type of visualization view to generate (e.g., based on received instructions, based on previously available information corresponding to a specified recipient, etc.), and proceeds accordingly. In particular, if the type of visualization view is a graph view, the routine continues to block 520 to generate a view of one or more graphs (e.g., one or more sub-graphs for multiple subgroups) each having at least one node representing an associated photo acquisition location, with edges between the nodes representing determined relative positions of those acquisition locations, and optionally with thumbnail images or other visual data associated with and shown proximate to (e.g., beside or on top of) some or all nodes, such as corresponding to at least one photo acquired at a node's acquisition location, and optionally with predicted connections between multiple partial sub-graphs whose nodes represent different subgroups of acquisition locations.

If the type of visualization view is instead an overhead image view (and/or a street-level view), the routine continues to block 530 to obtain an overhead image (and/or a street-level image) for the building and to generate a version of the image(s) with overlaid information corresponding to one or more graphs (or sub-graphs) of nodes corresponding to acquisition locations for the building, with the positions of the nodes being overlaid on the image(s) at locations corresponding to exterior structures of the building as well as using determined relative positions between inter-connected nodes of a sub-graph. In at least some such embodiments, the graph information to overlay on the image(s) may be obtained by first performing block 520 before continuing on to block 530, while in other embodiments previously generated and stored graph information for the building may be retrieved and used.

If the type of visualization view is instead a cloud view, the routine continues instead to block 540, where it generates one or more inter-connected clouds of photos for multiple acquisition locations of a subgroup, with one of the photos selected as an initial primary photo around which visual data of the other photos is shown in a deemphasized manner and at determined relative positions for the acquisition locations of those other photos (e.g., determined 3D relative positions). In the illustrated embodiment, the deemphasized secondary photos may be thumbnails images, optionally with visual data of the thumbnail images being blurred or otherwise obscured.

If the type of visualization view is instead a linked fly-through view, the routine continues instead to block 550 where it determines a sequence or some or all photos for the building (e.g., based on the relative positions of their acquisition locations, based on visual data of the photos, based on one or more other indicated criteria, etc.), selects a first photo in the sequence for display, and generates a display of that photo that is optionally overlaid with one or more visual indicators of a direction from the visual data of that photo toward the location of a next acquisition location in the sequence. The generated display may further optionally with an associated automated indicator (e.g., a timer) and/or a user-selectable control to cause a transition to a next corresponding image of the sequence. In some embodiments, a corresponding display for each photo in the sequence is generated and provided together, with only the first photo's display to be shown initially before the transition occurs to the next photo's display, etc. In addition, while not illustrated in this embodiment, in other embodiments an overview display may be generated that includes a visual representation of all of the photos along with one or more visual indicators of the sequence of those photos to be displayed, such as before the display is shown with the first photo for the first acquisition location of the sequence.

If the type of visualization view is instead a floor plan view, the routine continues instead to block 560 where it generates at least a partial floor plan for the building using structural shapes determined from photos' visual data and positioned at relative locations corresponding to determined relative spacing between the structural shapes. The generated display may further optionally include thumbnail images or other visual data corresponding to some or all structural shapes (e.g., for a particular structural shape, a photo from which that structural shape is identified), and may further optionally generate and provide predicted structural connections between some or all partial structural shapes, such as to attempt to generate and provide a full floor plan.

After blocks 520, 530, 540, 550 or 560, the routine continues to block 590, where it returns the generated information for display (e.g., to block 483 of routine 400), and then returns at block 599.

Figure 6:
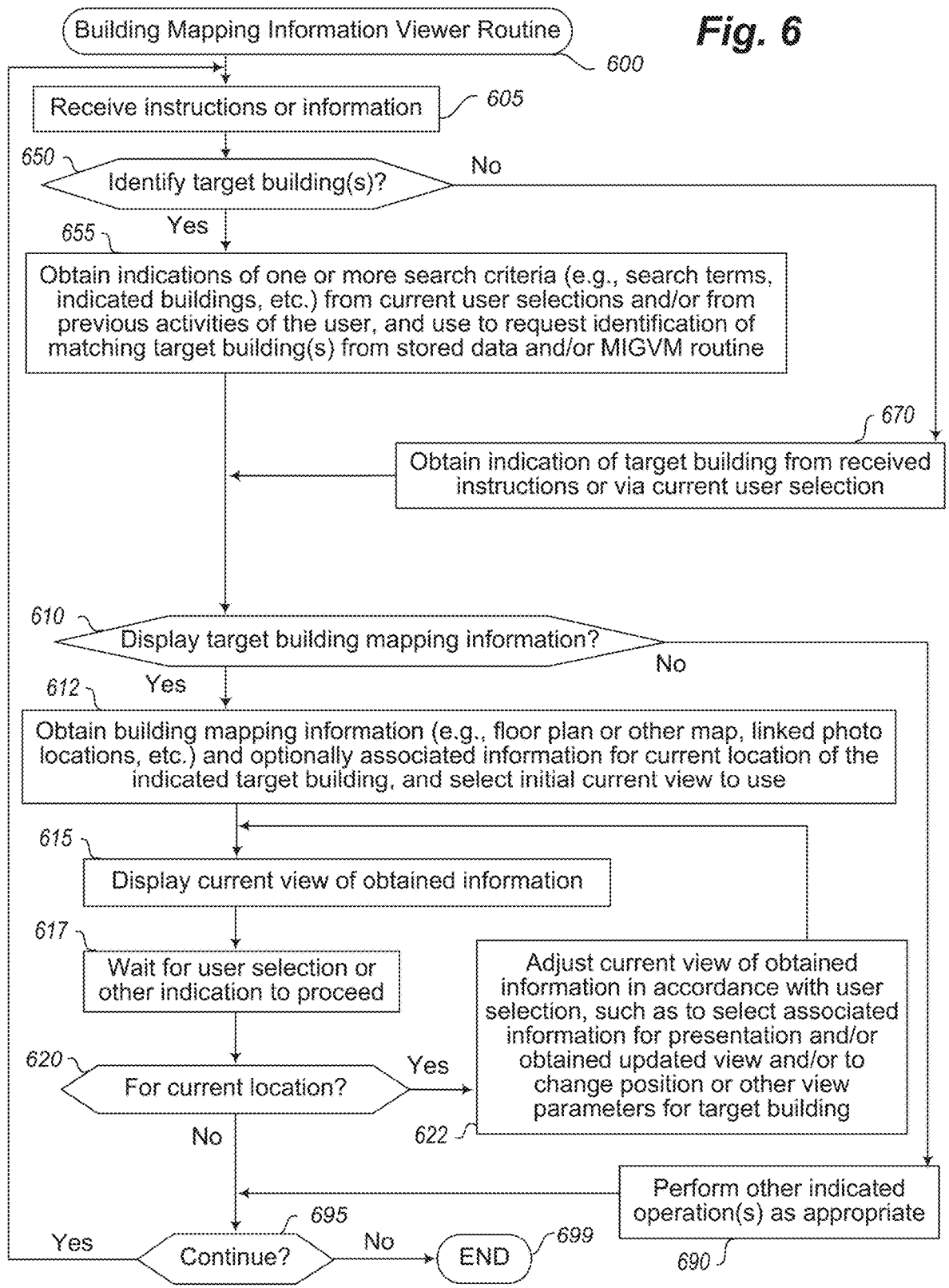
FIG. 6 illustrates an example embodiment of a flow diagram for a Building Mapping Information Viewer system routine in accordance with an embodiment of the present disclosure.

FIG. 6 illustrates an example embodiment of a flow diagram for a Building Map Viewer system routine 600. The routine may be performed by, for example, execution of a map viewer client computing device 175 and its software system(s) (not shown) of FIG. 1A, the Building Map Viewer system 345 and/or a client computing device 390 of FIG. 3, and/or a mapping information viewer or presentation system as described elsewhere herein, such as to select information for one or more buildings based on user-specific criteria (e.g., one or more groups of inter-connected linked photos each representing some or all of a building; one or more building 2D floor plans and/or other related mapping information, such as a 3D computer model or a 2.5D computer model; additional information associated with particular locations in the floor plan(s) or other mapping information, such as additional photos and/or other types of data acquired in buildings; etc.), and to receive and display corresponding building information to an end-user. In the example of FIG. 6, the presented mapping information is at least in part for the interior of a building (such as a house), but in other embodiments, other types of mapping information may be presented for other types of buildings or environments and used in other manners, as discussed elsewhere herein.

The illustrated embodiment of the routine begins at block 605, where instructions or information are received. After block 605, the routine continues to block 650, where it determines whether the instructions or other information received in block 605 indicate to identify one or more target buildings whose information is to be presented based at least in part on user-specific criteria, and if not continues to block 670 to obtain an indication of a target building to use from the end-user (e.g., based on a current user selection, such as from a displayed list or other user selection mechanism; based on information received in block 605; etc.). Otherwise, the routine continues to block 655, where it obtains indications of one or more search criteria to use (e.g., one or more initial buildings to use for which to identify similar target buildings, such as from current user selections and/or from previous user selections or other previous user activities and/or as indicated in the information or instructions received in block 605; one or more explicit search terms; etc.). The routine then obtains information about one or more corresponding target buildings, such as by requesting the information from the MIGVM system and/or an associated storage system, and selects a best match target building to initially further use if information about multiple target buildings is returned (e.g., the returned other building with the highest similarity rating to one or more initial buildings or for one or more specified search criteria, or using another selection technique indicated in the instructions or other information received in block 605 or otherwise previously specified, such as a preference for the end-user). In some embodiments and situations, one or more target buildings may be selected based on both one or more other buildings and one or more specified criteria.

After blocks 655 or 670, the routine continues to block 610 to determine whether the instructions or other information received in block 605 are to display or otherwise present information about a target building (e.g., using a floor plan and/or a group of inter-connected linked photos that includes information about the interior of the target building), such as the best match target building from block 655 or other indicated target building in block 670, and if not continues to block 690. Otherwise, the routine proceeds to block 612 to retrieve the building information for the target building (optionally including indications of associated or linked information for the building interior and/or a surrounding location, such as with additional photos taken within or around the building), and selects an initial view of the retrieved information (e.g., a view of the floor plan, of at least some of the 3D computer model, a photo from the group of inter-connected linked photos, a visualization view of multiple linked photos, etc.). In block 615, the routine then displays or otherwise presents the current view of the retrieved information, and waits in block 617 for a user selection. After a user selection in block 617, if it is determined in block 620 that the user selection corresponds to the current target building location (e.g., to change the current view of the displayed mapping information for that target building), the routine continues to block 622 to update the current view in accordance with the user selection, and then returns to block 615 to update the displayed or otherwise presented information accordingly. The user selection and corresponding updating of the current view may include, for example, displaying or otherwise presenting a piece of associated linked information that the user selects (e.g., a particular photo associated with a displayed visual indication of a determined acquisition location), changing how the current view is displayed (e.g., zooming in or out; rotating information if appropriate; selecting a new portion of the floor plan and/or 3D computer model to be displayed or otherwise presented, such as with some or all of the new portion not being previously visible, or instead with the new portion being a subset of the previously visible information; selecting a different photo from a group of inter-connected linked photos to be displayed or otherwise presented, such as to display an initial subset view of that photo; etc.). In other embodiments and situations, the updating of the current view in accordance with the user selection may include interacting with and retrieving information from another system, such as from the MIGVM system.

If it is instead determined in block 610 that the instructions or other information received in block 605 are not to present information representing a building interior, the routine continues instead to block 690 to perform any other indicated operations as appropriate, such as any housekeeping tasks, to configure parameters to be used in various operations of the system (e.g., based at least in part on information specified by a user of the system, such as a user of a mobile device who captures one or more building interiors, an operator user of the APC system, etc.), to obtain and store other information about users of the routine (e.g., presentation and/or search preferences of a current user), to respond to requests for generated and stored information, etc.

Following block 690, or if it is determined in block 620 that the user selection does not correspond to the current target building location, the routine proceeds to block 695 to determine whether to continue, such as until an explicit indication to terminate is received, or instead only if an explicit indication to continue is received. If it is determined to continue (including in situations in which the user made a selection in block 617 related to a new target building location to present), the routine returns to block 605 to await additional instructions or information (or to continue on past block 605 and 650 to block 670 if the user made a selection in block 617 related to a new building location to present), and if not proceeds to step 699 and ends. In the illustrated embodiment, the routine in block 655 selects a best match target building to use if multiple target building candidates were returned to that block—in at least some embodiments, a queue of other such returned target buildings that are not first selected as best matches may further be saved and subsequently used (e.g., for the user to consecutively display or otherwise present information for multiple such other buildings), such as with the user selection in block 617 optionally indicating to select and use a next returned other building from such a queue, and/or information about multiple buildings made be displayed together (e.g., simultaneously or in succession, such as to enable comparison of information for the multiple buildings).

FIG. 7 illustrates an example flow diagram of an embodiment of an Automated Photo Capture (APC) System routine 700. The routine may be performed by, for example, the APC system application 368 of FIG. 3, an APC system application 162 of FIG. 1A, and/or a APC system as otherwise described with respect to FIGS. 2A-2C and elsewhere herein, such as to capture perspective photos at acquisition locations within buildings or other structures, such as for use in subsequent generation of related floor plans and/or other mapping information. While portions of the example routine 700 are discussed with respect to acquiring particular types of photos at particular acquisition locations in particular manners, it will be appreciated that this or a similar routine may be used to acquire video or other data (e.g., audio), whether instead of or in addition to such photos. In addition, while the illustrated embodiment acquires and uses information from the interior of a target building, it will be appreciated that other embodiments may perform similar techniques for other types of data, including for non-building structures and/or for information external to one or more target buildings of interest. Furthermore, in some embodiments, some of the routine may be executed on a mobile device used by a user to acquire photo information while other of the routine may be executed on one or more other computing devices (e.g., by a server computing system remote from such a mobile device and/or by one or more other computing devices at a location of the mobile device, such as in a distributed peer-to-peer manner using local inter-connections at that location).

The illustrated embodiment of the routine begins at block 705, where instructions or information are received. At block 710, the routine determines whether the received instructions or information indicate to acquire data representing a building interior, and if not continues to block 790. Otherwise, the routine proceeds to block 712 to receive an indication (e.g., from a user of a mobile photo acquisition device) to begin the photo acquisition process at a first acquisition location. After block 712, the routine proceeds to block 715 to capture photo information (e.g., one or more perspective photos, such as using different capture orientations) at the acquisition location in the interior of the target building of interest. The routine 700 may also optionally capture addition information, such as annotation and/or other information from a user regarding the acquisition location and/or the surrounding environment for a captured photo, IMU data and/or other image acquisition metadata (e.g., with respect to motion of the computing device during the photo capture), etc. While not illustrated in the example embodiment, the routine may further in some embodiments determine and provide one or more corrective guidance cues to the user regarding the photo capture, such as corresponding to motion of the mobile device, quality of the sensor data and/or visual data being captured, associated lighting/environmental conditions, advisability of capturing one or more additional photos from the acquisition location at different capture orientations, and any other suitable aspects of capturing one or more photos.

After block 715 is completed, the routine continues to block 720 to determine if there are more acquisition locations at which to acquire photos, such as based on corresponding information provided by the user of the mobile device. If so, the routine continues to block 722 to optionally initiate the capture of linking information (such as acceleration data, additional visual data, etc.) during movement of the mobile device along a travel path away from the current acquisition location and towards a next acquisition location within the building interior. As described elsewhere herein, the captured linking information may include additional sensor data recorded during such movement (e.g., from one or more IMU, or inertial measurement units, on the mobile device or otherwise carried by the user, and/or additional photo or video information). Initiating the capture of such linking information may be performed in response to an explicit indication from a user of the mobile device or based on one or more automated analyses of information recorded from the mobile device. In addition, the routine may further optionally monitor the motion of the mobile device in some embodiments during movement to the next acquisition location, and determine and provide one or more corrective guidance cues to the user regarding the motion of the mobile device, quality of the sensor data and/or video information being captured, associated lighting/environmental conditions, advisability of capturing a next acquisition location, and any other suitable aspects of capturing the linking information. Similarly, the routine may optionally obtain annotation and/or other information from the user regarding the travel path, such as for later use in presentation of information regarding that travel path or a resulting inter-panorama connection link. I$_n$ block 724, the routine determines that the mobile device has arrived at the next acquisition location (e.g., based on an indication from the user, based on the forward movement of the user stopping for at least a predefined amount of time, etc.), for use as the new current acquisition location, and returns to block 715 in order to perform the acquisition location photo acquisition activities for the new current acquisition location.

If it is instead determined in block 720 that there are not any more acquisition locations at which to acquire photo information for the current building or other structure, the routine proceeds to block 781 to optionally analyze the acquisition location information for the building or other structure, such as to identify possible additional coverage (and/or other information) to acquire within the building interior. For example, the APC system may provide one or more notifications to the user regarding the information acquired during capture of photos for the multiple acquisition locations and optionally corresponding linking information, such as if it determines that one or more pieces or parts of the recorded information are of insufficient or undesirable quality, or do not appear to provide complete coverage of the building. After block 781, the routine continues to block 783 to optionally preprocess the acquired perspective photos before their subsequent use for generating related mapping information, such as to use a specific format and/or to be of a defined type that presents information in a specific manner (e.g., using a perspective linear format, etc.). After block 783, the routine continues to block 788 to store the photos and any associated generated or obtained information for later use. FIGS. 4A-4C illustrate one example of a routine for generating mapping-related information for a building from such captured photo information.

If it is instead determined in block 710 that the instructions or other information recited in block 705 are not to acquire photos and other data representing a building interior, the routine continues instead to block 790 to perform any other indicated operations as appropriate, such as any housekeeping tasks, to configure parameters to be used in various operations of the system (e.g., based at least in part on information specified by a user of the system, such as a user of a mobile device who captures one or more building interiors, an operator user of the APC system, etc.), to respond to requests for generated and stored information (e.g., to identify one or more captured perspective photos that match one or more specified search criteria, etc.), to obtain and store other information about users of the system, etc.

Following blocks 788 or 790, the routine proceeds to block 795 to determine whether to continue, such as until an explicit indication to terminate is received, or instead only if an explicit indication to continue is received. If it is determined to continue, the routine returns to block 705 to await additional instructions or information, and if not proceeds to step 799 and ends.

Aspects of the present disclosure are described herein with reference to flowchart illustrations and/or block diagrams of methods, apparatus (systems/devices), and computer program products according to embodiments of the present disclosure. It will be appreciated that each block the flowchart illustrations and/or block diagrams, and combinations of such blocks, can be implemented by computer-readable program instructions. It will be further appreciated that in some implementations the functionality provided by the routines discussed above may be provided in alternative ways, such as being split among more routines or consolidated into fewer routines. Similarly, in some implementations illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other implementations the operations may be performed in other orders and in other manners. Any data structures discussed above may also be structured in different manners, such as by having a single data structure split into multiple data structures and/or by having multiple data structures consolidated into a single data structure. Similarly, in some implementations illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited by those claims. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A computer-implemented method comprising:
    obtaining, by a computing device, a plurality of perspective photos taken at a plurality of acquisition locations associated with a building, wherein the plurality of perspective photos include, for each of multiple rooms of the building, at least one perspective photo having an acquisition location in that room and having visual coverage of some of an interior of that room;
    determining, by the computing device, relative positional information for the plurality of acquisition locations that includes directional information between at least some pairs of the plurality of acquisition locations, including analyzing visual data of the plurality of perspective photos to identify matching features that are each present in two or more perspective photos of the plurality of perspective photos, and using the matching features to determine at least some of the directional information;
    generating, by the computing device, multiple sub-graphs that represent the relative positional information, wherein each of the multiple sub-graphs corresponds to a distinct subset of multiple acquisition locations of the plurality of acquisition locations and has multiple inter-connected nodes each representing one of the multiple acquisition locations of that sub-graph's distinct subset;
    displaying, by the computing device, an overhead image of the building that shows at least some of an exterior of the building from a vantage point above a top of the building; and
    presenting, by the computing device, one of the sub-graphs overlaid on the displayed overhead image by displaying visual indications of the multiple inter-connected nodes of the one sub-graph on the displayed overhead image in respective positions within the building that reflect relative positional information between the acquisition locations represented by those multiple inter-connected nodes, and by displaying lines between at least some of the visual indications that represent edges in the one sub-graph between nodes corresponding to the at least some visual indications, wherein the displayed visual indication for a node includes a display of at least some visual data of one of the plurality of perspective photos that is taken at the acquisition location represented by that node.

2. The computer-implemented method of claim 1 further comprising determining locations in the displayed overhead image of the exterior of the building, and determining the respective positions of the displayed visual indications overlaid on the displayed image for the multiple inter-connected nodes based at least in part on the determined locations of the exterior of the building.

3. The computer-implemented method of claim 1 further comprising, by the computing device and after the presenting of the one sub-graph overlaid on the displayed overhead image, receiving a selection by a user of one of the displayed visual indications for one of the multiple inter-connected nodes of the one sub-graph, and presenting further information specific to the acquisition location represented by the one node.

4. The computer-implemented method of claim 3 wherein the display of the at least some visual data of the one perspective photo for the acquisition location represented by the one node is a thumbnail image of that one perspective photo, and wherein the presenting of the further information specific to the acquisition location represented by the one node includes presenting, by the computing device, an enlarged version of that one perspective photo.

5. The computer-implemented method of claim 3 wherein the presenting of the further information specific to the acquisition location represented by the one node includes presenting, by the computing device, one or more additional images taken at the acquisition location represented by the one node that are different from the one perspective photo used for the display of the at least some visual data for the one node.

6. The computer-implemented method of claim 3 wherein the presenting of the further information specific to the acquisition location represented by the one node includes presenting, by the computing device, at least partial structural shapes that are visible from the acquisition location represented by the one node and that represent one or more walls of a room of the building in which that acquisition location is located.

7. The computer-implemented method of claim 1 wherein the presenting of the one sub-graph overlaid on the displayed overhead image includes presenting each of the multiple sub-graphs overlaid on the displayed overhead image, including, for each of the multiple sub-graphs, displaying visual indications of the multiple inter-connected nodes of that sub-graph on the displayed overhead image in respective positions that reflect relative positional information between the acquisition locations represented by those multiple inter-connected nodes.

8. The computer-implemented method of claim 1 wherein the presenting of the one sub-graph overlaid on the displayed overhead image includes:
displaying, for a selected one of the multiple inter-connected nodes of the one sub-graph and as the display of the at least some visual data for the selected one node, a first perspective photo using one or more first attributes that visually emphasize the first perspective photo, wherein the first perspective photo is captured at the acquisition location represented by the selected one node; and
displaying, for each other node of the multiple inter-connected nodes of the one sub-graph, and as the display of the at least some visual data for that other node, a second perspective photo using one or more second attributes that visually deemphasize the second perspective photo relative to the first perspective photo, wherein the second perspective photo is taken at the acquisition location represented by that other node.

9. The computer-implemented method of claim 1 further comprising determining, by the computing device, a sequence of the multiple inter-connected nodes of the one sub-graph, and wherein the presenting further includes displaying, for each of the multiple inter-connected nodes of the one sub-graph in the determined sequence, additional visual data for that node of at least one perspective photo acquired at the acquisition location represented by the node and using one or more first attributes that visually emphasize that additional visual data.

10. The computer-implemented method of claim 1 further comprising, after the presenting, displaying, for each of two or more of the multiple inter-connected nodes of the one sub-graph in a sequence selected by a user, additional visual data for that node of at least one perspective photo acquired at the acquisition location represented by the node and using one or more first attributes that visually emphasize that additional visual data.

11. The computer-implemented method of claim 1 further comprising:
determining, by the computing device, partial structural shapes visible in at least some perspective photos of the plurality of perspective photos that are acquired at multiple acquisition locations represented by the multiple inter-connected nodes of the one sub-graph; and
determining, by the computing device, a partial floor plan for the building that includes the partial structural shapes positioned at determined relative spacing between the partial structural shapes,
and wherein the presenting further includes displaying the partial floor plan with the partial structural shapes shown at positions that reflect the determined relative spacing.

12. The computer-implemented method of claim 1 further comprising:
determining, by the computing device, structural information associated with one or more structural wall elements visible in at least some perspective photos of the plurality of perspective photos that are acquired at multiple acquisition locations represented by the multiple inter-connected nodes of the one sub-graph, wherein the one or more structural wall elements include at least one of a wall, or a door, or a window, or a wall opening, or an inter-room opening;
and wherein the presenting further includes displaying indications of the determined structural information shown at positions that reflect locations of the one or more structural wall elements in the at least some perspective photos.

13. The computer-implemented method of claim 1 further comprising updating, by the computing device and after the presenting of the one sub-graph, the one sub-graph to incorporate one or more additional acquisition locations at which one or more additional photos are taken, including analyzing additional visual data of the one or more additional photos to determine additional relative positional information for the one or more additional acquisition locations relative to at least one acquisition location represented by the multiple inter-connected nodes of the one sub-graph, and updating the presented one sub-graph overlaid on the overhead image to include an additional visual indication of each of the one or more additional acquisition locations.

14. The computer-implemented method of claim 1 further comprising updating, by the computing device and after performing the presenting of the one sub-graph overlaid on the overhead image to one or more users, the relative positional information between the acquisition locations represented by the multiple inter-connected nodes of the one sub-graph based at least in part on adjustment instructions received from the one or more users.

15. The computer-implemented method of claim 1 further comprising updating, by the computing device and after performing the presenting of the one sub-graph overlaid on the overhead image to one or more users and including displaying partial structural shapes determined from at least some perspective photos of the plurality of perspective photos to the one or more users, relative spacing between two or more of the partial structural shapes based at least in part on adjustment instructions received from the one or more users.

16. The computer-implemented method of claim 1 further comprising performing, by the computing device, the presenting of the one sub-graph overlaid on the overhead image by further displaying information about, for one or more perspective photos of the plurality of perspective photos that are acquired at one or more of the acquisition locations represented by the multiple inter-connected nodes of the one sub-graph, changes in the building relative to one or more additional photos taken at an earlier time for the building.

17. The computer-implemented method of claim 1 wherein the presenting of the one sub-graph overlaid on the overhead image includes transmitting, by the computing device and over one or more computer networks, information for the one sub-graph to a client computing device to initiate displaying of the information for each of the multiple inter-connected nodes of the one sub-graph to a user on the client computing device, wherein at least some of the plurality of photos are taken with a lens having at most a 60° angle of view and without have any associated captured depth information to indicate measured distances to any surrounding surfaces, and wherein the plurality of acquisition locations includes one or more acquisition locations outside the exterior of the building.

18. A system comprising:
one or more hardware processors of one or more computing devices; and
one or more memories with stored instructions that, when executed by at least one of the one or more hardware processors, cause the one or more computing devices to perform automated operations including at least:
obtaining a plurality of photos taken at a plurality of acquisition locations associated with a building, wherein the plurality of photos include, for each of multiple rooms of the building, at least one perspective photo having an acquisition location in that room and having visual coverage of some of an interior of that room;
determining relative positional information for the plurality of acquisition locations by at least analyzing visual data of the plurality of perspective photos to identify matching features;
generating one or more sub-graphs that represent at least some of the determined relative positional information, wherein each of the one or more sub-graphs corresponds to a distinct subset of multiple acquisition locations of the plurality of acquisition locations and has multiple inter-connected nodes each representing one of the multiple acquisition locations of that sub-graph's distinct subset; and
presenting, as an overlay on a displayed exterior image of the building, information about one of the sub-graphs, including presenting visual indications of the multiple inter-connected nodes of the one sub-graph in respective positions within the building that reflect relative positional information between the acquisition locations represented by those multiple inter-connected nodes, and including presenting lines between at least some of the visual indications that represent edges in the one sub-graph between nodes corresponding to the at least some visual indications.

19. The system of claim 18 wherein each of the multiple photos is a perspective photo having at most a 90° angle of view, wherein the determining of the relative positional information for the plurality of acquisition locations further includes, for multiple photos acquired at multiple acquisition locations represented by the multiple inter-connected nodes of the one sub-graph, identifying matching features that are each present in two or more photos of the multiple photos, wherein the exterior image of the building is an overhead image of the building, wherein the stored instructions include software instructions that, when executed by the at least one hardware processor, cause the one or more computing devices to perform the automated operations, wherein the presenting of the information about the one sub-graph overlaid on the overhead image of the building is performed in a graphical user interface (GUI) along with user-selectable controls that enable manipulation of information shown in the displayed GUI, and wherein the presented information includes, for each of one or more of the multiple inter-connected nodes, presentation of at least some visual data of one of the plurality of photos that is taken at the acquisition location represented by that node.

20. A non-transitory computer-readable medium having stored contents that cause a computing device to perform automated operations, the automated operations including at least:
obtaining, by the computing device, a plurality of perspective photos taken at a plurality of acquisition locations associated with a building, wherein the plurality of perspective photos include, for each of multiple rooms of the building, at least one perspective photo having an acquisition location in that room and having visual coverage of some of an interior of that room;
determining, by the computing device, relative positional information for the plurality of acquisition locations by at least analyzing visual data of the plurality of perspective photos to identify matching features;
generating, by the computing device, one or more sub-graphs that represent at least some of the determined relative positional information, wherein each of the one or more sub-graphs corresponds to a distinct subset of multiple acquisition locations of the plurality of acquisition locations and has multiple inter-connected nodes each representing one of the multiple acquisition locations of that sub-graph's distinct subset; and
presenting, by the computing device as an overlay on a displayed exterior image of the building, information about one of the sub-graphs, including presenting visual indications of the multiple inter-connected nodes of the one sub-graph for display in respective positions within the building that reflect relative positional information between the acquisition locations represented by those multiple inter-connected nodes, wherein the presented visual indication for each of one or more of the multi-interconnected nodes of the one sub-graph includes a display of at least some visual data of one of the plurality of perspective photos that is taken at the acquisition location represented by that node.

21. The non-transitory computer-readable medium of claim 20 wherein the determining of the relative positional information for the plurality of acquisition locations further includes, for multiple photos acquired at multiple acquisition locations represented by the multiple inter-connected nodes of the one sub-graph, identifying matching features that are each present in two or more photos of the multiple photos, wherein the exterior image of the building is an overhead image of the building, wherein the stored contents include software instructions that, when executed by the computing device, cause the computing device to perform the automated operations, wherein the presenting of the information about the one sub-graph overlaid on the overhead image of the building is performed in a graphical user interface (GUI) along with user-selectable controls that enable manipulation of information shown in the displayed GUI, and wherein the presented information includes presented visual representations of edges between at least some of the multiple inter-connected nodes of the one sub-graph.

* * * * *